(12) United States Patent
Nakano

(10) Patent No.: US 10,284,529 B2
(45) Date of Patent: May 7, 2019

(54) INFORMATION PROCESSING APPARATUS AND INFORMATION PROCESSING METHOD

(71) Applicant: SONY CORPORATION, Tokyo (JP)

(72) Inventor: Takehiko Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 15/315,031

(22) PCT Filed: Jun. 5, 2015

(86) PCT No.: PCT/JP2015/066288
§ 371 (c)(1),
(2) Date: Nov. 30, 2016

(87) PCT Pub. No.: WO2015/194393
PCT Pub. Date: Dec. 23, 2015

(65) Prior Publication Data
US 2017/0195297 A1    Jul. 6, 2017

(30) Foreign Application Priority Data

Jun. 20, 2014  (JP) ................................ 2014-127713
Sep. 25, 2014  (JP) ................................ 2014-194620
Dec. 26, 2014  (JP) ................................ 2014-265345

(51) Int. Cl.
*H04L 29/06* (2006.01)
*G09C 5/00* (2006.01)
(Continued)

(52) U.S. Cl.
CPC .......... *H04L 63/0428* (2013.01); *G06F 21/10* (2013.01); *G06F 21/606* (2013.01);
(Continued)

(58) Field of Classification Search
CPC .... H04L 63/0428; H04L 9/14; H04N 21/4405
See application file for complete search history.

(56) References Cited

U.S. PATENT DOCUMENTS

2005/0192904 A1    9/2005  Candelore
2005/0207442 A1    9/2005  Zoest et al.
(Continued)

FOREIGN PATENT DOCUMENTS

CN    1993975 A    7/2007
CN    101542559 A    9/2009
(Continued)

OTHER PUBLICATIONS

"Information technology—generic coding of moving pictures and associated audio information : systems", ITU-T Recommendation H.222.0, pp. 18-30.
(Continued)

*Primary Examiner* — John B King
(74) *Attorney, Agent, or Firm* — Chip Law Group

(57) ABSTRACT

The present disclosure relates to an information processing apparatus and an information processing method which facilitate reproduction of the data obtained by encrypting prepared multiple patterns regarding at least part of data of content with unique keys. An image acquiring unit receives an image file containing: encrypted data that is obtained by encrypting with unique keys multiple pieces of pattern data regarding forensic object data which is at least part of encoded image data of video content and that has an identical size; unencrypted data, of the encoded image data of video content, which is not encrypted with any one of the keys; size information that represents the size of the encrypted data; and position information that represents a position of the encrypted data in the file. The present disclosure can be applied to a video reproducing terminal and the like.

12 Claims, 41 Drawing Sheets

(51) Int. Cl.
  *H04L 9/14* (2006.01)
  *H04N 21/4405* (2011.01)
  *G06F 21/10* (2013.01)
  *G06F 21/60* (2013.01)
  *G06F 21/62* (2013.01)
  *H04N 1/10* (2006.01)
  *H04N 1/32* (2006.01)

(52) U.S. Cl.
  CPC .......... *G06F 21/6227* (2013.01); *G09C 5/00* (2013.01); *H04L 9/14* (2013.01); *H04N 1/1017* (2013.01); *H04N 1/32* (2013.01); *H04N 21/4405* (2013.01); *G06F 2221/0733* (2013.01); *G06F 2221/2107* (2013.01); *H04L 2463/101* (2013.01)

(56) References Cited

U.S. PATENT DOCUMENTS

| | | | |
|---|---|---|---|
| 2011/0091032 A1* | 4/2011 | Sato | H04L 9/0643 380/28 |
| 2012/0089843 A1 | 4/2012 | Kato et al. | |
| 2012/0173880 A1 | 7/2012 | Swaminathan | |
| 2014/0223197 A1* | 8/2014 | Gueron | G06F 21/72 713/193 |
| 2015/0149785 A1* | 5/2015 | Pickering | H04N 21/23434 713/179 |

FOREIGN PATENT DOCUMENTS

| | | |
|---|---|---|
| CN | 102819716 A | 12/2012 |
| CN | 103620617 A | 3/2014 |
| JP | 2012-083910 A | 4/2012 |
| JP | 2013-013146 A | 1/2013 |
| WO | 2013/120525 A1 | 8/2013 |

OTHER PUBLICATIONS

"Information technology—Coding of audio-visual objects—Part 12: ISO base media file format, Technical Corrigendum 5", ISO/IEC 14496-12:2008/Cor.5:2011(E), Dec. 12, 2011, pp. 01-37.

Extended European Search Report of EP Patent Application No. 15809001.9, dated Dec. 15, 2017, 12 pages.

Office Action for CN Patent Application No. 201580030731.3, dated Nov. 28, 2018, 10 pages of Office Action and 11 pages of English Translation.

* cited by examiner

FIG. 2

| MediaSegment | | | | | |
|---|---|---|---|---|---|
| styp | Movie Fragment | | | | |
| | Movie Fragment box (moof) | | | | Media Data box (mdat) |
| | Movie Fragment Header box (mfhd) | Track Fragment box (traf) | | | |
| | | Track Fragment Header box (tfhd) | Track Fragment DecodeTime box (tfdt) | Track Fragment Run box (trun) | Pattern Table box (ptbl) |

FIG. 3

```
aligned(8) class PatternTableBox extends FullBox('ptbl', version, flags) {
    const unsigned int(4)    reserved = 0;
    unsigned int(2)          length_size_of_trun_num;
    unsigned int(2)          length_size_of_sample_num;
    unsigned int(32)         entry_count ;
    for(i=1;i<=entry_count;i++) {
        unsigned int((length_size_of_trun_num+1)*8)    trun_number;
        unsigned int((length_size_of_sample_num+1)*8)  sample_number;
        unsigned int(32)     table_count ;
        for(j=1;j<=table_count;j++) {
            unsigned int(32) pattern_start_offset;
            unsigned int(32) pattern_size;
            unsigned int(32) table_offset;
            unsigned int(32) pattern_count;
            for (k=1;k<=pattern_count;k++) {
                unsigned int(8)[16]    patKID;
                unsigned int(8*IV_Size) patIV;
            }
        }
    }
}
```

FIG. 14

| Media Segment | | | | | | | |
|---|---|---|---|---|---|---|---|
| styp | Movie Fragment | | | | | | |
| | Movie Fragment box (moof) | | | | | | Media Data box (mdat) |
| | Movie Fragment Header box (mfhd) | Track Fragment box (traf) | | | | | |
| | | Track Fragment Header box (tfhd) | Track Fragment Run box (trun) | Sample Auxiliary Information Sizes box (saiz) | Sample Auxiliary Information Offset box (saio) | Track Fragment Decode Time box (tfdt) | |

FIG. 15

```
unsigned int(32) table_count ;
for(i=1;i<=table_count;i++) {
    unsigned int(32)        pattern_start_offset;
    unsigned int(32)        pattern_size;
    unsigned int(32)        table_offset;
    unsigned int(32)        pattern_count;
    for(j=1;j<=pattern_count;j++) {
        unsigned int(8)[16]    patKID;
        unsigned int(8*IV_Size) patIV;
    }
}
```

FIG. 18

| Media Segment | | | | | |
|---|---|---|---|---|---|
| styp | Movie Fragment | | | | |
| | Movie Fragment box (moof) | | | | Media Data box (mdat) |
| | Movie Fragment Header box (mfhd) | Track Fragment box (traf) | | Track Fragment box (traf) | |
| | | Track Fragment Header box (tfhd) | Track Fragment Run box (trun) | Track Fragment Decode Time box (tfdt) | Track Fragment Header box (tfhd) | AUX Information Run box (arun) |

(Note: simplified representation of the figure structure)

FIG. 19

```
aligned(8) class AUXInformationRunBox extends FullBox('arun', version, flags) {
    unsigned int(32) data_offset;
    unsigned int(32) sample_count;
    for(k=1;k<=sample_count;k++){
        unsigned int(32)           table_count ;
        for(i=1;i<=table_count;i++) {
            unsigned int(32)       pattern_start_offset;
            unsigned int(32)       pattern_size;
            unsigned int(32)       pattern_count;
            for(j=1;j<=pattern_count;j++) {
                unsigned int(8)[16]    patKID;
                unsigned int(8*IV_Size) patIV;
            }
        }
    }
}
```

FIG. 26

```
aligned(8) class SampleConstructor
{
    unsigned int(8) version;
    unsigned int(32) elements_count;              // NUMBER OF ELEMENTS CONSTITUTING Sample
    for( i=1; i<= elements_count; i++ ){
        if ( version == 0 ){
            unsigned int(32)   element_offset;    // ELEMENT POSITION INFORMATION
        }else{
            unsigned int(64)   element_offset;
        }
        unsigned int(8)  group_flags;
        if ( group_flags & 0x01 ){                // IF BEGINNING OF GROUP
            unsigned int(32)  element_size;
        }
        if ( group_flags & 0x02 ){                // IF ELEMENT IS ENCRYPTED DATA
            unsigned int(8) [16]  patKID;         // ID OF ENCRYPTION KEY
            unsigned int(8*IV_Size)  patIV;       // Initial Vector
        }
    }
}
```

FIG. 30

```
aligned(8) class SampleConstructor
{
    unsigned int(8)  version;
    unsigned int(32) elements_count;         // NUMBER OF ELEMENTS CONSTITUTING Sample
    for( i=1; i<= elements_count; i++ ){
        unsigned int(8) group_flags;
        if( group_flags & 0x01 ){            // IF BEGINNING OF GROUP
            if( version == 0 ){
                unsigned int(32)  element_offset;   // ELEMENT POSITION INFORMATION
            }else{
                unsigned int(64)  element_offset;
            }
            unsigned int(32)  element_size;
        }
        if( group_flags & 0x02 ){            // IF ELEMENT IS ENCRYPTED DATA
            unsigned int(8) [16]  patKID;    // ID OF ENCRYPTION KEY
            unsigned int(8*IV_Size)  patIV;  // Initial Vector
        }
    }
}
```

FIG. 35

```
aligned(8) class SampleConstructor
{
    unsigned int(8)  version;
    unsigned int(32) elements_count;           // NUMBER OF ELEMENTS CONSTITUTING Sample
    for( i=1; i<= elements_count; i++ ) {
        if ( version == 0 ) {
            unsigned int(32) element_offset;   // ELEMENT POSITION INFORMATION
        } else {
            unsigned int(64) element_offset;
        }
        unsigned int(8) group_flags;
        if ( group_flags & 0x01 ) {            // IF BEGINNING OF GROUP
            unsigned int(32) element_size;     // SIZE OF ELEMENT
        }
        if ( group_flags & 0x02 ) {            // IF ELEMENT IS ENCRYPTED DATA
            unsigned int(8)[16]    patKID;     // ID OF ENCRYPTION KEY
            unsigned int(8*IV_Size) patIV;     // Initial Vector
            unsigned int(32)       patSize;    // PADDING INFORMATION
        }
    }
}
```

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/066288 filed on Jun. 5, 2015, which claims priority benefit of Japanese Patent Application No. JP 2014-194620 filed in the Japan Patent Office on Sep. 25, 2014, claims priority benefit of Japanese Patent Application No. JP 2014-265345 filed in the Japan Patent Office on Dec. 26, 2014 and claims priority benefit of Japanese Patent Application No. JP 2014-127713 filed in the Japan Patent Office on Jun. 20, 2014. Each of the above-referenced applications is hereby incorporated herein by reference in its entirety.

TECHNICAL FIELD

The present disclosure relates to an information processing apparatus and an information processing method, and particularly relates to an information processing apparatus and an information processing method which facilitate reproduction of data obtained by encrypting prepared multiple patterns regarding data of at least part of content with unique keys.

BACKGROUND ART

In recent years, an over-the-top video (OTT-V) is dominant as a streaming service on the Internet. As a fundamental technology for the OTT-V, the moving picture experts group phase-dynamic adaptive streaming over HTTP (MPEG-DASH) is recently widespread (for example, see Non-patent Document 1).

In the MPEG-DASH, a distribution server prepares video data groups having different screen sizes and encoding rates for one piece of video content, and a reproduction terminal requests a video data group having an optimum screen size and encoding rate according to circumstances of a transmission path. Thus, adaptive streaming distribution is achieved.

Incidentally, it is desired that forensic information be embedded into the data of video content as countermeasures against the illegal distribution of video content. An example of forensic information is a plurality of variations (patterns) prepared regarding at least part of the data of video content each being encrypted with a unique key.

When forensic information is embedded in video content, and only one key is provided to a reproduction apparatus, a reproduction apparatus from which an illegal copy has been distributed can be identified by finding a key corresponding to a pattern contained in the illegal copy when an output reproduced by a specific reproduction apparatus has been illegally copied.

CITATION LIST

Non-Patent Document

Non-Patent Document 1: Dynamic Adaptive Streaming over HTTP (MPEG-DASH) (URL: http://mpeg.chiariglione.org/standards/mpeg-dash/media-presentation-description-and-segment-formats/text-isoiec-23009-12012-dam-1)

SUMMARY OF THE INVENTION

Problems to be Solved by the Invention

However, when forensic information is embedded in video content, processing required for the reproduction of video is more complicated compared to when forensic information is not embedded. Furthermore, a large burden may be applied to the reproduction processing depending on the transmission format and recording format of video content.

The present disclosure has been achieved in view of such circumstances, and is configured to facilitate reproduction of data obtained by encrypting a plurality of patterns prepared regarding at least part of data of content with unique keys.

Solutions to Problems

An information processing apparatus according to a first aspect of the present disclosure includes: a receiving unit that receives a file containing encrypted data that is multiple pieces of pattern data, regarding at least part of data of content, encrypted with unique keys and that has an identical size, unencrypted data, of the data of content, which is not encrypted with any one of the keys, size information that represents the size, and position information that represents a position of the encrypted data in the file; and a decryption unit that reads the encrypted data encrypted with a predetermined key from the file on the basis of the position information and the size information received by the receiving unit, and decrypts the read encrypted data with the predetermined key to generate the pattern data. It is noted that the unencrypted data may be wholly or partly encrypted with a key different from the key.

An information processing method according to the first aspect of the present disclosure corresponds to the information processing apparatus according to the first aspect of the present disclosure.

In the first aspect of the present disclosure, there is received a file containing: encrypted data obtained by encrypting multiple pieces of pattern data regarding at least part of data of content with unique keys and having an identical size; unencrypted data, of the data of content, which is not encrypted with any one of the keys; size information that represents the size; and position information that represents a position of the encrypted data in the file. Then, the encrypted data encrypted with a predetermined key is read from the file on the basis of the received position information and size information, and decrypted with the predetermined key to generate the pattern data.

An information processing apparatus according to a second aspect of the present disclosure includes: an encryption unit that encrypts, with unique keys, multiple pieces of pattern data regarding at least part of data of content to generate encrypted data having an identical size; and a file generating unit that generates a file containing the encrypted data generated by the encryption unit, unencrypted data, of the data of content, which is not encrypted with any one of the keys, size information that represents the size, and position information that represents a position of the encrypted data in the file.

An information processing method according to the second aspect of the present disclosure corresponds to the information processing apparatus according to the second aspect of the present disclosure.

In the second aspect of the present disclosure, multiple pieces of pattern data regarding at least part of data of content are encrypted with unique keys to generate encrypted data having an identical size. Then, there is generated a file containing: the encrypted data; unencrypted data, of the data of content, which is not encrypted with any one of the keys; size information that represents the size; and position information that represents the position of the encrypted data in the file.

It is noted that the information processing apparatuses according to the first and second aspects can be achieved by causing a computer to execute a program.

Also, for achieving the information processing apparatuses according to the first and second aspects, a program to be executed by a computer can be provided by being transmitted via a transmission medium or by being recorded in a recording medium.

Effects of the Invention

According to the first aspect of the present disclosure, data can be reproduced. Furthermore, according to the first aspect of the present disclosure, a plurality of patterns regarding at least part of data of content is prepared and encrypted with unique keys, and the encrypted data can be easily reproduced.

According to the second aspect of the present disclosure, a file can be generated. Furthermore, according to the second aspect of the present disclosure, there can be generated a file which can facilitate reproduction of data obtained by encrypting a plurality of patterns prepared regarding at least part of data of content with unique keys.

It is noted that the effects described herein are not necessarily limiting, and any one of the effects described in the present disclosure may be exerted.

BRIEF DESCRIPTION OF DRAWINGS

FIG. 2 is a diagram illustrating a segment structure example of Media Segment of an image file.

FIG. 3 is a diagram illustrating an example of the syntax of a ptbl box.

FIG. 14 is a diagram illustrating a segment structure example of Media Segment of an image file in a second embodiment of the information processing system to which the present disclosure is applied.

FIG. 15 is a diagram illustrating an example of the syntax of Sample Auxiliary Information.

FIG. 18 is a diagram illustrating a segment structure example of Media Segment of an image file in a third embodiment of the information processing system to which the present disclosure is applied.

FIG. 19 is a diagram illustrating an example of the syntax of an arun box of FIG. 18.

FIG. 26 is a diagram illustrating an example of the syntax of Sample Constructor of an image file in a sixth embodiment of the information processing system to which the present disclosure is applied.

FIG. 30 is a diagram illustrating an example of the syntax of Sample Constructor of an image file in a seventh embodiment of the information processing system to which the present disclosure is applied.

FIG. 35 is a diagram illustrating an example of the syntax of Sample Constructor.

MODE FOR CARRYING OUT THE INVENTION

Hereinafter, a mode for carrying out the present disclosure (hereinafter, referred to as an embodiment) will be described. It is noted that description will be provided in the following order.

1. First embodiment: information processing system (FIG. 1 to FIG. 13)
2. Second embodiment: information processing system (FIG. 14 to FIG. 17)
3. Third embodiment: information processing system (FIG. 18 to FIG. 21)
4. Fourth embodiment: information processing system (FIG. 22 and FIG. 23)
5. Fifth embodiment: information processing system (FIG. 24 and FIG. 25)
6. Sixth embodiment: information processing system (FIG. 26 to FIG. 29)
7. Seventh embodiment: information processing system (FIG. 30 to FIG. 32)
8. Eighth embodiment: information processing system (FIG. 33 to FIG. 40)
9. Ninth embodiment: computer (FIG. 41)

First Embodiment (Outline of First Embodiment of Information Processing System)

Figure 1:
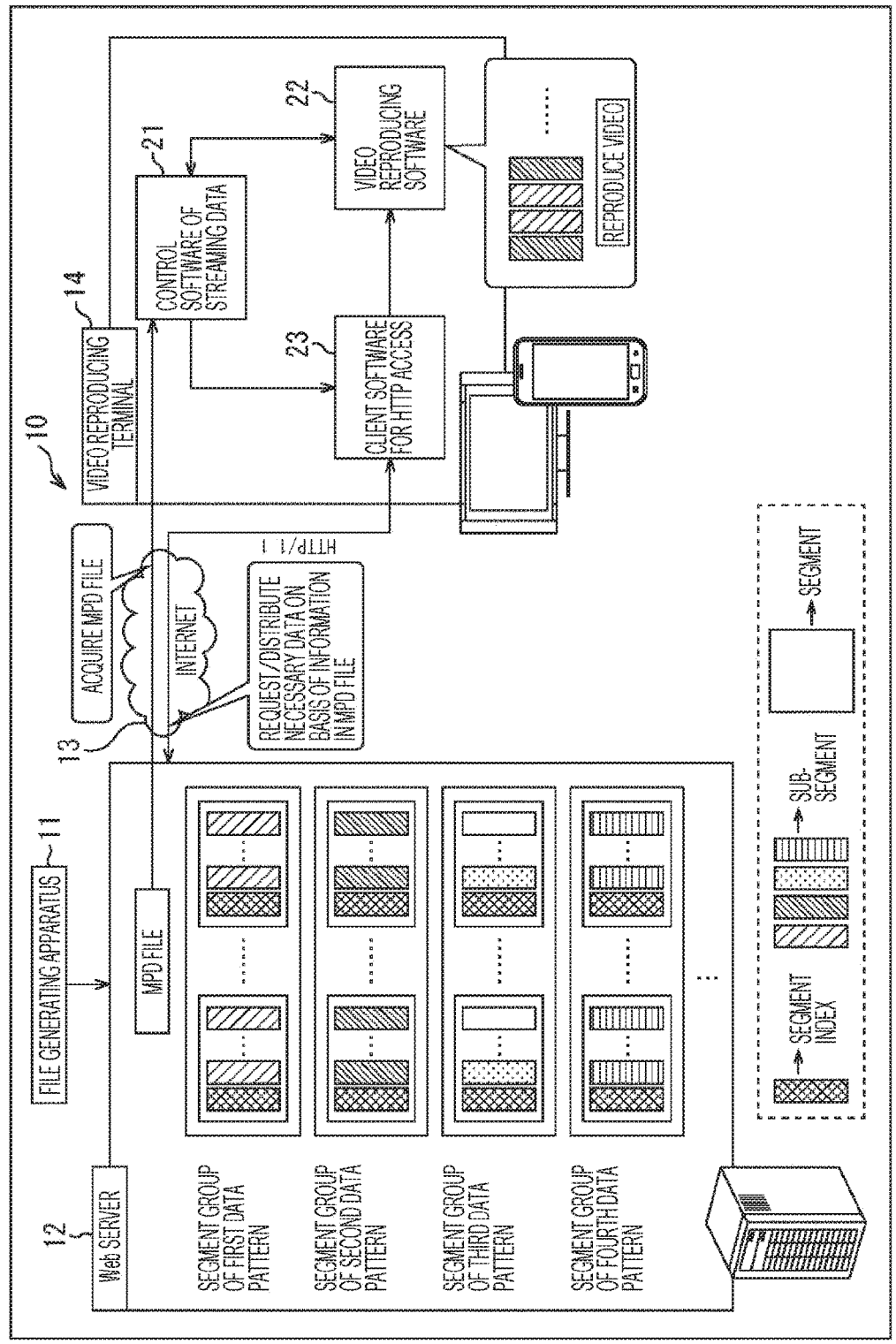
FIG. 1 is a diagram illustrating an outline of a first embodiment of an information processing system to which the present disclosure is applied.

FIG. 1 is a diagram illustrating an outline of a first embodiment of the information processing system to which the present disclosure is applied.

In an information processing system 10 of FIG. 1, a Web server 12 connected with a file generating apparatus 11 is connected to a video reproducing terminal 14 via the Internet 13.

In the information processing system 10, the Web server 12 distributes elementary stream (ES) data of an image of video content (hereinafter, referred to as encoded image data) to the video reproducing terminal 14 by a technique pursuant to MPEG-DASH. It is noted that as described herein, only an image, of video content, will be described for simplification of the description, but the description for a voice or the like is also similar to that for an image.

The file generating apparatus 11 of the information processing system 10 is an information processing apparatus, and acquires image data of video content having different screen sizes and encodes the acquired image data at a plurality of encoding rates to generate encoded image data. When generating the encoded image data, the file generating apparatus 11 embeds forensic information, for example, at a predetermined cycle. This forensic information is obtained by encrypting with a unique key the encoded image data (hereinafter, referred to as pattern data) of a plurality of different patterns (variations) regarding at least part of encoded image data (hereinafter, referred to as forensic object data) of video content. When each piece of pattern data is decoded, it can be hardly visually distinguished. However, it has a difference which allows for determination by image analysis on which piece of pattern data has been decoded. Also, the size of each piece of pattern data is the same as the size of its corresponding forensic object data. The file generating apparatus 11 creates a file of encoded image data in which forensic information is embedded, at a time unit of approximately several seconds to 10 seconds called a segment, for each combination (hereinafter, referred to as data pattern) of a screen size and an encoding rate. It is noted that encoded image data of a plurality of segments may be stored in one file in some cases by allowing the encoded image data of each segment to be referred to by an individual uniform resource locator (URL). The file generating apparatus 11 uploads to the Web server 12 an image file of each data pattern obtained as a result of the creation of a file.

The file generating apparatus 11 generates a media presentation description (MPD) file which manages an image file. The file generating apparatus 11 uploads the MPD file to the Web server 12.

The Web server 12 stores the image file of each data pattern and the MPD file which have been uploaded from the file generating apparatus 11. The Web server 12 transmits the stored image file, MPD file, and the like, to the video reproducing terminal 14, in response to a request from the video reproducing terminal 14.

The video reproducing terminal 14 executes software for controlling streaming data (hereinafter, referred to as control software) 21, video reproducing software 22, client software for hypertext transfer protocol (HTTP) access (hereinafter, referred to as access software) 23, and the like.

The control software 21 is software that controls data streamed from the Web server 12. Specifically, the control software 21 allows the video reproducing terminal 14 to acquire the MPD file from the Web server 12. Furthermore, the control software 21 specifies, on the basis of the MPD file, a current image file determined by the video reproducing software 22, and commands the access software 23 to request transmission of the image file.

The video reproducing software 22 is software that reproduces an image file acquired from the Web server 12. Specifically, the video reproducing software 22 determines a current image file according to a user's command and the like. Furthermore, the video reproducing software 22 selects one piece of encrypted data, which is encrypted pattern data, in encoded image data contained in the current image file acquired from the Web server 12, for each piece of forensic object data, and decrypts the selected piece of encrypted data using a key retained by the video reproducing terminal 14. The key retained by the video reproducing terminal 14 is one of a plurality of different keys used in the file generating apparatus 11, and has been previously provided to the video reproducing terminal 14.

The video reproducing software 22 places (inserts) pattern data obtained as a result of decryption, into an appropriate position in unencrypted data that is encoded image data which is not encrypted with a key used for the encryption of pattern data. The video reproducing software 22 decodes the unencrypted data into which the pattern data has been inserted. The video reproducing software 22 outputs the resultant image data as image data of video content.

The access software 23 is software that controls communications with the Web server 12 via the Internet 13 according to HTTP. Specifically, the access software 23 causes the video reproducing terminal 14 to transmit a transmission request of a current image file in response to a command by the control software 21. Furthermore, the access software 23 causes the video reproducing terminal 14 to receive an image file transmitted from the Web server 12 in response to the transmission request.

(Segment Structure Example of Image File)

FIG. 2 is a diagram illustrating a segment structure example of Media Segment of an image file.

As described herein, it is assumed that a fragmented movie in accordance with the ISO base media file format (hereinafter, referred to as ISOBMFF) defined in ISO/IEC 14496-12, for example, is adopted as a format of an image file.

In the ISOBMFF, data is essentially formed with a combination of structures called boxes. To each of the boxes, a 4-alphabetic character code depending on the information and application contained in the box is allocated.

As illustrated in FIG. 2, an image file includes a styp box indicating a file type of the segment, and one or more movie fragments. The movie fragment is generated for each finely divided piece of encoded image data, and includes a moof box and an mdat box. The encoded image data is placed in an mdat box, and management metadata for the encoded image data is placed in a moof box.

Specifically, the moof box includes an mfhd box and a traf box. The mfhd box is a box indicating a sequence number of the segment. The traf box includes a tfhd box, a tfdt box, one or more trun boxes, and a ptbl box. It is noted that when encoded image data and encoded audio data are contained in the same file, the moof box has a separate traf box for each of the encoded image data and the encoded audio data.

In a trun box, sample_count representing the number of one or more consecutive samples managed in the trun box, and data_offset representing a beginning position of encoded image data in a beginning sample are placed. A sample means one image, and encoded image data of the samples managed by one trun box are consecutively placed in the mdat box. Encoded image data of neighboring trun boxes are not necessarily consecutive.

In a ptbl box, there is placed, for example, data position information indicating the position in which forensic object data is placed on encoded image data of video content.

(Example of Syntax of Ptbl Box)

FIG. 3 is a diagram illustrating an example of the syntax of a ptbl box.

As illustrated in FIG. 3, in the ptbl box, length_size_of_trun_num that is a value obtained by subtracting 1 from a byte length of later-described trun_number is placed, and length_size_of_sample_num that is a value obtained by subtracting 1 from a byte length of later-described sample_number. Furthermore, in the ptbl box, entry_count representing the number of samples (hereinafter, referred to as encryption samples) containing an image corresponding to forensic object data is placed.

In the ptbl box, the following information is furthermore placed for each encryption sample. That is, in the ptbl box, there are placed, for each encryption sample, trun_number indicating the number of the trun box which manages the encryption sample and sample_number indicating the number of the encryption sample, as encryption object specifying information that specifies an encryption sample. Furthermore, in the ptbl box, there is placed, for each encryption sample, table_count indicating how many locations in encoded image data of the encryption sample forensic object data is placed at.

Furthermore, in the ptbl box, the following information is placed for each piece of forensic object data. That is, in the ptbl box, pattern_start_offset indicating a start position on encoded image data of video content in which forensic object data is to be placed is placed as data position information. The pattern_start_offset indicates, for example, the number of bytes from a beginning of encoded image data of an encryption sample containing forensic object data to the forensic object data.

In the ptbl box, there are also placed pattern_size (size information) indicating the byte length (size) of encrypted data corresponding to forensic object data, and table_offset (position information) representing the number of bytes from a starting point as the position, in an image file, of the beginning of an encrypted data group corresponding to forensic object data and encrypted with a plurality of keys.

It is noted that an example of the encrypting method of pattern data to be adopted includes AES-CTR defined in ISO/IEC 23001-7, and the sizes of pattern data before and after encryption are the same. Also, the starting point can be, for example, the same as the starting point in data_offset in the trun box. Furthermore, although table_offset is 32 bits in the example of FIG. 3, it may be 64 bits depending on version of the ptbl box.

In the ptbl box, there is further placed pattern_count indicating the number of patterns of pattern data corresponding to forensic object data. Also, in the ptbl box, there are placed, by the number of patterns, patKID that is information for specifying a key (a key used for decryption) which has been used for the encryption of pattern data of the pattern, and patIV indicating the value of Initial Vector for the decryption of the encrypted data encrypted with the key.

The bit length of patIV is eight times IV_Size, and the IV_Size has a value indicated in, for example, a tenc box or an sgpd box (grouping_type is "seig") of ISO/IEC 23001-7.

Multiple pieces of encrypted data each having been encrypted with the key specified by patKID and having a length of pattern_size are consecutively placed by the number of keys indicated by pattern_count, from table_offset, in the placement order of patKID. Therefore, it can be said that the placement order of patKID, pattern_size, and table_offset are encrypted data position information indicating the position in an image file of the encrypted data corresponding to a key specified by each patKID.

Since the ptbl box is configured as described above, the video reproducing terminal 14 can recognize an encryption sample on the basis of trun_number and sample_number. Then, when reproducing the encryption sample, the video reproducing terminal 14 accesses encrypted data which can be decrypted by the video reproducing terminal 14 on the basis of pattern_size, table_offset, and patKID of a key retained by the video reproducing terminal 14.

The video reproducing terminal 14 decrypts the encrypted data on the basis of a key retained by the video reproducing terminal 14 and patIV corresponding to the key. Then, the video reproducing terminal 14 places (inserts) the decrypted pattern data into a predetermined position on encoded image data of the encryption sample on the basis of pattern_start_offset, and decodes the placed pattern data to generate image data of the encryption sample.

It is noted that all samples in movie fragment may be numbered in order from 1, thereby to delete length_size_of_trun_num and trun_number from the ptbl box. That is, since numbering all samples in movie fragment in order from 1 enables an encryption sample to be specified by the number of the sample, trun_number indicating the number of the trun box which manages the encryption sample does not need to be described in the ptbl box. Therefore, length_size_of_trun_num which represents the number of bytes of trun_number also does not need to be described.

(Configuration Example of Mdat Box)

Figure 4:
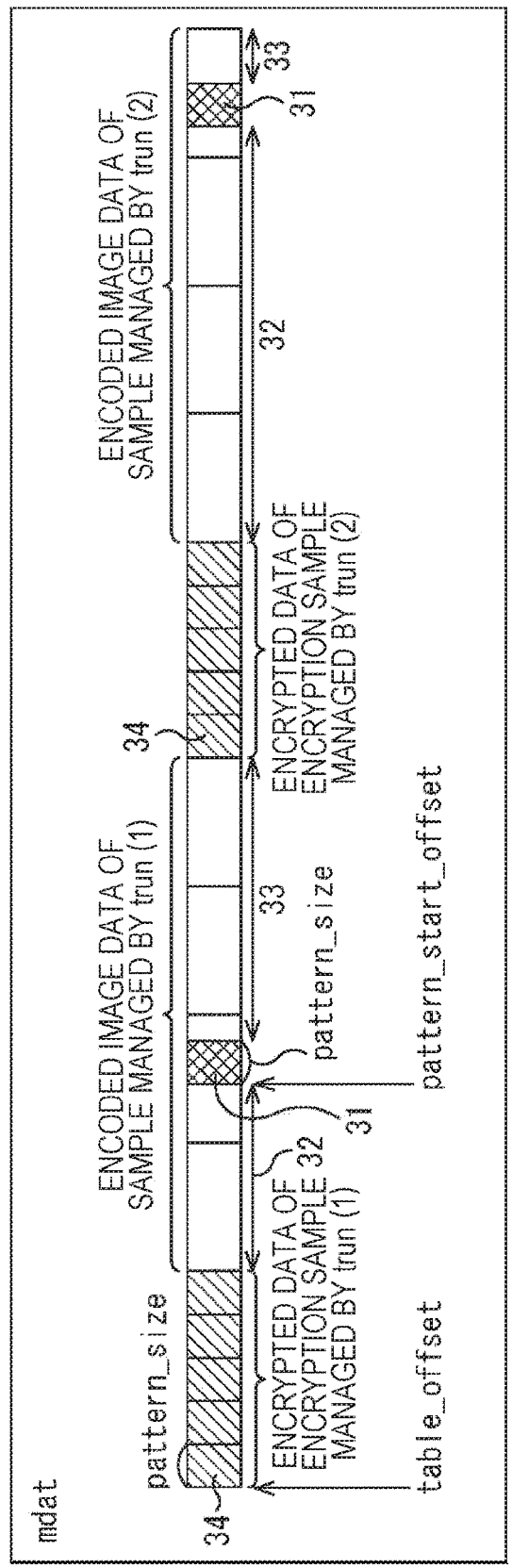
FIG. 4 is a diagram illustrating a configuration example of an mdat box.
Figure 5:
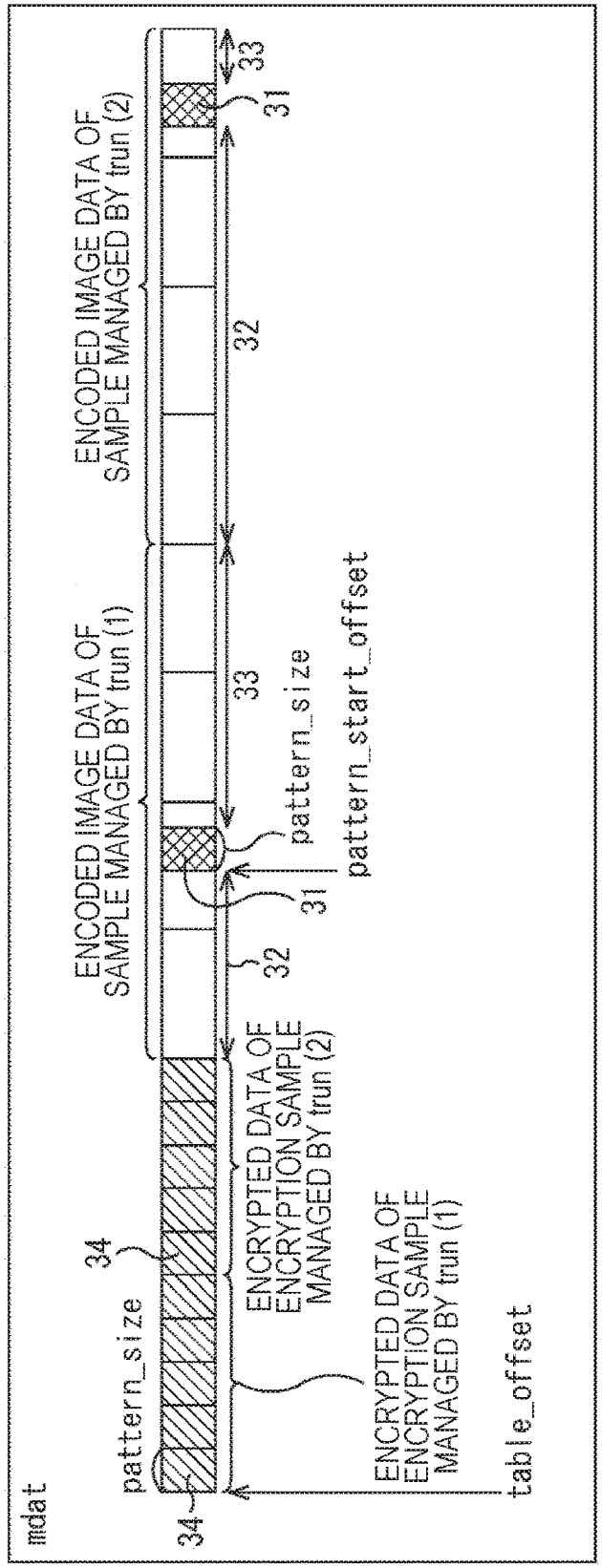
FIG. 5 is a diagram illustrating a configuration example of an mdat box.
Figure 6:
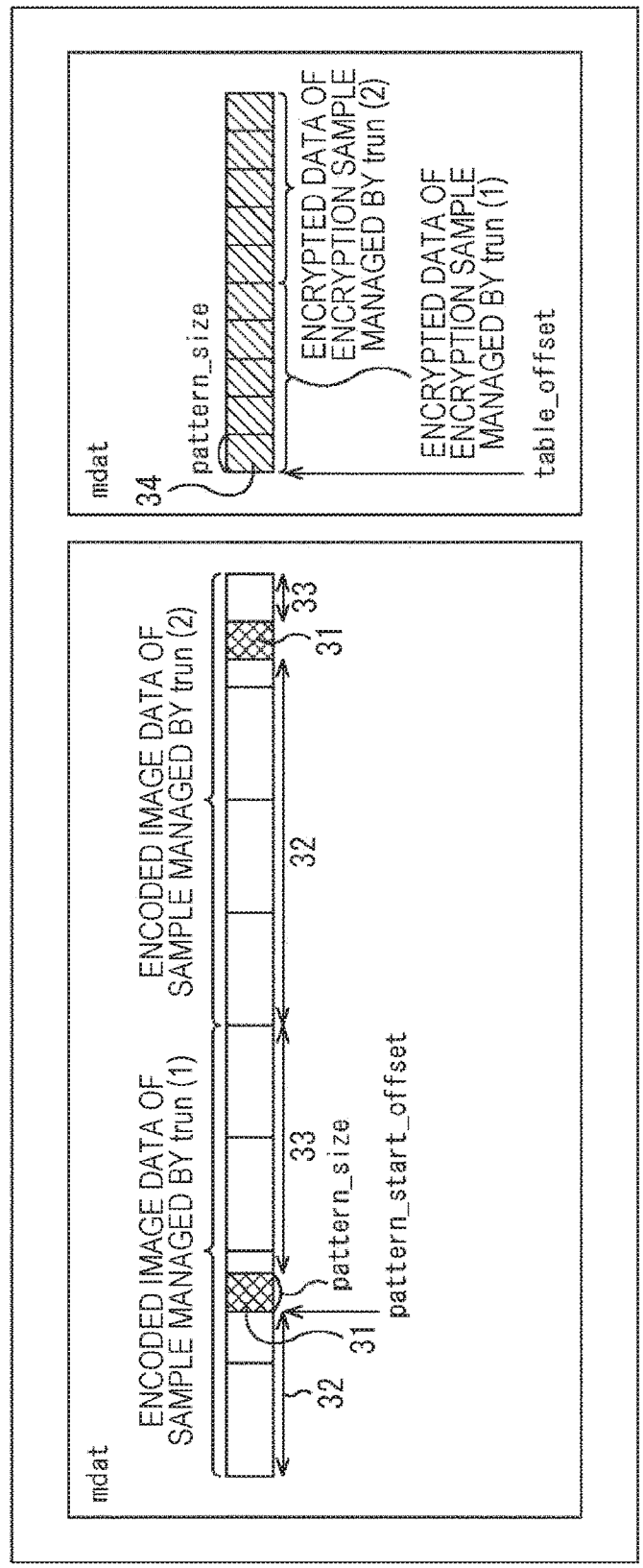
FIG. 6 is a diagram illustrating a configuration example of an mdat box.

FIG. 4 to FIG. 6 are each a diagram illustrating a configuration example of the mdat box.

In the mdat box of each of FIG. 4 to FIG. 6, there is placed encoded image data, of video content, in which dummy data 31 having the same size as forensic object data is placed in the position where the forensic object data is to be placed. That is, in the mdat box of each of FIG. 4 to FIG. 6, unencrypted data 32 before forensic object data, and unencrypted data 33 after forensic object data, are connected and placed via the dummy data 31 having the same size as forensic object data.

When the dummy data 31 is placed in the region of forensic object data in this manner, the contents of the moof box excluding the ptbl box can be the same as those when forensic information is not embedded. Therefore, the video reproducing terminal 14 can perform reproduction processing similar to when forensic information is not embedded, by merely replacing the dummy data 31 with pattern data on the basis of the ptbl box.

Also, encrypted data 34 can be placed, for example, as illustrated in FIG. 4, in the mdat box for each trun box which manages a corresponding encryption sample. In the example of FIG. 4, the encrypted data 34 of an encryption sample managed by each trun box is placed before encoded image data in a sample group (a chunk) managed by the trun box. However, the encrypted data 34 may be placed after the encoded image data. It is noted that in the examples of FIG. 4 to FIG. 6, in any encryption sample, one forensic object data is placed, and the pattern data corresponding to the forensic object data has five patterns.

The encrypted data 34 can also be collectively placed in the mdat box as illustrated in FIG. 5. In the example of FIG. 5, the encrypted data 34 is collectively placed at the beginning of the mdat box. However, the encrypted data 34 may be collectively placed at the end.

The encrypted data 34 can also be placed in a different mdat box in one image file, as illustrated in FIG. 6.

Although not illustrated, the encrypted data may be placed in an image file different from that of unencrypted data. Also, in the examples of FIG. 4 to FIG. 6, dummy data is placed instead of forensic object data. However, encrypted data of pattern data for one pattern corresponding to the forensic object data may be placed instead of dummy data.

(Configuration Example of File Generating Apparatus)

Figure 7:
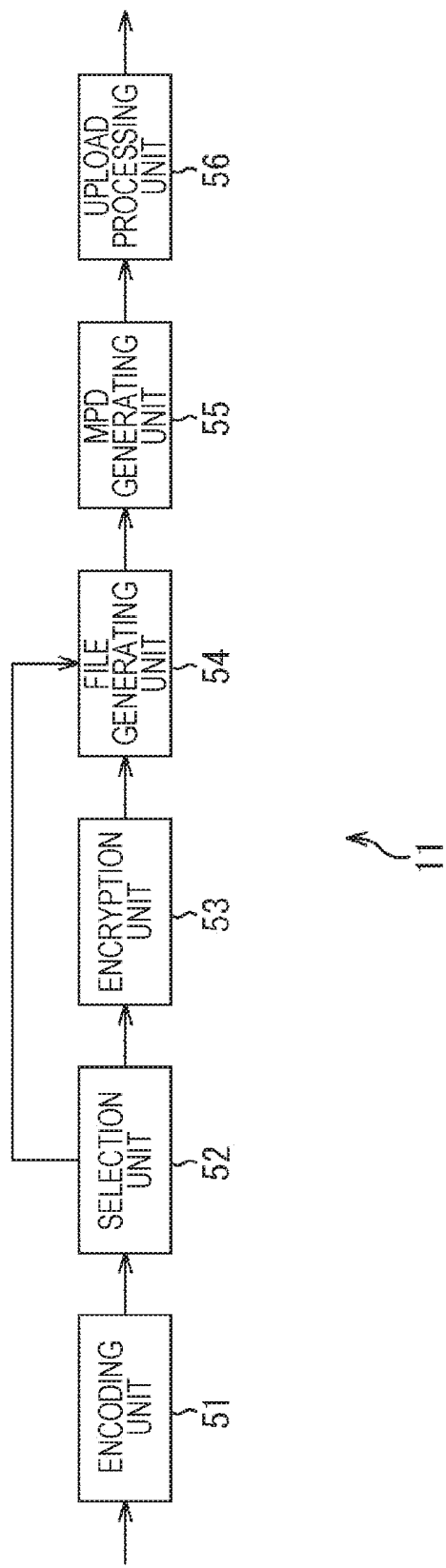
FIG. 7 is a block diagram illustrating a configuration example of a file generating apparatus of FIG. 1.

FIG. 7 is a block diagram illustrating a configuration example of the file generating apparatus 11 of FIG. 1.

The file generating apparatus 11 of FIG. 7 includes an encoding unit 51, a selection unit 52, an encryption unit 53, a file generating unit 54, an MPD generating unit 55, and an upload processing unit 56.

The encoding unit 51 of the file generating apparatus 11 encodes externally inputted image data of video content to generate encoded image data. Also, the encoding unit 51 selects at least part of the encoded image data as forensic object data, and generates multiple pieces of pattern data regarding the forensic object data. It is noted that the pattern data may be generated by selecting at least part of inputted image data, performing to the data various processes such as embedding of various watermarks, and thereafter individually encoding the processed data. The encoding unit 51 supplies the encoded image data and the pattern data to the selection unit 52.

The selection unit 52 supplies the multiple pieces of pattern data supplied from the encoding unit 51 to the encryption unit 53. Also, the selection unit 52 places dummy data at a location where forensic object data is placed in the encoded image data supplied from the encoding unit 51, and supplies the resultant data to the file generating unit 54.

The encryption unit 53 encrypts the multiple pieces of pattern data supplied from the encoding unit 51 with unique keys for each piece of forensic object data to generate encrypted data. The encryption unit 53 supplies the generated encrypted data to the file generating unit 54.

The file generating unit 54 creates, for each segment, a file containing the encoded image data supplied from the selection unit 52, the encrypted data supplied from the encryption unit 53, and management information for accessing the encoded image data and the encrypted data, and supplies the resultant image file (FIG. 2) to the MPD generating unit 55.

The MPD generating unit 55 generates an MPD file in which the URL of the Web server 12 for storing the image file supplied from the file generating unit 54 and the like are placed. The MPD generating unit 55 supplies the MPD file and the image file to the upload processing unit 56.

The upload processing unit 56 acts as a transmission unit, and uploads (transmits) the image file and the MPD file supplied from the MPD generating unit 55 to the Web server 12.

(Description of Processing of File Generating Apparatus)

Figure 8:
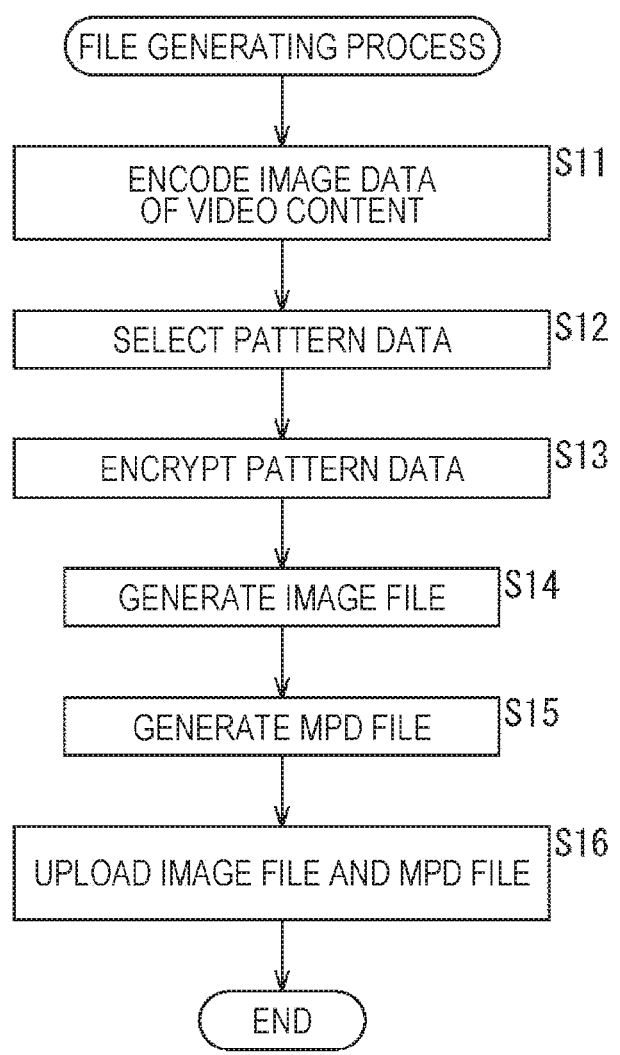
FIG. 8 is a flowchart describing a file generating process by the file generating apparatus of FIG. 7.

FIG. 8 is a flowchart describing a file generating process by the file generating apparatus 11 of FIG. 7.

In step S11 of FIG. 8, the encoding unit 51 of the file generating apparatus 11 encodes externally inputted image data of video content to generate encoded image data. Also, the encoding unit 51 selects at least part of the encoded image data as forensic object data, and generates multiple pieces of pattern data regarding the forensic object data. It is noted that the pattern data may be generated by selecting at least part of inputted image data, performing to the data various processes such as embedding of various watermarks, and thereafter individually encoding the processed data. The encoding unit 51 supplies the encoded image data and the pattern data to the selection unit 52.

In step S12, the selection unit 52 selects the pattern data supplied from the encoding unit 51, and supplies the selected pattern data to the encryption unit 53. Also, the selection unit 52 places dummy data at a location where forensic object data is placed in the encoded image data supplied from the encoding unit 51, and supplies the resultant data to the file generating unit 54.

In step S13, the encryption unit 53 encrypts the multiple pieces of pattern data supplied from the selection unit 52 with unique keys for each piece of forensic object data to generate encrypted data. The encryption unit 53 supplies the generated encrypted data to the file generating unit 54.

In step S14, the file generating unit 54 creates, for each segment, a file containing the encoded image data supplied from the selection unit 52, the encrypted data supplied from the encryption unit 53, and management information for accessing the encoded image data and the encrypted data, thereby to generate an image file. The file generating unit 54 supplies the generated image file to the MPD generating unit 55.

In step S15, the MPD generating unit 55 generates an MPD file containing URLs in the Web server 12 in which the image files supplied from the file generating unit 54 and the like are stored. The MPD generating unit 55 supplies the MPD file and the image file to the upload processing unit 56.

In step S16, the upload processing unit 56 uploads the image file and the MPD file supplied from the MPD generating unit 55 to the Web server 12, and ends the processing.

(Configuration Example of Streaming Reproduction Unit)

Figure 9:
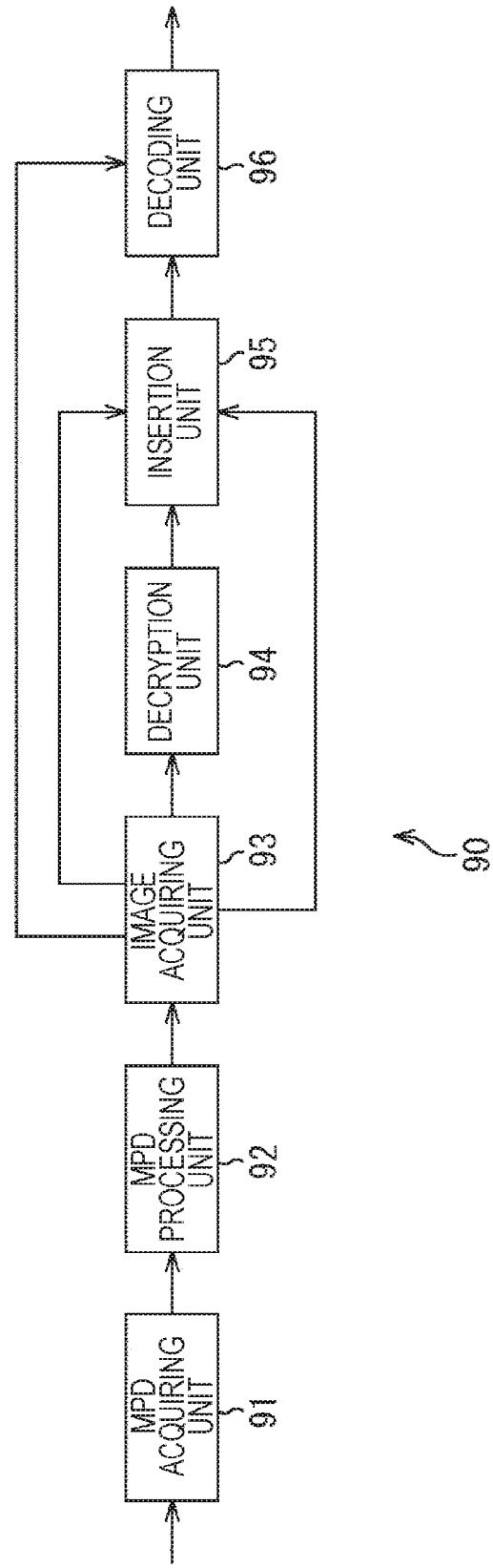
FIG. 9 is a block diagram illustrating a configuration example of a first embodiment of a streaming reproduction unit to which the present disclosure is applied.

FIG. 9 is a block diagram illustrating a configuration example of a streaming reproduction unit achieved by the video reproducing terminal 14 of FIG. 1 through the execution of the control software 21, the video reproducing software 22, and the access software 23.

A streaming reproduction unit 90 of FIG. 9 includes an MPD acquiring unit 91, an MPD processing unit 92, an image acquiring unit 93, a decryption unit 94, an insertion unit 95, and a decoding unit 96.

The MPD acquiring unit 91 of the streaming reproduction unit 90 acquires an MPD file from the Web server 12, and supplies the acquired MPD file to the MPD processing unit 92.

The MPD processing unit 92 extracts, for example, URLs in the Web server 12 in which image files are stored, from the MPD file supplied from the MPD acquiring unit 91, and supplies the extracted data to the image acquiring unit 93.

The image acquiring unit 93 acts as a receiving unit. That is, the image acquiring unit 93 requests a current image file to the Web server 12 on the basis of the URL of a current image file among the URLs supplied from the MPD processing unit 92, and receives the requested image file. Also, the image acquiring unit 93 judges whether a current sample is an encryption sample, on the basis of a ptbl box in the current image file.

When it is judged that the current sample is an encryption sample, the image acquiring unit 93 reads, from the image file, encrypted data of the current encryption sample corresponding to a key retained by the video reproducing terminal 14 on the basis of the ptbl box, and supplies the read encrypted data to the decryption unit 94. Also, the image acquiring unit 93 reads, from the image file, encoded image data including unencrypted data and dummy data of the current encryption sample on the basis of a trun box, and supplies the read encoded image data to the insertion unit 95. Furthermore, the image acquiring unit 93 supplies pattern_start_offset of the current encryption sample contained in the ptbl box to the insertion unit 95.

On the other hand, when it is judged that the current sample is not an encryption sample, the image acquiring unit 93 reads unencrypted data of the current sample on the basis of a trun box, and supplies the read unencrypted data as encoded image data to the decoding unit 96.

The decryption unit 94 decrypts the encrypted data supplied from the image acquiring unit 93 with a key retained by the video reproducing terminal 14 to generate pattern data. The decryption unit 94 supplies the pattern data to the insertion unit 95.

The insertion unit 95 replaces the dummy data in the encoded image data supplied from the image acquiring unit 93 with the pattern data supplied from the decryption unit 94 on the basis of pattern_start_offset supplied from the image acquiring unit 93. This causes the insertion unit 95 to insert the pattern data into the unencrypted data. The insertion unit 95 supplies the decoding unit 96 with the encoded image data into which the pattern data has been inserted.

The decoding unit 96 decodes the encoded image data supplied from the image acquiring unit 93 or the insertion unit 95. The decoding unit 96 outputs the resultant image data as image data of video content. It is noted that when encoded image data is encrypted with a key different from the key used for the encryption of pattern data, decoding is performed after decryption of the encryption.

It is noted that although the video reproducing terminal 14 is configured in this specification to deal with only the reproduction of an image file in which forensic information is embedded, it may be configured to also deal with the reproduction of a normal image file in which forensic information is not embedded.

In this case, the video reproducing terminal 14 judges whether forensic information is embedded in an image file, on the basis of, for example, the value of scheme_type in a schi box which is defined in ISOBMFF as information indicating an encryption technique. For example, when the value of scheme_type is a code of "venc", the video reproducing terminal 14 judges that forensic information is embedded in an image file.

Also, the video reproducing terminal 14 can judge whether forensic information is embedded in an image file, on the basis of the extension and MIME-type of an image file. In this case, for example, when the extension of an image file is "venc", the video reproducing terminal 14 judges that forensic information is embedded in the image file.

Furthermore, the video reproducing terminal 14 can also judge whether forensic information is embedded in an image file, on the basis of the value of value attribute contained in Content Protection element of an MPD file. In this case, for example, when the value of value attribute is a code of "venc", the video reproducing terminal 14 judges that forensic information is embedded in the image file.

(Description of Insertion of Pattern Data)

Figure 10:
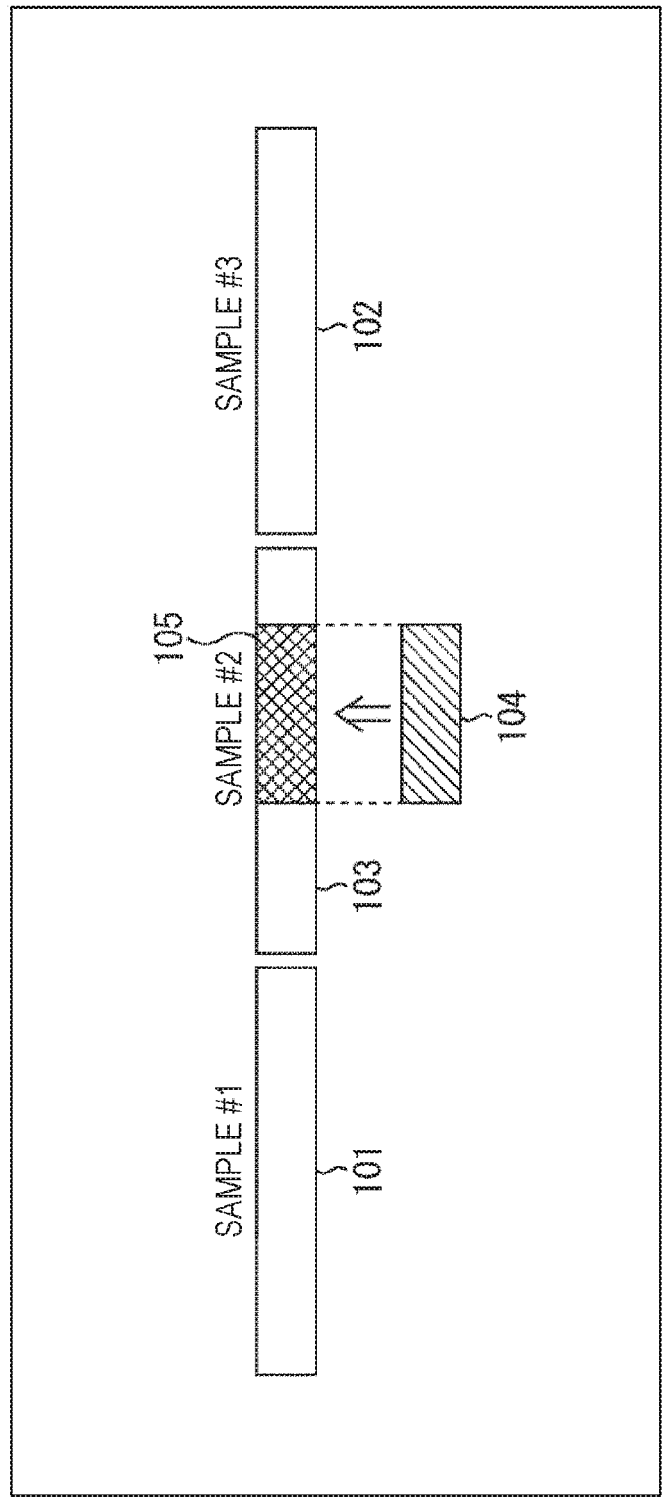
FIG. 10 is a diagram describing insertion of pattern data by an insertion unit of FIG. 9.

FIG. 10 is a diagram describing insertion of pattern data by the insertion unit 95 of FIG. 9.

In the example of FIG. 10, sample #1 whose sample_number is 1 and sample #3 whose sample_number is 3 are not encryption samples, while sample #2 whose sample_number is 2 is an encryption sample.

In this case, when a current sample is sample #1, encoded image data of the current sample is wholly unencrypted data 101. Therefore, the unencrypted data 101 is directly supplied from the image acquiring unit 93 to the decoding unit 96. When a current sample is sample #3, unencrypted data 102 is also directly supplied to the decoding unit 96 in a similar manner.

On the other hand, when a current sample is sample #2, pattern data corresponding to forensic object data of the current sample has been encrypted. Therefore, the decryption unit 94 decrypts the encrypted data to generate pattern data 104. Also, encoded image data of the current sample includes unencrypted data 103 and dummy data 105 which is placed in the middle of the unencrypted data 103.

The insertion unit 95 replaces the dummy data 105 in the encoded image data of the current sample with the pattern data 104, thereby to insert the pattern data 104 into the unencrypted data 103, on the basis of pattern_start_offset contained in a ptbl box.

(Description of Processing by Video Reproducing Terminal)

Figure 11:
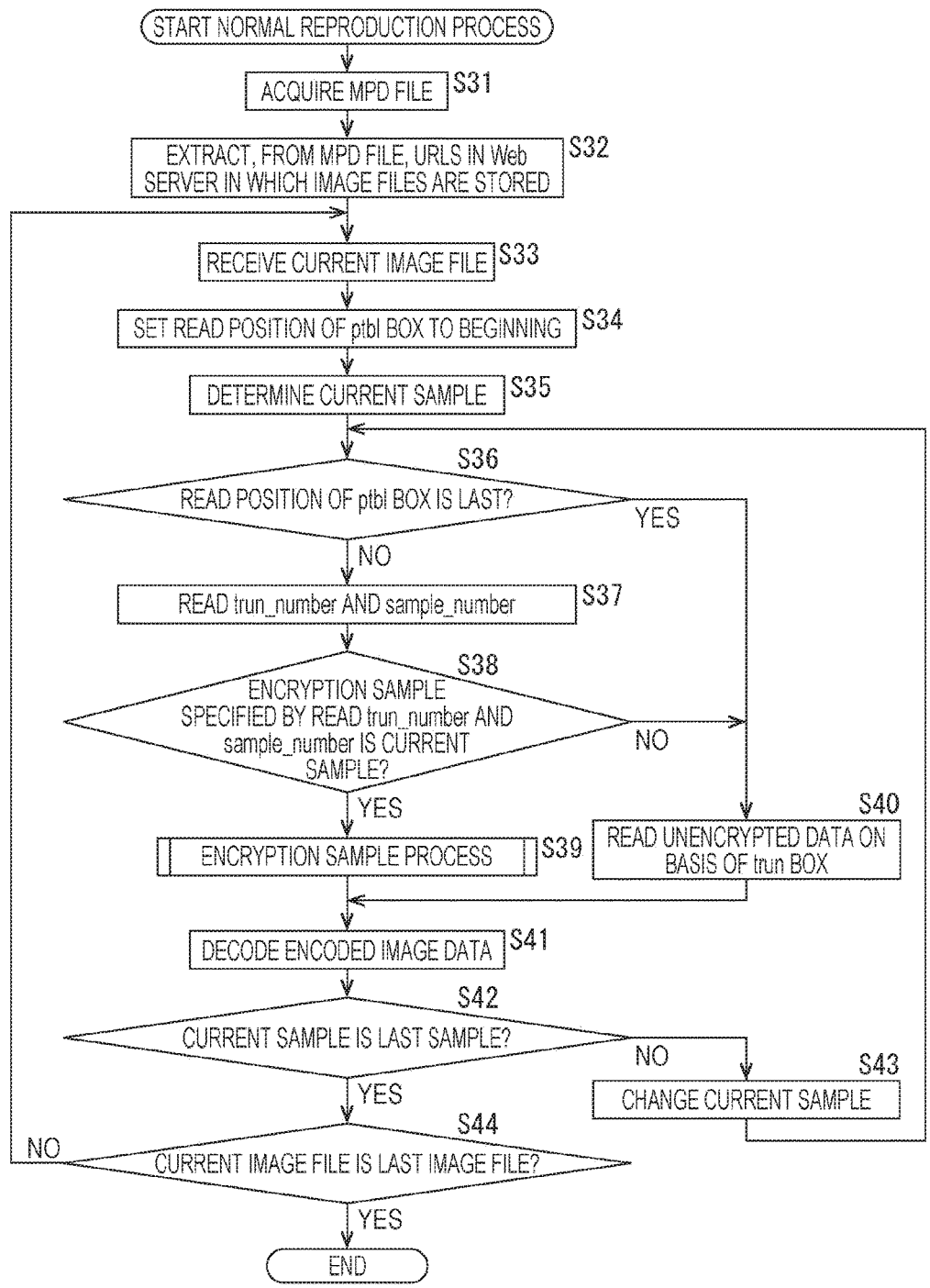
FIG. 11 is a flowchart describing normal reproduction processing by the streaming reproduction unit of FIG. 9.

FIG. 11 is a flowchart describing normal reproduction processing by the streaming reproduction unit 90 (FIG. 9) of the video reproducing terminal 14.

In step S31 of FIG. 11, the MPD acquiring unit 91 of the streaming reproduction unit 90 acquires an MPD file from the Web server 12, and supplies the acquired MPD file to the MPD processing unit 92.

In step S32, the MPD processing unit 92 extracts, for example, URLs in the Web server 12 in which image files are stored, from the MPD file supplied from the MPD acquiring unit 91, and supplies the extracted data to the image acquiring unit 93.

In step S33, the image acquiring unit 93 requests a current image file to the Web server 12 on the basis of the URL of a current image file among the URLs supplied from the MPD processing unit 92, and receives the requested image file. It is noted that the image acquiring unit 93 defines, in the first step S33, a beginning image file of video content to be a current image file.

In step S34, the image acquiring unit 93 sets the read position of a ptbl box in the image file received in step S33 to be the beginning of the ptbl box. In step S35, the image acquiring unit 93 determines a beginning sample in the image file received in step S33 as a current sample.

In step S36, the image acquiring unit 93 judges whether reading of the ptbl box has been already completed so that the read position of the ptbl box has become the end of the ptbl box. When it is judged in step S36 that the read position of the ptbl box has not become the last, the processing proceeds to step S37.

In step S37, the image acquiring unit 93 starts reading from the read position of the ptbl box, and reads trun_number and sample_number. In step S38, the image acquiring unit 93 judges whether an encryption sample specified by trun_number and sample_number read in step S37 is a current sample.

Specifically, the image acquiring unit 93 always recognizes trun number on the basis of the ordinal number of a turn box which manages a current sample in a traf box. Furthermore, the image acquiring unit 93 always recognizes sample number on the basis of the ordinal number of a current sample from the beginning of the samples managed in a trun box. When the read trun_number and sample_number are the recognized number of a trun box and the recognized number of a sample, the image acquiring unit 93 judges that an encryption sample specified by the read trun_number and sample_number is a current sample. On the other hand, when the read trun_number and sample_number are not the recognized number of a trun box and the recognized number of a sample, the image acquiring unit 93 judges that an encryption sample specified with the read trun_number and sample_number is not a current sample, and does not move the read position of the ptbl box forward.

When it is judged in step S38 that the encryption sample is a current sample, the processing proceeds to step S39. In step S39, the image acquiring unit 93 performs an encryption sample process of generating encoded image data of the encryption sample. Details of this encryption sample process will be described with reference to FIG. 12 described later. After the completion of the processing of step S39, the read position of the ptbl box becomes the position for the next encryption sample.

On the other hand, when it is judged in step S36 that the read position of the ptbl box has become the end, or when it is judged in step S38 that the encryption sample is not a current sample, the processing proceeds to step S40.

In step S40, the image acquiring unit 93 reads unencrypted data of the current sample on the basis of a trun box, and supplies the read unencrypted data as encoded image data to the decoding unit 96.

After the processing of steps S39 and S40, the processing proceeds to step S41. In step S41, the decoding unit 96 decodes the encoded image data supplied from the image acquiring unit 93 or the insertion unit 95, and outputs the resultant image data as image data of video content.

In step S42, the image acquiring unit 93 judges whether a current sample is the last sample corresponding to encoded image data contained in the current image file. For example, when the image file contains only one Movie Fragment, it is judged in step S42 whether a current sample is the last sample managed by one Movie Fragment contained in the current image file. On the other hand, when the image file contains only a plurality of Movie Fragments, samples managed by each of the Movie Fragments are sequentially defined as a current sample, and it is judged in step S42 whether a current sample is the last of the samples managed by all Movie Fragments contained in the current image file. When it is judged in step S42 that a current sample is not the last sample, the processing proceeds to step S43.

In step S43, the image acquiring unit 93 changes a current sample to the next sample. Then, the processing returns to step S36, and the processing of steps S36 to S43 is repeated until it is judged that a current sample is the last sample.

On the other hand, when it is judged in step S42 that a current sample is the last sample, the image acquiring unit 93 judges in step S44 whether a current image file is the last image file of video content. When it is judged in step S44 that a current image file is not the last image file, the image acquiring unit 93 defines the next image file as a current image file, and returns the processing to step S33. Thus, the processing of steps S33 to S44 is performed to the new image file.

Also, when it is judged in step S44 that a current image file is the last image file, the processing ends.

Figure 12:
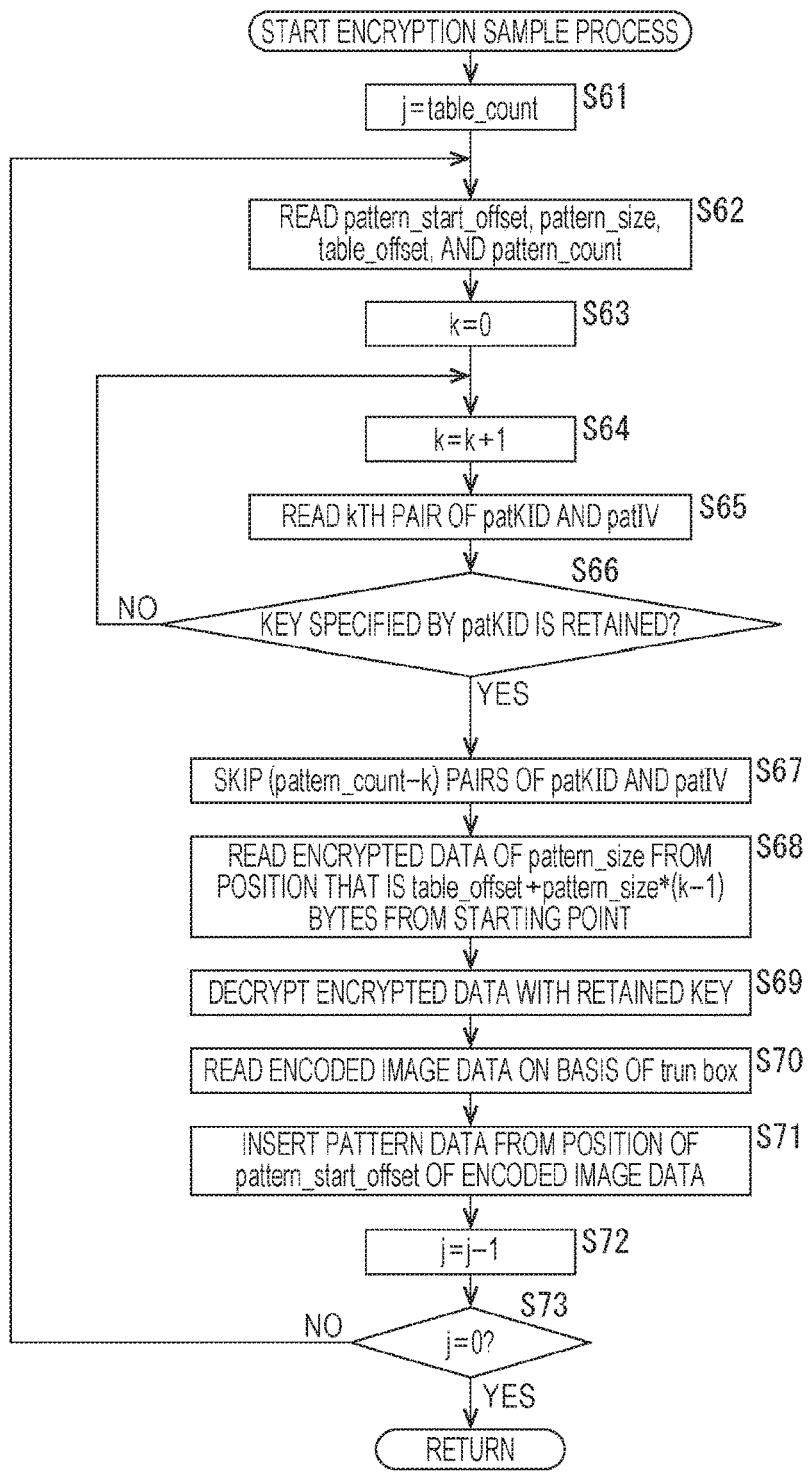
FIG. 12 is a flowchart describing details of an encryption sample process of FIG. 11.

FIG. 12 is a flowchart describing details of the encryption sample process of step S39 in FIG. 11.

In step S61 of FIG. 12, the image acquiring unit 93 moves the read position of a ptbl box to the immediately following table_count and reads table_count to set the read data as count value j. In step S62, the image acquiring unit 93 moves the read position of the ptbl box to the next pattern_start_offset, and reads pattern_start_offset, pattern_size, table_offset, and pattern_count. The image acquiring unit 93 supplies pattern_start_offset to the insertion unit 95.

In step S63, the image acquiring unit 93 sets count value k to be 0. In step S64, the image acquiring unit 93 increments count value k by one. In step S65, the image acquiring unit 93 moves the read position of the ptbl box to the kth patKID, and reads a pair of kth patKID and patIV.

In step S66, the image acquiring unit 93 judges whether the video reproducing terminal 14 retains a key specified by patKID. When it is judged in step S66 that a key specified by patKID is not retained, the processing returns to step S64, and the processing of step S64 and subsequent steps is repeated.

On the other hand, when it is judged in step S66 that a key specified by patKID is retained, the image acquiring unit 93 skips (pattern_count-k) pairs of patKID and patIV in step S67.

In step S68, the image acquiring unit 93 reads encrypted data of pattern_size, from the position that is table_offset+pattern_size*(k−1) bytes from the starting point of a current image file. Accordingly, encrypted data of a current encryption sample corresponding to a key retained by the video reproducing terminal 14 is read. The image acquiring unit 93 supplies the read encrypted data to the decryption unit 94.

In step S69, the decryption unit 94 decrypts the encrypted data supplied from the image acquiring unit 93 with a key retained by the video reproducing terminal 14 to generate pattern data. The decryption unit 94 supplies the pattern data to the insertion unit 95.

In step S70, the image acquiring unit 93 reads, from an image file, encoded image data including unencrypted data and dummy data of a current encryption sample on the basis of a trun box, and supplies the read encoded image data to the insertion unit 95.

In step S71, the insertion unit 95 inserts the pattern data supplied from the decryption unit 94, from the position of pattern_start_offset of the encoded image data supplied from the image acquiring unit 93. Accordingly, the dummy data contained in the encoded image data of the current encryption sample is replaced with the pattern data. The insertion unit 95 supplies the decoding unit 96 with the encoded image data into which the pattern data has been inserted.

In step S72, the image acquiring unit 93 decrements count value j by one. In step S73, the image acquiring unit 93 judges whether count value j is 0. When it is judged in step S73 that count value j is not 0, that is, when there is, in the encryption sample, encrypted data which has been encrypted with a key retained by the video reproducing terminal 14 and has not yet decrypted, the processing returns to step S62. Then, the processing of steps S62 to S73 is repeated until count value j becomes 0.

On the other hand, when it is judged in step S73 that count value j is 0, that is, when all pieces of encrypted data, in the encryption sample, which have been encrypted with keys retained by the video reproducing terminal 14 have been decrypted, the processing proceeds from step S39 to step S41 of FIG. 11.

It is noted that the streaming reproduction unit 90 can perform not only normal reproduction of reproducing from a beginning sample in a beginning image file, but also random reproduction of reproducing from a time desired by a user. The random reproduction processing by the streaming reproduction unit 90 is similar to the normal reproduction processing of FIG. 11, except that a read start position determining process of determining the read start position of a ptbl box is performed between step S35 and step S36 of FIG. 11, and the first current sample is a sample of a time desired by a user. Therefore, only the read start position determining process will be described below. It is noted that the Movie Fragment and sample of a time desired by a user and the trun box for managing the sample are specified using a sidx box or ssix box of ISOBMFF before the processing of step S33 of FIG. 11.

Figure 13:
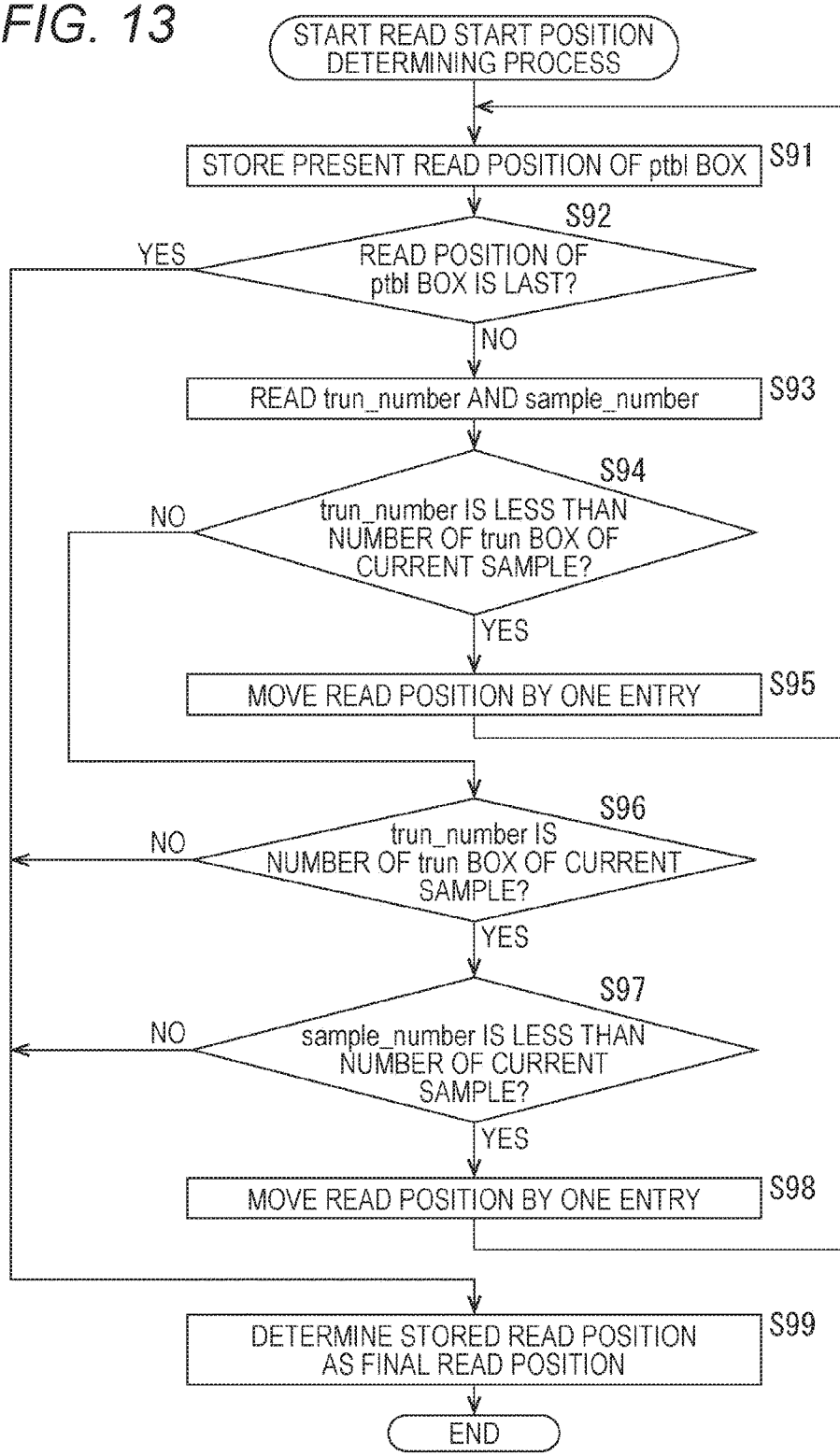
FIG. 13 is a flowchart describing a read start position determining process by the streaming reproduction unit of FIG. 9.

FIG. 13 is a flowchart describing the read start position determining process by the streaming reproduction unit 90.

In step S91 of FIG. 13, the image acquiring unit 93 stores a currently set read position of a ptbl box. In step S92, the image acquiring unit 93 judges whether the stored read position of the ptbl box is the last of the ptbl box. When it is judged in step S92 that the stored read position of the ptbl box is not the last of the ptbl box, the processing proceeds to step S93.

In step S93, the image acquiring unit 93 starts reading from the read position of the ptbl box, and reads trun_number and sample_number. In step S94, the image acquiring unit 93 judges whether the read trun_number is less than the number of the trun box for the current sample.

When it is judged in step S94 that the read trun_number is less than the number of the trun box for a current sample, the image acquiring unit 93 moves the read position by one entry in step S95. Specifically, the image acquiring unit 93 moves the read position to the position of the next trun_number when there is the next trun_number, and moves the read position to the last position of the ptbl box when there is not the next trun_number. That is, the image acquiring unit 93 moves the read position by the amount of information regarding an encryption sample specified by the read trun_number and sample_number. Then, the processing returns to step S91, and the processing of step S91 and subsequent steps is repeated.

On the other hand, when it is judged in step S94 that the read trun_number is not less than the number of the trun box for a current sample, the processing proceeds to step S96. In step S96, the image acquiring unit 93 judges whether the read trun_number is the number of the trun box for the current sample.

When it is judged in step S96 that the read trun_number is the number of the trun box for the current sample, the processing proceeds to step S97. In step S97, the image acquiring unit 93 judges whether the read sample_number is less than the number of the current sample. When it is judged in step S97 that the read sample_number is less than the number of the current sample, the image acquiring unit 93 moves the read position by one entry in step S98. Then, the processing returns to step S91, and the processing of step S91 and subsequent steps is repeated.

On the other hand, when it is judged in step S92 that the stored read position of the ptbl box is the last, the processing proceeds to step S99. Also, when it is judged in step S96 that the trun_number is not the number of the trun box for the current sample, the processing proceeds to step S99. Furthermore, when it is judged in step S97 that the read sample_number is not less than the number of the current sample, the processing proceeds to step S99.

In step S99, the image acquiring unit 93 determines the stored read position of the ptbl box to be the final read position of the ptbl box, and ends the processing.

Also, although not illustrated in the flowchart, the streaming reproduction unit 90 can perform trick play reproduction, in a similar manner to the random reproduction.

As described above, in the information processing system 10, the file generating apparatus 11 transmits encrypted data, unencrypted data, and data position information to the video reproducing terminal 14 via the Web server 12. Then, the video reproducing terminal 14 decrypts the encrypted data, and inserts pattern data obtained as a result of the decryption into the unencrypted data on the basis of the data position information. Therefore, the video reproducing terminal 14 can easily reproduce image data of video content by decoding the unencrypted data into which pattern data has been inserted, in a similar manner to when forensic information is not embedded.

That is, the information processing system 10 can transmit and reproduce encoded image data in which forensic information is embedded, merely by changing only processing regarding encrypted data.

Also, the file generating apparatus 11 transmits trun_number and sample_number of an encryption sample to the video reproducing terminal 14 via the Web server 12. Therefore, the video reproducing terminal 14 can easily judge whether a current sample is an encryption sample even in random reproduction and trick play reproduction.

It is noted that a ptbl box may not be placed in a traf box, and may instead be placed in a trun box for an encryption sample specified in a ptbl box. In this case, the trun box for an encryption sample specified in a ptbl box comes to be a trun box which contains the ptbl box. Therefore, length_size_of_trun_num and trun_number are not placed in a ptbl box.

Second Embodiment (Segment Structure Example of Image File)

FIG. 14 is a diagram illustrating a segment structure example of Media Segment of an image file in a second embodiment of the information processing system to which the present disclosure is applied.

The segment structure of FIG. 14 is the same as the segment structure of FIG. 2, except that the ptbl box is not provided, data position information and the like are contained as auxiliary information for encoded image data of an encryption sample (Sample Auxiliary Information) in the mdat box, and a saiz box and a saio box for managing Sample Auxiliary Information are contained in the traf box. That is, in the second embodiment, the ptbl box is not provided, and data position information and the like placed in the ptbl box in the first embodiment are placed as Sample Auxiliary Information for encoded image data of an encryption sample in the mdat box.

It is noted that although there are various methods as a method for retaining Sample Auxiliary Information in Movie Fragment, only one Movie Fragment is retained in the mdat box as described herein.

(Example of Syntax of Sample Auxiliary Information)

FIG. 15 is a diagram illustrating an example of the syntax of Sample Auxiliary Information in the second embodiment of the information processing system to which the present disclosure is applied.

In Sample Auxiliary Information, as illustrated in FIG. 15, table_count of a corresponding encryption sample is placed. Also, pattern_start_offset, pattern_size, table_offset, and pattern_count are placed for each piece of forensic object data contained in encoded image data of an encryption sample. Furthermore, patKID and patIV are placed by the number indicated by pattern_count.

It is noted that information representing the size of Sample Auxiliary Information, which is necessary for the access to Sample Auxiliary Information, is placed in the saiz box, and information representing the offset of Sample Auxiliary Information is placed in the saio box. The aux_info_type representing the use of Sample Auxiliary Information in these saiz box and saio box is, for example, "ptbl".

The configuration of the second embodiment of the information processing system is similar to the configuration of the information processing system 10 of FIG. 1, except that an image file has the segment structure of FIG. 14, and the configuration of the streaming reproduction unit is different. Therefore, only the streaming reproduction unit will be described below.

(Configuration Example of Streaming Reproduction Unit)

Figure 16:
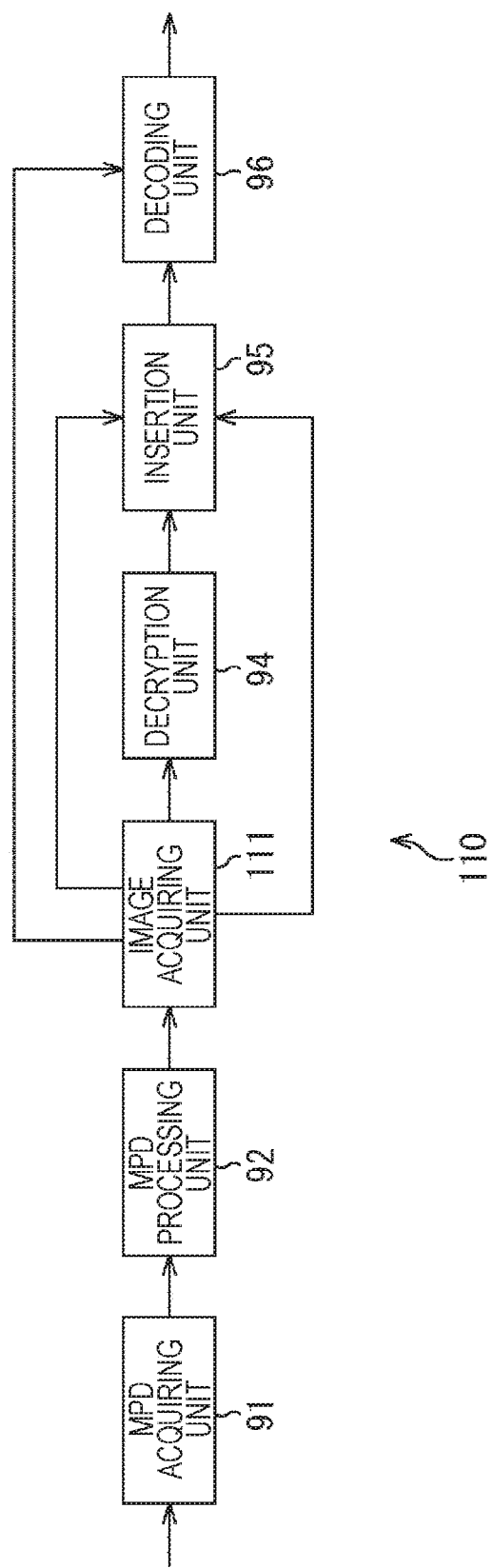
FIG. 16 is a block diagram illustrating a configuration example of a streaming reproduction unit in the second embodiment.

FIG. 16 is a block diagram illustrating a configuration example of the streaming reproduction unit in the second embodiment of the information processing system to which the present disclosure is applied.

Of the configuration illustrated in FIG. 16, the same configuration as the configuration of FIG. 9 is assigned with the same reference numeral. Redundant description will be appropriately omitted.

The configuration of a streaming reproduction unit 110 of FIG. 16 is different from the configuration of the streaming reproduction unit 90 of FIG. 9, in that an image acquiring unit 111 is disposed in place of the image acquiring unit 93.

The image acquiring unit 111 requests a current image file to the Web server 12 on the basis of the URL of a current image file among the URLs supplied from the MPD processing unit 92, and receives the requested image file. Also, the image acquiring unit 111 judges whether a current sample is an encryption sample, on the basis of Sample Auxiliary Information in the current image file.

When it is judged that the current sample is an encryption sample, the image acquiring unit 111 reads, from the image file, encrypted data of a current encryption sample corresponding to a key retained by the video reproducing terminal 14 on the basis of Sample Auxiliary Information, and supplies the read encrypted data to the decryption unit 94. Also, the image acquiring unit 111 reads, from the image file, encoded image data including unencrypted data and dummy data of the current encryption sample on the basis of a trun box, and supplies the read encoded image data to the insertion unit 95. Furthermore, the image acquiring unit 111 supplies pattern_start_offset of the current encryption sample contained in Sample Auxiliary Information to the insertion unit 95.

On the other hand, when it is judged that a current sample is not an encryption sample, the image acquiring unit 111 reads unencrypted data of the current sample on the basis of a trun box, and supplies the read unencrypted data as encoded image data to the decoding unit 96.

(Description of Processing by Streaming Reproduction Unit)

Figure 17:
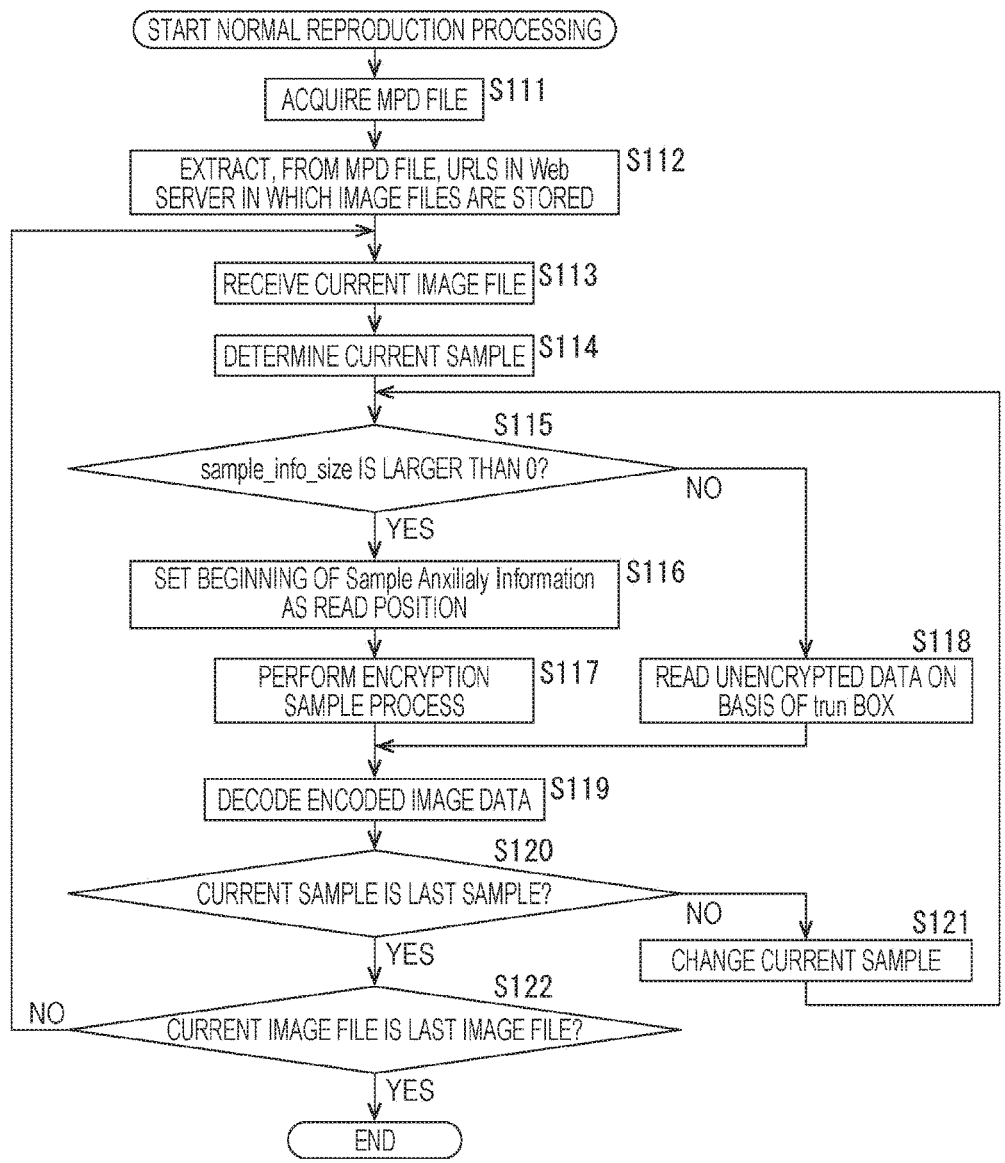
FIG. 17 is a flowchart describing normal reproduction processing by the streaming reproduction unit of FIG. 16.

FIG. 17 is a flowchart describing normal reproduction processing by the streaming reproduction unit 110 of FIG. 16.

Since the processing of steps S111 to S113 of FIG. 17 is similar to the processing of steps S31 to S33 of FIG. 11, the description will be omitted.

In step S114, the image acquiring unit 111 determines a beginning sample in the image file received in step S113 to be a current sample.

In step S115, the image acquiring unit 111 judges whether sample_info_size, which is described in a saiz box in the current image file and represents the size of Sample Auxiliary Information of the current sample, is more than 0.

When it is judged in step S115 that sample_info_size is more than 0, that is, when the current sample is an encryption sample, and the Sample Auxiliary Information of the current sample is contained in an mdat box of the image file, the processing proceeds to step S116.

In step S116, the image acquiring unit 111 sets a beginning position of Sample Auxiliary Information for the current encryption sample to be the read position of Sample Auxiliary Information. The beginning position of Sample Auxiliary Information for the current encryption sample is calculated as below from a saiz box and a saio box in the current image file. Both the saiz box and the saio box are contained in a traf box of Movie Fragment. The saiz box retains the sizes of corresponding Sample Auxiliary Information sequentially from the beginning for all samples in Movie Fragment, and the saio box retains the beginning position of Sample Auxiliary Information in an mdat box as offset information. Thus, the beginning position of Sample Auxiliary Information for a current encryption sample can be obtained by adding the total amount of the sizes of Sample Auxiliary Information for samples before the current encryption sample and the beginning position of Sample Auxiliary Information.

In step S117, the image acquiring unit 111 performs an encryption sample process. This encryption sample process is similar to the encryption sample process of FIG. 12, except that the ptbl box is replaced with Sample Auxiliary Information of a current encryption sample. After the processing of step S117, the processing proceeds to step S119.

When it is judged in step S115 that sample_info_size is not more than 0, that is, when a current sample is not an encryption sample, and Sample Auxiliary Information of a current sample is not contained in an mdat box of the image file, the processing proceeds to step S118. Since the processing of steps S118 to S122 is similar to the processing of steps S40 to S44 of FIG. 11, the description will be omitted.

It is noted that the streaming reproduction unit 110 can also perform random reproduction instead of normal reproduction, in a similar manner to the streaming reproduction unit 90. The random reproduction processing by the streaming reproduction unit 110 is similar to the normal reproduction processing of FIG. 17, except that it is determined in step S114 that the sample of a time desired by a user is a current sample.

Also, although the data position information and the like placed in the ptbl box in the first embodiment are placed in Sample Auxiliary Information in the second embodiment, they may be placed as data of a sample on a track different from the track of image data. A track represents a type of data, and is a unit that enables independent management of reproduction.

Third Embodiment (Segment Structure Example of Image File)

FIG. 18 is a diagram illustrating a segment structure example of Media Segment of an image file in a third embodiment of the information processing system to which the present disclosure is applied.

In the third embodiment, encrypted data is managed as a sample on a track different from unencrypted data and dummy data. However, the track of encrypted data and the track of unencrypted data and dummy data in a sample of forensic object data corresponding to the encrypted data are multiplexed in the same file.

As illustrated in FIG. 18, as a box regarding the track of encrypted data, an arun box containing data position information and the like is disposed instead of the trun box. The use of the arun box as a box regarding the track of encrypted data enables encrypted data for each encryption sample to be further divided for each key for management.

(Example of Syntax of arun Box)

FIG. 19 is a diagram illustrating an example of the syntax of the arun box of FIG. 18.

As illustrated in FIG. 19, in the arun box, in a similar manner to the trun box, sample_count representing the number of one or more consecutive samples managed in the arun box, and data_offset representing a beginning position of encrypted data of a beginning encryption sample are described. It is noted that the number of samples on the track of encrypted data is the same as the number of samples on the track of unencrypted data and dummy data into which the encrypted data is to be inserted, and sample_count in the arun box is both the number of samples containing encrypted data and the number of samples not containing encrypted data. Also, table_count is placed in the arun box for each sample managed in the arun box. The table_count has a value of 1 or more for a sample containing encrypted data, and 0 for a sample not containing encrypted data.

Furthermore, pattern_start_offset, pattern_size, and pattern_count are placed in the arun box for each piece of forensic object data. Also, patKID and patIV are placed by the number indicated by pattern_count.

The configuration of the third embodiment of the information processing system is similar to the configuration of the information processing system 10 of FIG. 1, except that an image file has the segment structure of FIG. 18, and the configuration of the streaming reproduction unit is different. Therefore, only the streaming reproduction unit will be described below.

(Configuration Example of Streaming Reproduction Unit)

Figure 20:
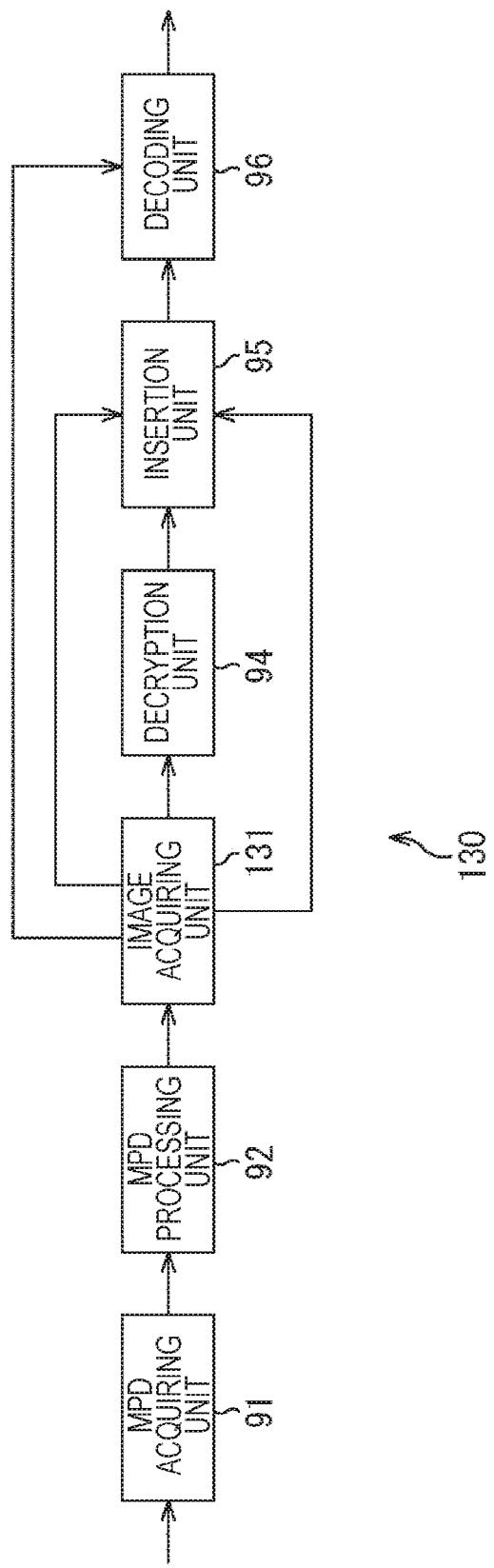
FIG. 20 is a block diagram illustrating a configuration example of a streaming reproduction unit in the third embodiment.

FIG. 20 is a block diagram illustrating a configuration example of the streaming reproduction unit in the third embodiment of the information processing system to which the present disclosure is applied.

Of the configuration illustrated in FIG. 20, the same configuration as the configuration of FIG. 9 is assigned with the same reference numeral. Redundant description will be appropriately omitted.

The configuration of a streaming reproduction unit 130 of FIG. 20 is different from the configuration of the streaming reproduction unit 90 of FIG. 9, in that an image acquiring unit 131 is disposed in place of the image acquiring unit 93.

The image acquiring unit 131 requests a current image file to the Web server 12 on the basis of the URL of a current image file among the URLs supplied from the MPD processing unit 92, and receives the requested image file. Also, the image acquiring unit 131 judges whether a current sample is an encryption sample, on the basis of, for example, whether the arun box retains encrypted data for the current sample.

When it is judged that a current sample is an encryption sample, the image acquiring unit 131 reads, from the image file, encrypted data of the current encryption sample corresponding to a key retained by the video reproducing terminal 14 on the basis of the arun box, and supplies the read encrypted data to the decryption unit 94. Also, the image acquiring unit 131 further reads, from the image file, encoded image data including unencrypted data and dummy data of the current encryption sample on the basis of the trun box, and supplies the read encoded image data to the insertion unit 95. Furthermore, the image acquiring unit 131 supplies pattern_start_offset contained in the arun box to the insertion unit 95.

On the other hand, when it is judged that a current sample is not an encryption sample, the image acquiring unit 131 reads unencrypted data of the current sample on the basis of the trun box, and supplies the read unencrypted data as encoded image data to the decoding unit 96.

(Description of Processing by Streaming Reproduction Unit)

Figure 21:
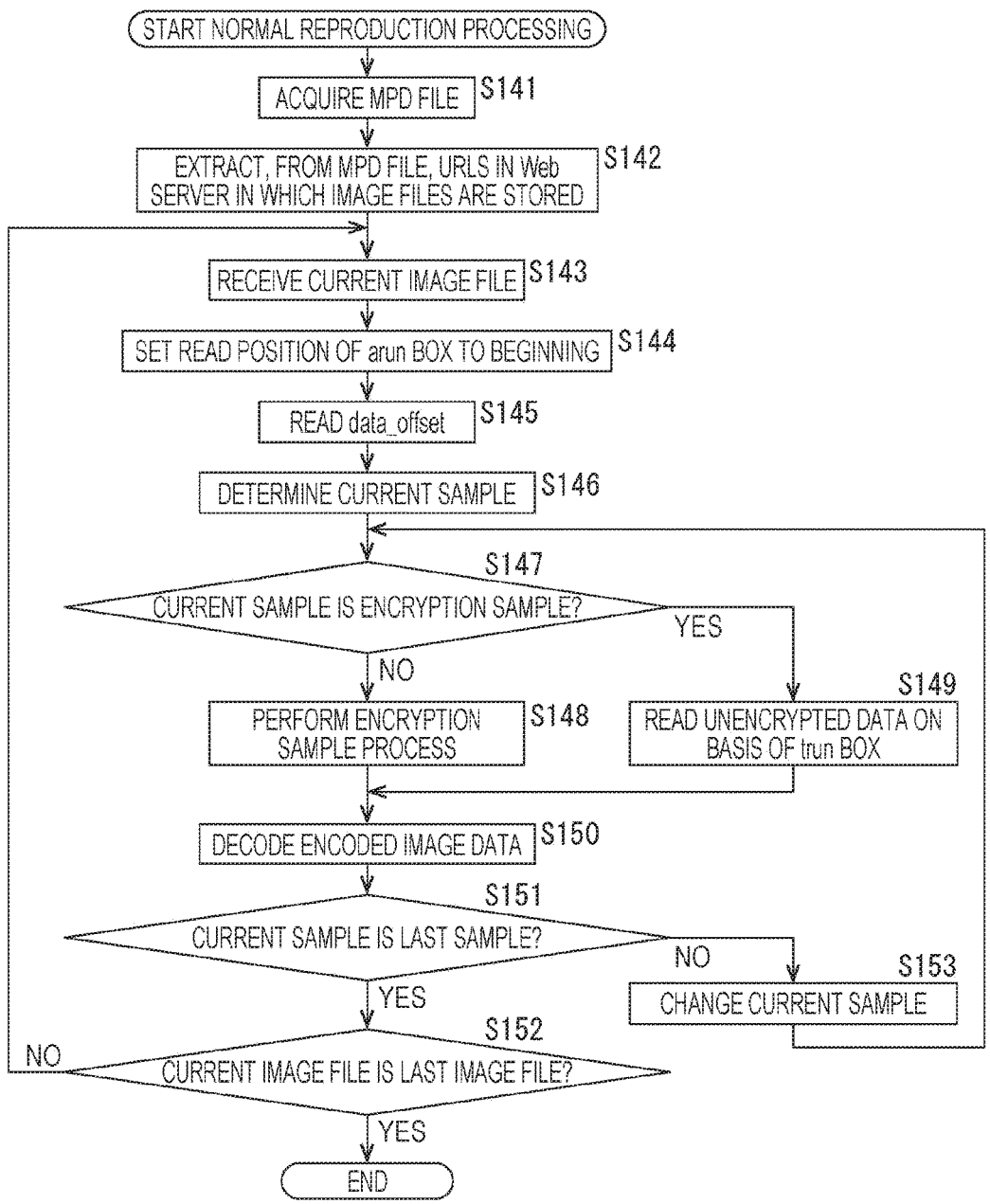
FIG. 21 is a flowchart describing normal reproduction processing by the streaming reproduction unit of FIG. 20.

FIG. 21 is a flowchart describing normal reproduction processing by the streaming reproduction unit 130 of FIG. 20.

Since the processing of steps S141 to S143 of FIG. 21 is similar to the processing of steps S31 to S33 of FIG. 11, the description will be omitted.

In step S144, the image acquiring unit 131 sets the read position of the arun box in the image file received in step S143 to be the beginning of the arun box. In step S145, the image acquiring unit 131 starts reading from the read position of the arun box, and reads data_offset. Then, the image acquiring unit 131 moves the read position to the immediately following table_count.

In step S146, the image acquiring unit 131 determines a beginning sample in the image file received in step S143 to be a current sample. In step S147, the image acquiring unit 131 judges whether the current sample is an encryption sample, for example, whether the arun box retains encrypted data for the current sample, that is, whether table_count is 1 or more. When it is judged in step S147 that the current sample is an encryption sample, the processing proceeds to step S148.

In step S148, the image acquiring unit 131 performs an encryption sample process. This encryption sample process is similar to the encryption sample process of FIG. 12, except that the ptbl box is replaced with an arun box which manages a current encryption sample, and table_offset has a value based on data_offset, the number of samples from a beginning encryption sample to a current encryption sample, and the like. After the processing of step S148, the processing proceeds to step S150.

When it is judged in step S147 that the current sample is not an encryption sample, the processing proceeds to step S149. Since the processing of steps S149 to S153 is similar to the processing of steps S40 to S44 of FIG. 11, the description will be omitted.

It is noted that the streaming reproduction unit 130 can also perform random reproduction instead of normal reproduction, in a similar manner to the streaming reproduction unit 90. The random reproduction processing by the streaming reproduction unit 130 is similar to the normal reproduction processing of FIG. 21, except that information from table_count to patIV for samples from a beginning sample to a current sample managed by an arun box is skipped before the processing of step S148 of FIG. 21, and the first current sample is a sample of a time desired by a user.

Fourth Embodiment (Configuration Example of mdat Box)

Figure 22:
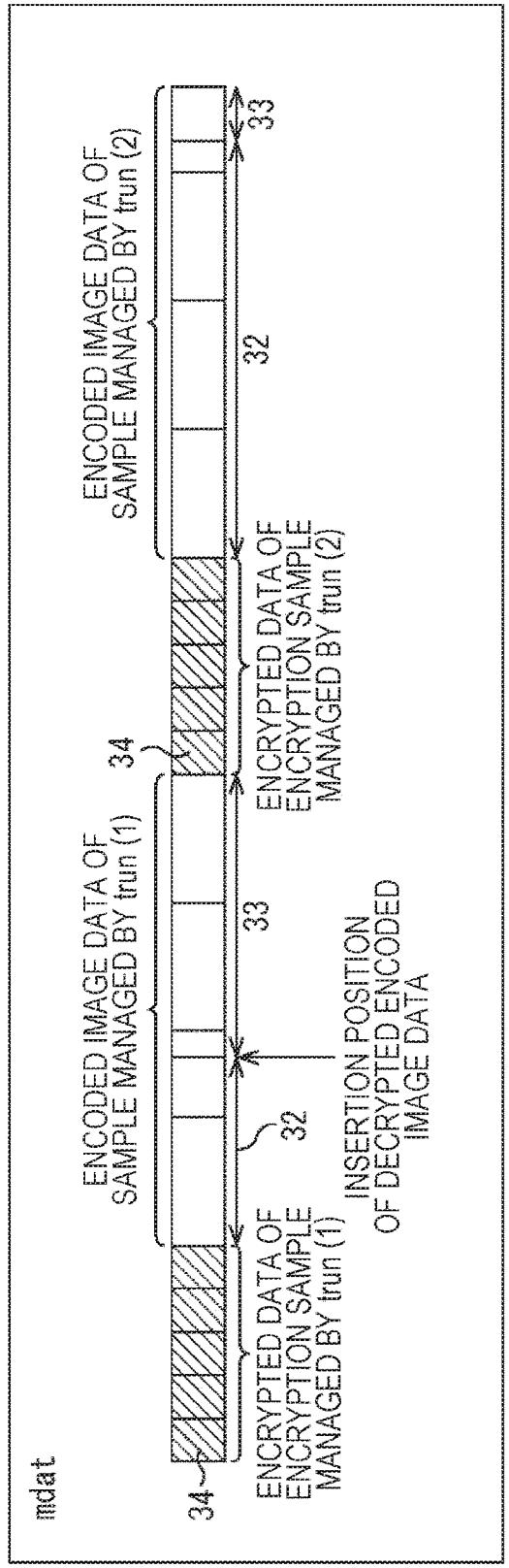
FIG. 22 is a diagram illustrating a configuration example of an mdat box in a fourth embodiment of the information processing system to which the present disclosure is applied.

FIG. 22 is a diagram illustrating a configuration example of an mdat box in a fourth embodiment of the information processing system to which the present disclosure is applied.

In the fourth embodiment, the segment structure of Media Segment of an image file is the segment structure of FIG. 2, and the configuration of the mdat box of Media Segment is as illustrated in FIG. 22.

That is, in the mdat box in the fourth embodiment, as illustrated in FIG. 22, the dummy data 31 is deleted, and the unencrypted data 32 before the dummy data 31 and the unencrypted data 33 after the dummy data 31 are connected to each other.

The configuration of the fourth embodiment of the information processing system is similar to the configuration of the information processing system 10 of FIG. 1, except that the configuration of the mdat box of an image file is the structure of FIG. 22, and the configuration of the streaming reproduction unit is different. Therefore, only the streaming reproduction unit will be described below.

(Configuration Example of Streaming Reproduction Unit)

Figure 23:
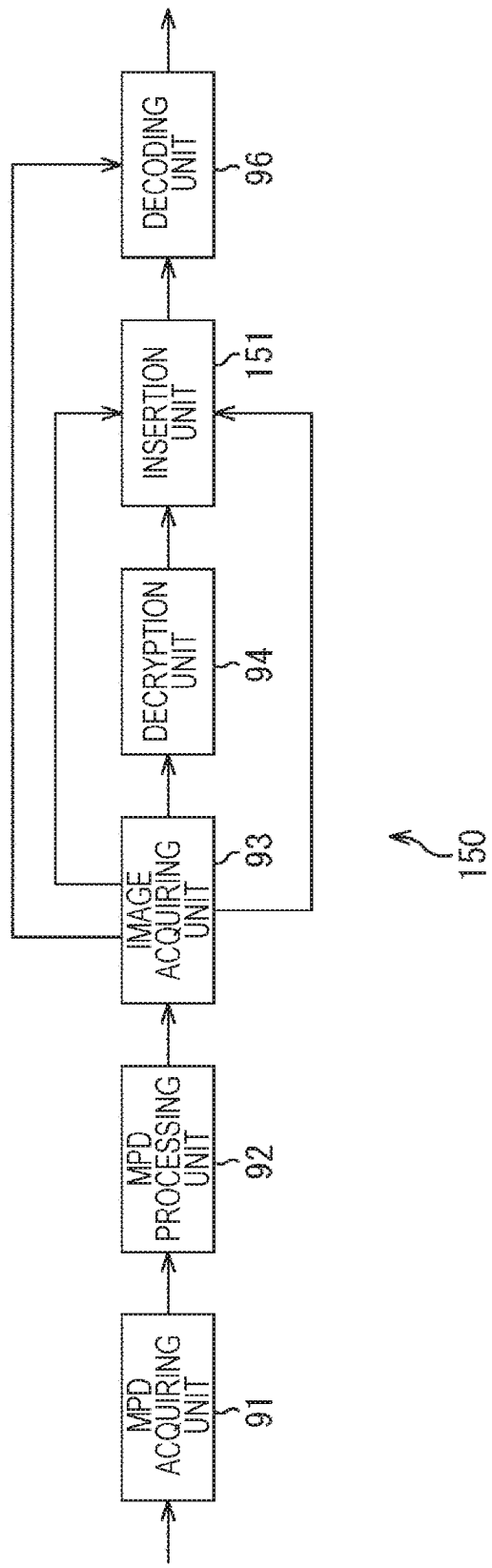
FIG. 23 is a block diagram illustrating a configuration example of a streaming reproduction unit in the fourth embodiment.

FIG. 23 is a block diagram illustrating a configuration example of the streaming reproduction unit in the fourth embodiment of the information processing system to which the present disclosure is applied.

Of the configuration illustrated in FIG. 23, the same configuration as the configuration of FIG. 9 is assigned with the same reference numeral. Redundant description will be appropriately omitted.

The configuration of a streaming reproduction unit 150 of FIG. 23 is different from the configuration of the streaming reproduction unit 90 of FIG. 9, in that an insertion unit 151 is disposed in place of the insertion unit 95.

The insertion unit 151 separates unencrypted data constituting an encryption sample into pre-unencrypted data that is unencrypted data before forensic object data and post-unencrypted data that is unencrypted data after forensic object data, on the basis of pattern_start_offset. The insertion unit 151 inserts pattern data supplied from the decryption unit 94 between the pre-unencrypted data and the post-unencrypted data.

Specifically, for example, a memory is integrated inside the insertion unit 151. When unencrypted data is supplied from the image acquiring unit 93, the insertion unit 151 causes the integrated memory to retain the unencrypted data. At this time, the insertion unit 151 inserts a vacant region by the size of pattern_size into the position of pattern_start_offset of unencrypted data of an encryption sample. This is repeated by the number of pattern_count. Then, when pattern data is supplied from the decryption unit 94, the insertion unit 151 causes the integrated memory to retain the pattern data in its vacant regions. The insertion unit 151 supplies the decoding unit 96 with the unencrypted data and the pattern data retained in the memory.

As described above, the streaming reproduction unit 150 performs the processing of separating unencrypted data on the basis of pattern_start_offset and inserting pattern data. This enables video content to be reproduced. Therefore, a video reproducing terminal to reproduce an illegally copied image file also needs to perform the above-described processing with a memory, and has to deal with the processing different from a file which does not contain forensic information. As a result, illegal copies can be suppressed.

It is noted that although not illustrated, the normal reproduction processing and random reproduction processing by the streaming reproduction unit 150 are similar to the normal reproduction processing and random reproduction processing by the streaming reproduction unit 90, except that the random reproduction processing includes separating unencrypted data at the position of pattern_start_offset and inserting pattern data between the separated pieces of unencrypted data, instead of inserting pattern data into the position of pattern_start_offset of unencrypted data.

Also, in the fourth embodiment, the mdat box in the first embodiment is changed to the mdat box of FIG. 22. However, the mdat box in the second and third embodiments may be changed to the mdat box of FIG. 22. Also, the mdat box of FIG. 5 and FIG. 6 may be configured such that the pre-unencrypted data and the post-unencrypted data are connected to each other, in a similar manner to the mdat box of FIG. 22.

Fifth Embodiment (Configuration Example of Streaming Reproduction Unit)

The segment structure of Media Segment of an image file in a fifth embodiment of the information processing system to which the present disclosure is applied is as illustrated in FIG. 14. The configuration of actual data in the mdat box of Media Segment is as illustrated in FIG. 4 to FIG. 6. However, Sample Constructor (Variant Constructor) that is a data structure for each sample is also placed in the mdat box, and the syntax of FIG. 15 is described in the Sample Constructor.

Sample Constructor position information indicating the number of bytes from the starting point as a storing position in a beginning image file of Sample Constructor is described in Sample Auxiliary Information. It is noted that although one unencrypted Sample Constructor is disposed for one sample as described herein, Sample Constructor may be encrypted with a plurality of different keys.

In this case, Sample Constructor position information of Sample Constructor encrypted with each key is described in Sample Auxiliary Information. On the basis of the Sample Constructor position information encrypted with a key retained by the video reproducing terminal 14, the video reproducing terminal 14 acquires the Sample Constructor. Then, the video reproducing terminal 14 decodes the acquired Sample Constructor with a key retained by the video reproducing terminal 14 to acquire decoded Sample Constructor. This key may be the same as or different from the key used for the encryption of pattern data.

The configuration of the fifth embodiment of the information processing system is similar to the configuration of the information processing system 10 of FIG. 1, except that the configuration of an image file is as described above, and the configuration of the streaming reproduction unit is different. Therefore, only the streaming reproduction unit will be described below.

Figure 24:
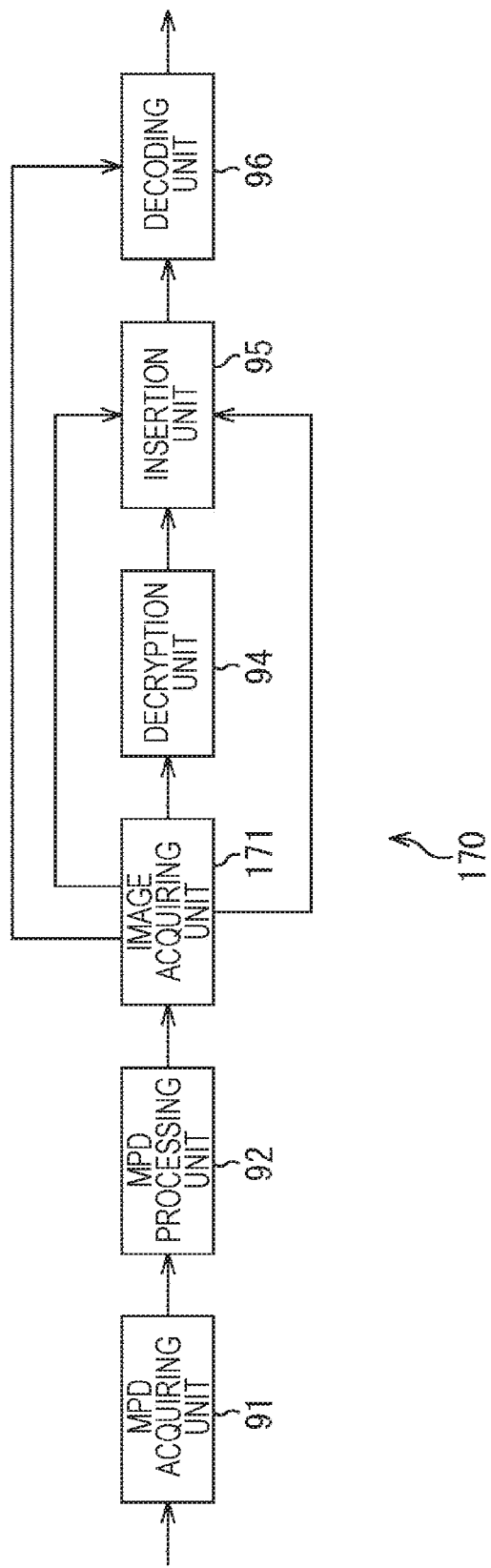
FIG. 24 is a block diagram illustrating a configuration example of a streaming reproduction unit in a fifth embodiment of the information processing system to which the present disclosure is applied.

FIG. 24 is a block diagram illustrating a configuration example of the streaming reproduction unit in the fifth embodiment of the information processing system to which the present disclosure is applied.

Of the configuration illustrated in FIG. 24, the same configuration as the configuration of FIG. 16 is assigned with the same reference numeral. Redundant description will be appropriately omitted.

The configuration of a streaming reproduction unit 170 of FIG. 24 is different from the configuration of the streaming reproduction unit 110 of FIG. 16, in that an image acquiring unit 171 is disposed in place of the image acquiring unit 111. The streaming reproduction unit 170 acquires Sample Constructor on the basis of Sample Constructor position information contained in Sample Auxiliary Information, and reproduces a current encryption sample on the basis of the acquired Sample Constructor.

Specifically, the image acquiring unit 171 of the streaming reproduction unit 170 requests a current image file to the Web server 12 on the basis of the URL of a current image file among the URLs supplied from the MPD processing unit 92, and receives the requested image file. Also, the image acquiring unit 171 judges whether a current sample is an encryption sample, on the basis of a saiz box representing the size of Sample Auxiliary Information in the current image file.

When it is judged that a current sample is an encryption sample, the image acquiring unit 171 reads Sample Constructor of the encryption sample from the image file on the basis of Sample Constructor position information contained in Sample Auxiliary Information. Also, the image acquiring unit 171 reads, from the image file, encrypted data of the current encryption sample corresponding to a key retained by the video reproducing terminal 14 on the basis of the read Sample Constructor, and supplies the read encrypted data to the decryption unit 94.

Also, the image acquiring unit 171 reads, from the image file, encoded image data including unencrypted data and dummy data of the current encryption sample on the basis of a trun box, and supplies the read encoded image data to the insertion unit 95. Furthermore, the image acquiring unit 171 supplies the insertion unit 95 with pattern_start_offset of the current encryption sample contained in Sample Constructor.

On the other hand, when it is judged that a current sample is not an encryption sample, the image acquiring unit 171 reads unencrypted data of the current sample on the basis of a trun box, and supplies the read unencrypted data as encoded image data to the decoding unit 96.

(Description of Processing by Streaming Reproduction Unit)

Figure 25:
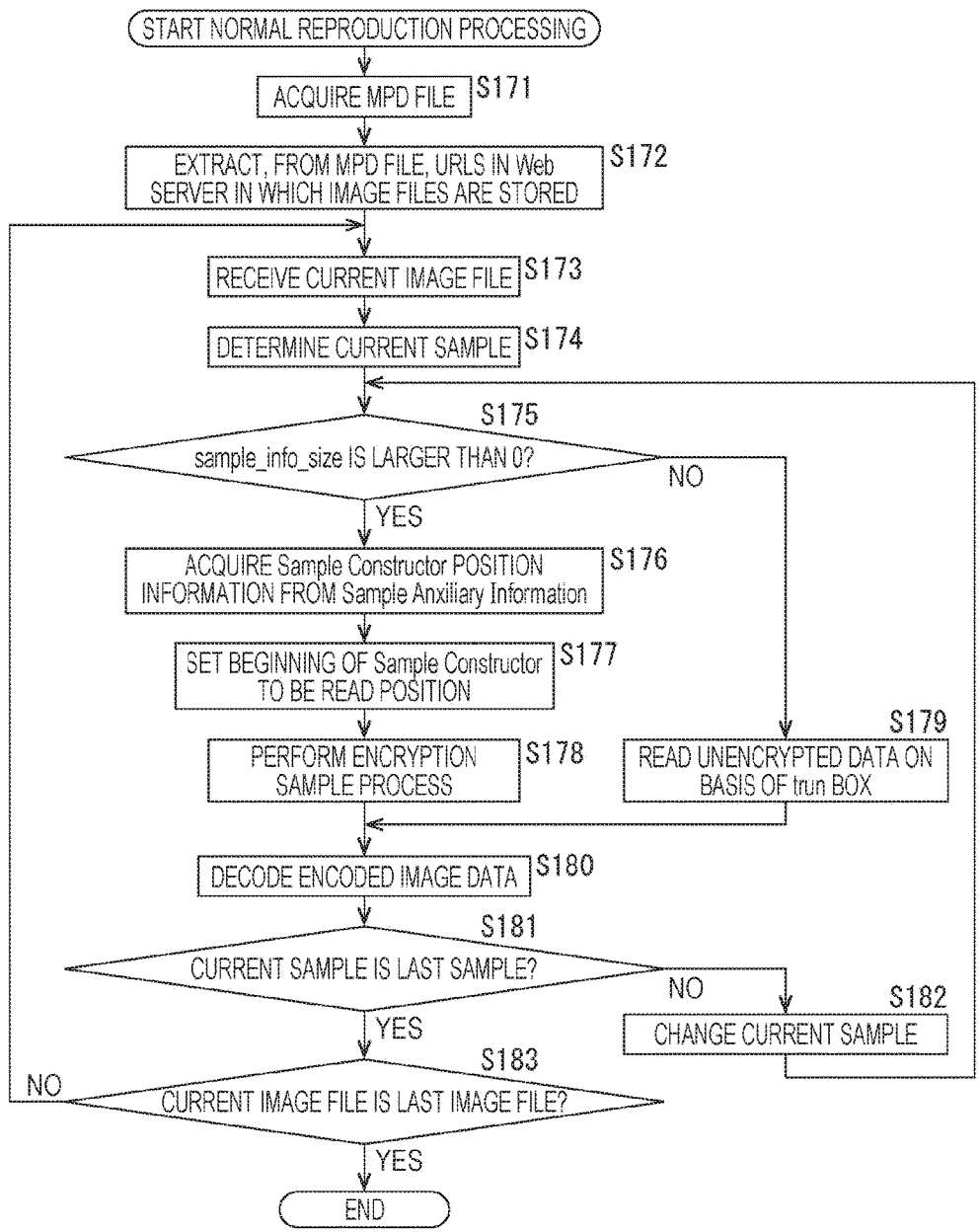
FIG. 25 is a flowchart describing normal reproduction processing by the streaming reproduction unit of FIG. 24.

FIG. 25 is a flowchart describing normal reproduction processing by the streaming reproduction unit 170 of FIG. 24.

Since the processing of steps S171 to S175 of FIG. 25 is similar to the processing of steps S111 to S115 of FIG. 17, the description will be omitted.

When it is judged in step S175 that sample_info_size is more than 0, the image acquiring unit 171 acquires Sample Constructor position information from Sample Auxiliary Information of a current encryption sample in step S176.

In step S177, the image acquiring unit 171 sets a beginning position of Sample Constructor of the current encryption sample as the read position of the Sample Constructor on the basis of Sample Constructor position information.

In step S178, the image acquiring unit 171 performs an encryption sample process. This encryption sample process is similar to the encryption sample process of FIG. 12, except that the ptbl box is replaced with Sample Constructor of a current encryption sample. After the processing of step S178, the processing proceeds to step S180.

On the other hand, when it is judged in step S175 that sample_info_size is not more than 0, the processing proceeds to step S179. Since the processing of steps S179 to S183 is similar to the processing of steps S118 to S122 of FIG. 17, the description will be omitted.

It is noted that the streaming reproduction unit 170 can also perform random reproduction instead of normal reproduction, in a similar manner to the streaming reproduction unit 90. The random reproduction processing by the streaming reproduction unit 170 is similar to the normal reproduction processing of FIG. 25, except that it is determined in step S174 that the sample of a time desired by a user is a current sample.

Also, although dummy data is placed in an mdat box of Media Segment in the fifth embodiment, dummy data may not be placed as illustrated in FIG. 22.

Sixth Embodiment (Example of Syntax of Sample Constructor)

FIG. 26 is a diagram illustrating an example of the syntax of Sample Constructor of an image file in a sixth embodiment of the information processing system to which the present disclosure is applied.

The segment structure of Media Segment of an image file in the sixth embodiment is as illustrated in FIG. 14, and the configuration of actual data in an mdat box of Media Segment is as illustrated in FIG. 22. However, Sample Constructors of all samples are also placed in an mdat box.

In Sample Constructor of FIG. 26, 8-bit version, which represents the number of bits of element position information indicating the number of bytes from a starting point as a storing position of an element in a beginning image file, is described. When the number of bits of element position information is 32 bits, version is 0, and when 64 bits, version is other than 0.

Also, an element is a divided piece of actual data of a sample, such as each of consecutive pieces of unencrypted data, and encrypted data of each key corresponding to the same forensic object data. Elements are grouped into each piece of unencrypted data or forensic object data. That is, when an element is unencrypted data, only the element forms one group. On the other hand, when an element is encrypted data, elements corresponding to the same forensic object data are classified into the same group. In the sixth embodiment, all elements in the same group have an identical size.

Furthermore, in Sample Constructor of FIG. 26, 32-bit elements_count, which is the number of elements constituting data of a sample, is described. Furthermore, element_offset and 8-bit group_flags are described for each element.

The element_offset is element position information with the number of bits represented by version. Therefore, 32-bit element_offset is described when version is 0, and 64-bit element_offset is described when version is other than 0.

Also, group_flags is information that represents the encryption state (unencrypted or encrypted) of an element and whether the element is a beginning element in a group. The value of the 0th bit (bit 0) of group_flags is 1 when representing that the element is a beginning element constituting the group, and 0 when representing that the element is not a beginning element. Also, the value of the first bit (bit 1) of group_flags is 1 when representing that the element is encrypted, and 0 when representing that the element is not encrypted.

When the 0th bit of group_flags is 1, element_size representing the size of an element is described in Sample Constructor of FIG. 26. Also, when the first bit of group_flags is 1, patKID that is information (ID) specifying a key corresponding to an element and patIV indicating the value of Initial Vector for decoding the element are described in Sample Constructor of FIG. 26.

As described above, element size of a beginning element in each group, among all elements constituting data of a corresponding sample, is described in Sample Constructor of FIG. 26. Therefore, the data amount of Sample Constructor can be reduced compared to when element_size is described for all elements.

It is noted that the order of the elements corresponding to the information described in Sample Constructor of FIG. 26 is the order of constituting data of a sample. Therefore, image data of video content can be reproduced by reproducing elements on the basis of Sample Constructor of FIG. 26 in the describing order.

The configuration of the sixth embodiment of the information processing system is similar to the configuration of the information processing system 10 of FIG. 1, except that the configuration of an image file is as described above, and the configuration of the streaming reproduction unit is different. Therefore, only the streaming reproduction unit will be described below.

(Configuration Example of Streaming Reproduction Unit)

Figure 27:
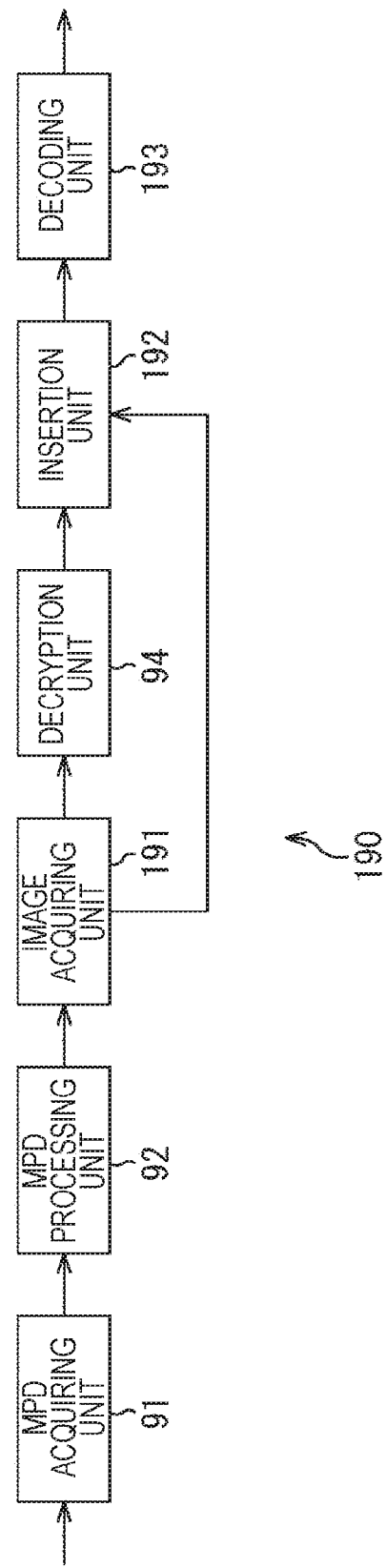
FIG. 27 is a block diagram illustrating a configuration example of a streaming reproduction unit in the sixth embodiment.

FIG. 27 is a block diagram illustrating a configuration example of the streaming reproduction unit in the sixth embodiment of the information processing system to which the present disclosure is applied.

Of the configuration illustrated in FIG. 27, the same configuration as the configuration of FIG. 24 is assigned with the same reference numeral. Redundant description will be appropriately omitted.

The configuration of a streaming reproduction unit 190 of FIG. 27 is different from the configuration of the streaming reproduction unit 170 of FIG. 24, in that an image acquiring unit 191, an insertion unit 192, and a decoding unit 193 are disposed in place of the image acquiring unit 171, the insertion unit 95, and the decoding unit 96. The streaming reproduction unit 190 reproduces each element of a current sample on the basis of Sample Constructor of FIG. 26.

Specifically, the image acquiring unit 191 (receiving unit) of the streaming reproduction unit 190 requests a current image file to the Web server 12 on the basis of the URL of a current image file among the URLs supplied from the MPD processing unit 92, and receives the requested image file. The image acquiring unit 191 acquires Sample Constructor of a current sample from the image file, on the basis of Sample Auxiliary Information of the current sample stored in the current image file.

Also, the image acquiring unit 191 reads, from the image file, an element that is unencrypted data of the current sample, or an element that is encrypted data corresponding to a key retained by the video reproducing terminal 14, on the basis of information of each element described in the read Sample Constructor, in the describing order of the information.

Specifically, when element_size is contained in Sample Constructor, the image acquiring unit 191 retains the element_size, and when element_size is not contained, the image acquiring unit 191 reads retained element_size. The image acquiring unit 191 reads unencrypted data, or encrypted data corresponding to a key retained by the video reproducing terminal 14, on the basis of element_size contained in Sample Constructor or the read element_size, and element_offset contained in Sample Constructor. The image acquiring unit 191 supplies the read encrypted data to the decryption unit 94, and supplies the unencrypted data to the insertion unit 192.

The insertion unit 192 places unencrypted data supplied from the image acquiring unit 191 and pattern data supplied from the decryption unit 94, in the acquiring order, that is, in the order in which a corresponding element is described in Sample Constructor. Accordingly, when a current sample is an encryption sample, pattern data is inserted into unencrypted data. The insertion unit 192 supplies the decoding unit 193 with encoded image data obtained as a result of the placement of unencrypted data and pattern data.

The decoding unit 193 decodes the encoded image data supplied from the insertion unit 192, and outputs the resultant image data as image data of video content. It is noted that when the encoded image data is encrypted with a key different from the key used for the encryption of the pattern data, decoding is performed after decryption of the encryption.

(Description of Processing by Streaming Reproduction Unit)

Figure 28:
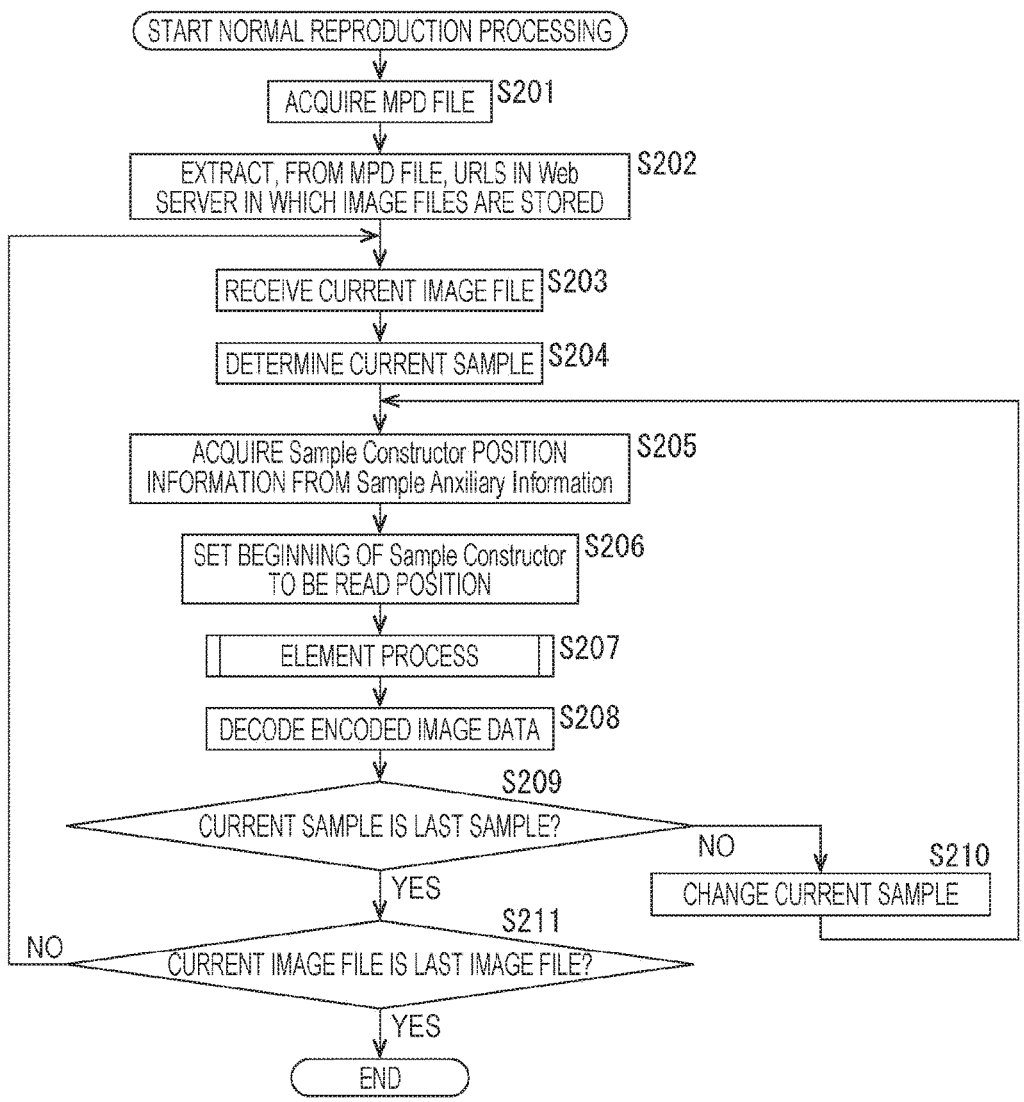
FIG. 28 is a flowchart describing normal reproduction processing by the streaming reproduction unit of FIG. 27.

FIG. 28 is a flowchart describing normal reproduction processing by the streaming reproduction unit 190 of FIG. 27.

Since the processing of steps S201 to S206 of FIG. 28 is similar to the processing of steps S171 to S174, S176, and S177 of FIG. 25, the description will be omitted.

In step S207, the streaming reproduction unit 190 reads each element from an image file on the basis of Sample Constructor of a current sample, and performs an element process of generating encoded image data. Details of this element process will be described with reference to FIG. 29 described later.

In step S208, the decoding unit 193 decodes encoded image data supplied from the insertion unit 192, and outputs the resultant image data as image data of video content.

Since the processing of steps S209 to S211 is similar to the processing of steps S181 to S183 of FIG. 25, the description will be omitted.

Figure 29:
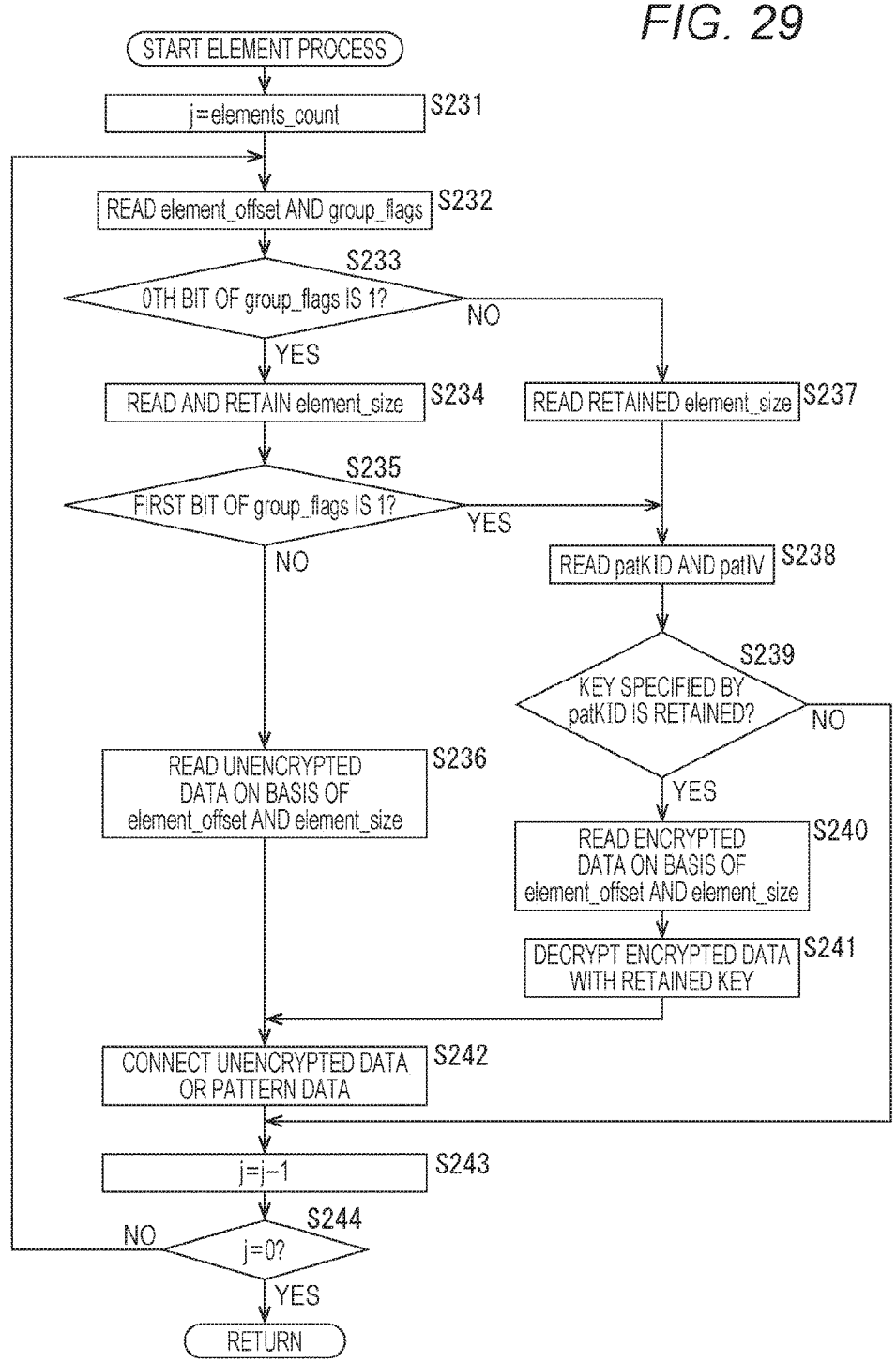
FIG. 29 is a flowchart describing details of an element process of FIG. 28.

FIG. 29 is a flowchart describing details of the element process of step S207 in FIG. 28.

In step S231 of FIG. 29, the image acquiring unit 191 of the streaming reproduction unit 190 moves the read position of Sample Constructor to the immediately following elements_count for reading, and sets the read data as count value j.

In step S232, the image acquiring unit 191 moves the read position of Sample Constructor to the next element_offset, and reads element_offset and group_flags.

In step S233, the image acquiring unit 191 judges whether the 0th bit of group_flags is 1. When it is judged in step S233 that the 0th bit of group_flags is 1, that is, when the jth element is a beginning element in a group, the processing proceeds to step S234.

In step S234, the image acquiring unit 191 moves the read position of Sample Constructor to the next element_size for reading, and retains the read data. At this time, the immediately previously retained element_size is deleted.

In step S235, the image acquiring unit 191 judges whether the first bit of group_flags is 1. When it is judged in step S235 that the first bit of group_flags is not 1, that is, when the jth element is unencrypted data, the processing proceeds to step S236.

In step S236, the image acquiring unit 191 reads the unencrypted data from an image file on the basis of element_offset and element_size, and allows the processing to proceed to step S242.

On the other hand, when it is judged in step S233 that the 0th bit of group_flags is not 1, that is, when the jth element is an element including the second or later encrypted data in a group, the processing proceeds to step S237. In step S237, the image acquiring unit 191 reads the retained element_size, that is, element_size of a beginning element in the same group.
Then, the processing proceeds to step S238.

Also, when it is judged in step S235 that the first bit of group_flags is 1, that is, when the jth element is an element including a beginning encrypted data in a group, the processing proceeds to step S238.

In step S238, the image acquiring unit 191 moves the read position of Sample Constructor to the next patKID, and reads a pair of patKID and patIV.

In step S239, the image acquiring unit 191 judges whether the video reproducing terminal 14 retains a key specified by patKID. When it is judged in step S239 that a key specified by patKID is retained, the processing proceeds to step S240.

In step S240, the image acquiring unit 191 reads encrypted data from an image file on the basis of element_offset and element_size, and supplies the read encrypted data to the decryption unit 94.

In step S241, the decryption unit 94 decrypts the encrypted data supplied from the image acquiring unit 191 with a key retained by the video reproducing terminal 14 to generate pattern data. The decryption unit 94 supplies the pattern data to the insertion unit 192, and allows the processing to proceed to step S242.

In step S242, the insertion unit 192 connects the unencrypted data supplied from the image acquiring unit 191 or the pattern data supplied from the decryption unit 94 to immediately after the retained encoded image. The insertion unit 192 retains encoded image data after the connection. Then, the processing proceeds to step S243.

On the other hand, when it is judged in step S239 that a key specified by patKID is not retained, the processing proceeds to step S243.

In step S243, the image acquiring unit 191 decrements count value j by one. In step S244, the image acquiring unit 191 judges whether count value j is 0. When it is judged in step S244 that count value j is not 0, that is, when an element corresponding to encoded image data having not been connected yet exists in a current sample, the processing returns to step S232. Then, the processing of steps S232 to S244 is repeated until count value j becomes 0.

On the other hand, when it is judged in step S244 that count value j is 0, that is, when encoded image data corresponding to all elements in a current sample has been connected, the insertion unit 192 supplies the retained encoded image data to the decoding unit 193. Then, the processing proceeds from step S207 to step S208 of FIG. 28.

It is noted that the streaming reproduction unit 190 can also perform random reproduction instead of normal reproduction, in a similar manner to the streaming reproduction unit 90. The random reproduction processing by the streaming reproduction unit 190 is similar to the normal reproduction processing of FIG. 28, except that it is determined in step S204 that the sample of a time desired by a user is a current sample.

Seventh Embodiment (Example of Syntax of Sample Constructor)

FIG. 30 is a diagram illustrating an example of the syntax of Sample Constructor of an image file in a seventh embodiment of the information processing system to which the present disclosure is applied.

The seventh embodiment is different from the sixth embodiment, in that all samples constituting the same group are always consecutively placed on an image file.

Therefore, in Sample Constructor according to the seventh embodiment, element_offset is described only when the 0th bit of group_flags is 1, as illustrated in FIG. 30.

That is, element_offset and element_size of a beginning element of each group, among all elements constituting data of a corresponding sample, are described in Sample Constructor of FIG. 30. Therefore, the data amount of Sample Constructor can be reduced compared to when element_offset and element_size are described for all elements.

The configuration of the seventh embodiment of the information processing system is similar to the configuration of the information processing system 10 of FIG. 1, except that the configuration of an image file is as described above, and the configuration of the streaming reproduction unit is different. Therefore, only the streaming reproduction unit will be described below.

(Configuration Example of Streaming Reproduction Unit)

Figure 31:
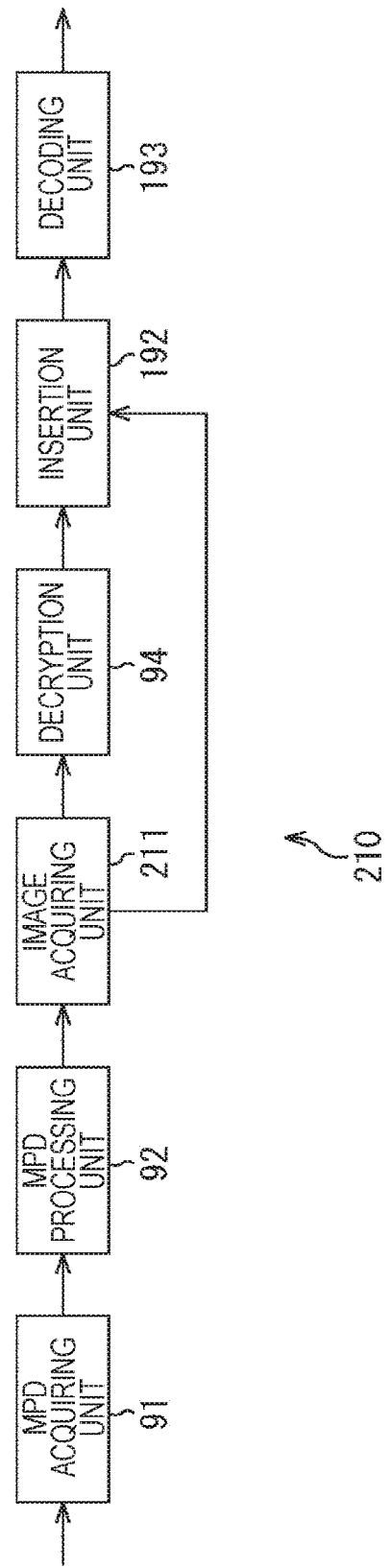
FIG. 31 is a block diagram illustrating a configuration example of a streaming reproduction unit in the seventh embodiment.

FIG. 31 is a block diagram illustrating a configuration example of the streaming reproduction unit in the seventh embodiment of the information processing system to which the present disclosure is applied.

Of the configuration illustrated in FIG. 31, the same configuration as the configuration of FIG. 27 is assigned with the same reference numeral. Redundant description will be appropriately omitted.

The configuration of a streaming reproduction unit 210 of FIG. 31 is different from the configuration of the streaming reproduction unit 190 of FIG. 27, in that an image acquiring unit 211 is disposed in place of the image acquiring unit 191. The streaming reproduction unit 190 reproduces each element of a current sample on the basis of Sample Constructor of FIG. 30.

Specifically, the image acquiring unit 211 of the streaming reproduction unit 210 requests a current image file to the Web server 12 on the basis of the URL of a current image file among the URLs supplied from the MPD processing unit 92, and receives the requested image file. The image acquiring unit 211 reads Sample Constructor of a current sample from the image file, on the basis of Sample Auxiliary Information of the current sample stored in the current image file.

Also, the image acquiring unit 211 reads, from the image file, an element that is unencrypted data of the current sample, or an element that is encrypted data corresponding to a key retained by the video reproducing terminal 14, on the basis of information of each element described in the read Sample Constructor, in the describing order of the information.

Specifically, the image acquiring unit 211 retains element_size and element_offset when element_size and element_offset are contained in Sample Constructor, and reads element_size and element_offset retained by the image acquiring unit 211 when element_size and element_offset are not contained. The image acquiring unit 211 reads unencrypted data or encrypted data corresponding to a key retained by the video reproducing terminal 14, on the basis of element_size and element_offset contained in Sample Constructor, or the read element_size and element_offset. The image acquiring unit 211 supplies the read encrypted data to the decryption unit 94, and supplies the unencrypted data to the insertion unit 192.

(Description of Processing by Streaming Reproduction Unit)

The normal reproduction processing by the streaming reproduction unit 210 of FIG. 31 is similar to the normal reproduction processing of FIG. 28, except for the element process in step S207 of FIG. 28. Therefore, only the element process by the streaming reproduction unit 210 will be described below.

Figure 32:
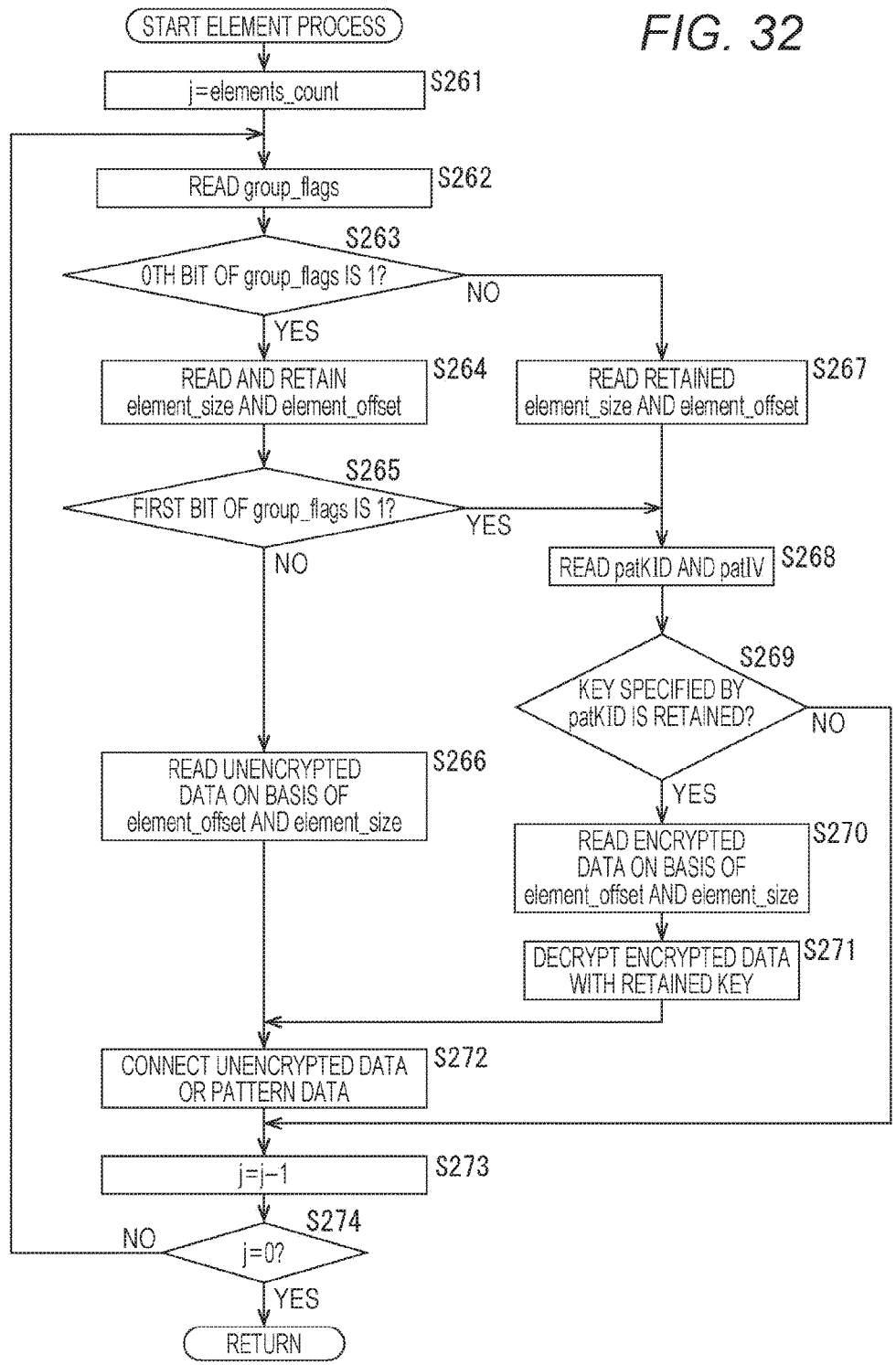
FIG. 32 is a flowchart describing details of an element process by the streaming reproduction unit of FIG. 31.

FIG. 32 is a flowchart describing details of the element process by the streaming reproduction unit 210 of FIG. 31.

In step S261 of FIG. 32, the image acquiring unit 211 of the streaming reproduction unit 210 moves the read position of Sample Constructor to the immediately following elements_count for reading, and sets the read data as count value j.

In step S262, the image acquiring unit 211 moves the read position of Sample Constructor to the next element_offset, and reads group_flags.

In step S263, the image acquiring unit 211 judges whether the 0th bit of group_flags is 1. When it is judged in step S263 that the 0th bit of group_flags is 1, that is, when the jth element is a beginning element in a group, the processing proceeds to step S264.

In step S264, the image acquiring unit 211 moves the read position of Sample Constructor to the next element_size and reads element_size and element_offset, and retains the read data. At this time, the immediately previously retained element_size and element_offset are deleted.

The processing of steps S265 and step S266 is similar to the processing of steps S235 and S236 of FIG. 29.

On the other hand, when it is judged in step S263 that the 0th bit of group_flags is not 1, that is, when the jth element is an element including the second or later encrypted data in a group, the processing proceeds to step S267. In step S267, the image acquiring unit 211 reads the retained element_size and element_offset, that is, the element_size and element_offset of a beginning element in the same group. Then, the processing proceeds to step S268.

Also, when it is judged in step S265 that the first bit of group_flags is 1, that is, when the jth element is an element including a beginning encrypted data in a group, the processing proceeds to step S268.

Since the processing of steps S268 to S274 is similar to the processing of steps S238 to S244 of FIG. 29, the description will be omitted.

It is noted that although dummy data is not placed in the mdat box of Media Segment in the sixth and seventh embodiments, dummy data may be placed as illustrated in FIG. 4 to FIG. 6.

Eighth Embodiment (Configuration of Actual Data)

Figure 33:
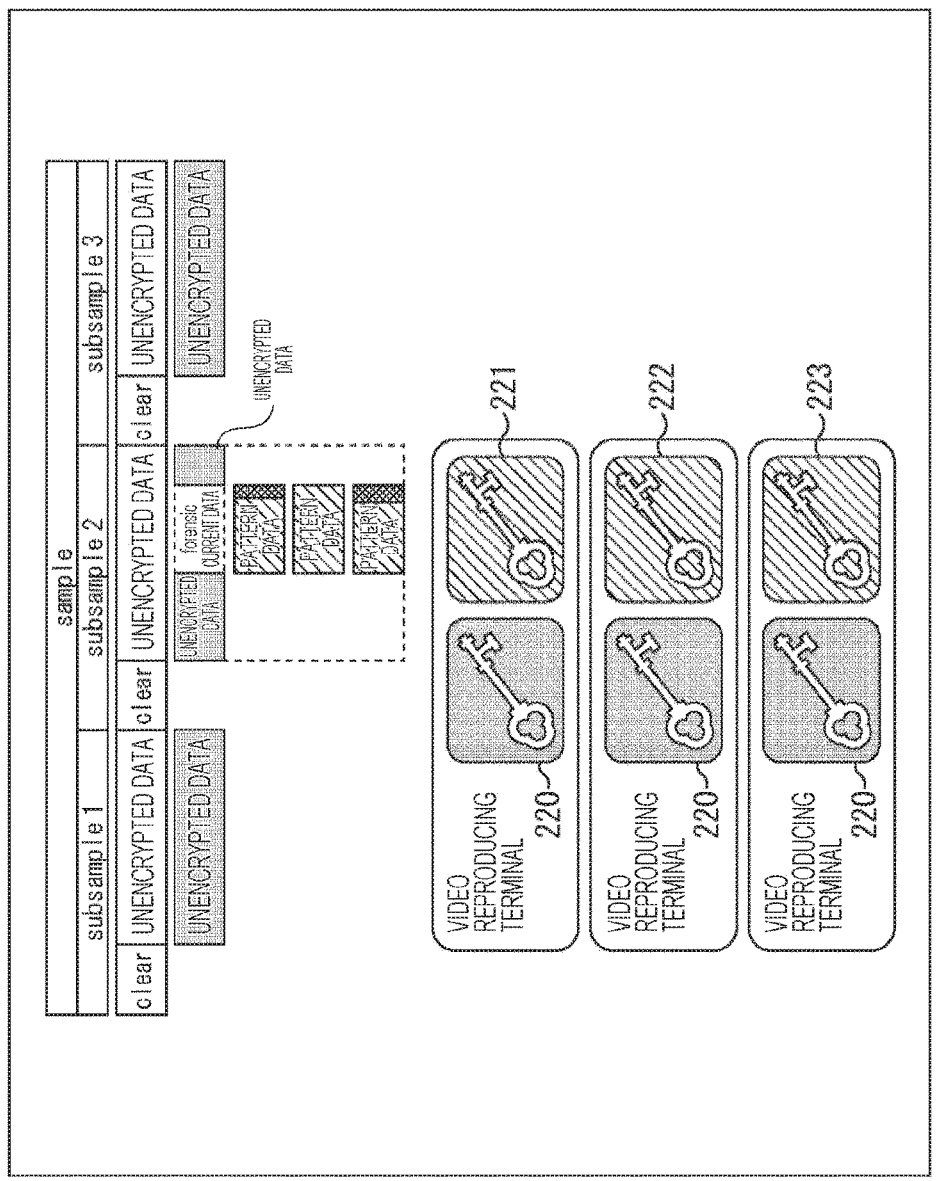
FIG. 33 is a diagram illustrating a configuration example of actual data in an image file in an eighth embodiment of the information processing system to which the present disclosure is applied.

FIG. 33 is a diagram illustrating a configuration example of actual data in an image file in an eighth embodiment of the information processing system to which the present disclosure is applied.

The segment structure of Media Segment of an image file in the eighth embodiment is, for example, as illustrated in FIG. 14, and actual data and Sample Constructor for each sample are placed in the mdat box of Media Segment.

As illustrated in FIG. 33, actual data for each sample placed in the mdat box includes one or more (three in the sample of FIG. 33) pieces of actual data for each sub-sample. Also, some of the actual data for each sample placed in the mdat box contains, in place of forensic object data, pattern data of a plurality of (three in the example of FIG. 33) patterns corresponding to forensic object data.

The pattern data of the actual data for each sample placed in the mdat box is encrypted with a common key 220. Unencrypted data may be or may not be encrypted with the common key 220. The unencrypted data which is not encrypted with the common key 220 is designated by "clear" in FIG. 33. Also, the pattern data encrypted with the common key 220 is further encrypted for each pattern with each of keys 221 to 223. Since the common key 220 is different from any of the keys 221 to 223 used for the encryption of pattern data, unencrypted data is encrypted with the common key 220 in some cases. Here, such unencrypted data is described as unencrypted data in the sense that it is not encrypted with the keys 221 to 223. It is noted that the data size does not change before and after the encryption with the keys 220 to 223. Also, hereinafter, it is assumed for convenience of explanation that all pieces of unencrypted data are encrypted with the common key 220.

The video reproducing terminal in the eighth embodiment has the common key 220 and any one of the keys 221 to 223. Therefore, the video reproducing terminal decrypts, with any one of the keys 221 to 223 retained by the video reproducing terminal, encrypted data that is pattern data encrypted with the one key. Then, video reproducing terminal decrypts, with the common key 220, pattern data encrypted with the common key 220 obtained as a result of the decryption and unencrypted data. As a result, image data of video content can be reproduced.

In the above-described description, the size of pattern data is configured to be the same as the size of the corresponding forensic object data. However, the size of pattern data is different for each pattern in some cases. That is, pattern data is generated by, for example, embedding a different watermark into forensic object data, and the size of the pattern data differs depending on the embedded watermark in some cases. Also, a watermark may not be embedded in some piece of pattern data. Accordingly, the size differs depending on the presence or absence of a watermark in some cases.

However, when the sizes of pattern data are different from each other, various problems are caused. For example, as illustrated in FIG. 33, when actual data for each sample placed in the mdat box is data in which multiple pieces of unencrypted data are consecutively contained after pattern data, and the actual data are encrypted with the common key 220 by an encryption technique such as advanced encryption standard (AES)-CTR, the video reproducing terminal cannot decrypt unencrypted data in some cases. For example, the change in size of pattern data can cause data of a counter block of AES-CTR applied in the subsequent decryption of unencrypted data to be different from the data when encrypted. Therefore, in the eighth embodiment, padding is performed before this encryption so that the sizes of multiple pieces of pattern data corresponding to the same forensic object data become identical.

The configuration of the eighth embodiment of the information processing system to which the present disclosure is applied is similar to the configuration of the information processing system 10 of FIG. 1, except for the configurations of the file generating apparatus and the streaming reproduction unit. Therefore, only the file generating apparatus and the streaming reproduction unit will be described below.

(Configuration Example of File Generating Apparatus)

Figure 34:
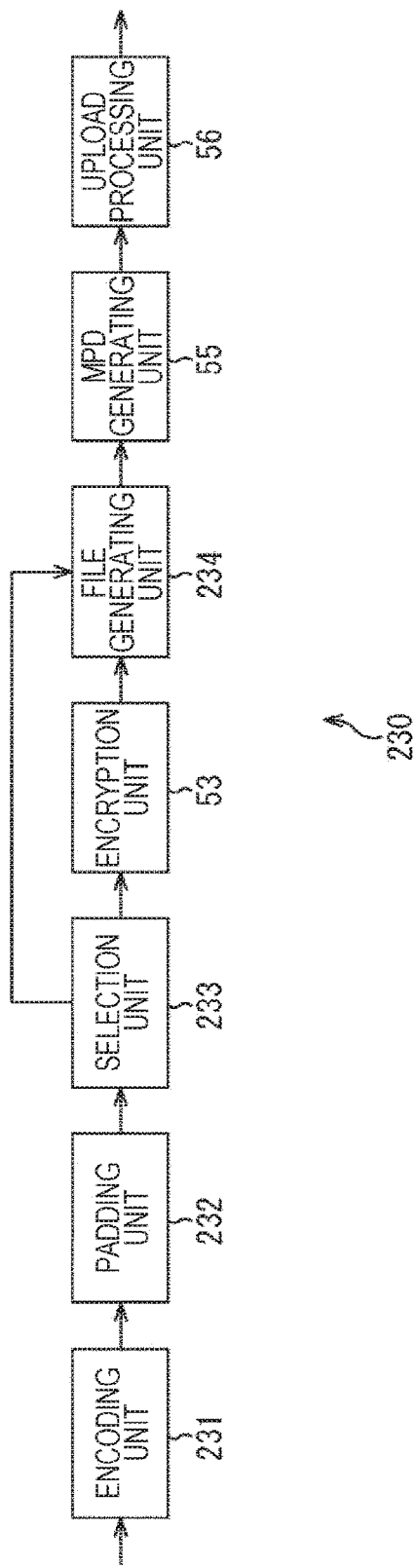
FIG. 34 is a block diagram illustrating a configuration example of a file generating apparatus in the eighth embodiment.

FIG. 34 is a block diagram illustrating a configuration example of the file generating apparatus in the eighth embodiment of the information processing system to which the present disclosure is applied.

Of the configuration illustrated in FIG. 34, the same configuration as the configuration of FIG. 7 is assigned with the same reference numeral. Redundant description will be appropriately omitted.

The configuration of a file generating apparatus 230 of FIG. 34 is different from the configuration of the file generating apparatus 11 of FIG. 7, in that a padding unit 232 is newly disposed, and an encoding unit 231, a selection unit 233, and a file generating unit 234 are disposed in place of the encoding unit 51, the selection unit 52, and the file generating unit 54. The file generating apparatus 230 performs padding to pattern data, and thereafter performs encryption to encoded image data containing pattern data and unencrypted data.

Specifically, the encoding unit 231 of the file generating apparatus 230 encodes externally inputted image data of video content to generate encoded image data. Also, the encoding unit 231 selects at least part of encoded image data as forensic object data, and generates multiple pieces of pattern data regarding the forensic object data. It is noted that the pattern data may be generated by selecting at least part of inputted image data, performing to the data various processes such as embedding of various watermarks, and thereafter individually encoding the processed data. The encoding unit 231 supplies the padding unit 232 with the encoded image data excluding forensic object data as unencrypted data, and also supplies the padding unit 232 with the multiple pieces of pattern data.

The padding unit 232 adds padding data to pattern data other than the largest piece of pattern data, among multiple pieces of pattern data supplied from the encoding unit 231, so that all pieces of pattern data have an identical size. The padding unit 232 supplies the selection unit 233 with the multiple pieces of pattern data having been subjected to padding, and unencrypted data supplied from the encoding unit 231.

The selection unit 233 (whole encryption unit) encrypts unencrypted data and multiple pieces of pattern data supplied from the padding unit 232 with a common key by an encryption technique such as AES-CTR. The selection unit 233 supplies the encryption unit 53 with multiple pieces of pattern data having been encrypted with a common key, and supplies the file generating unit 234 with unencrypted data having been encrypted.

The file generating unit 234 places the unencrypted data from the selection unit 233 and the encrypted data from the encryption unit 53 for each sample, and generates an image file for each segment containing an mdat box in which Sample Constructor containing padding information for each sample is placed. It is noted that padding information is information representing the sizes of multiple pieces of pattern data before padding data is added. The file generating unit 234 supplies the generated image file to the MPD generating unit 55.

(Example of Syntax of Sample Constructor)

FIG. 35 is a diagram illustrating an example of the syntax of Sample Constructor.

The configuration of Sample Constructor of FIG. 35 is different from the configuration of FIG. 26, in that padding information of an element is contained when the element is encrypted data.

That is, when the first bit of group_flags is 1, in addition to patKID and patIV, patSize representing the size of pattern data before padding data corresponding to an element is added is described as padding information in Sample Constructor of FIG. 35. As a result, in the video reproducing terminal, padding data can be deleted from pattern data after padding obtained by decrypting encrypted data.

(Description of Processing by File Generating Apparatus)

Figure 36:
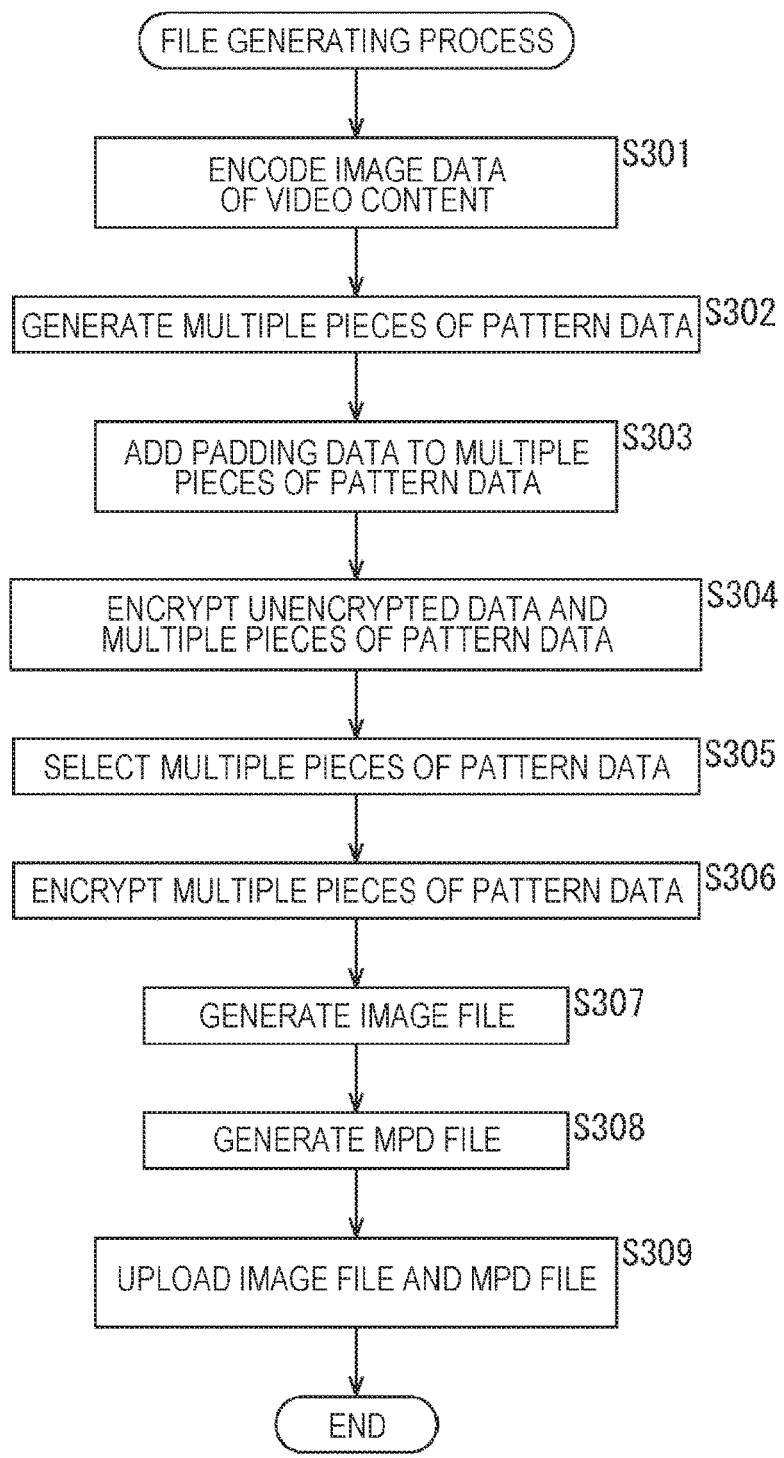
FIG. 36 is a flowchart describing a file generating process by the file generating apparatus of FIG. 34.

FIG. 36 is a flowchart describing a file generating process by the file generating apparatus 230 of FIG. 34.

In step S301 of FIG. 36, the encoding unit 231 of the file generating apparatus 230 encodes externally inputted image data of video content to generate encoded image data.

In step S302, the encoding unit 231 selects at least part of the encoded image data as forensic object data, and generates multiple pieces of pattern data regarding the forensic object data. It is noted that the pattern data may be generated by selecting at least part of inputted image data, performing to the data various processes such as embedding of various watermarks, and thereafter individually encoding the processed data. The encoding unit 231 supplies the padding unit 232 with the encoded image data excluding forensic object data as unencrypted data, and also supplies the padding unit 232 with the multiple pieces of pattern data.

In step S303, the padding unit 232 adds padding data to pattern data other than the largest piece of pattern data, among multiple pieces of pattern data supplied from the encoding unit 231, so that all pieces of pattern data have an identical size. The padding unit 232 supplies the selection unit 233 with multiple pieces of pattern data having been subjected to padding, and unencrypted data supplied from the encoding unit 231.

In step S304, the selection unit 233 encrypts unencrypted data and multiple pieces of pattern data supplied from the padding unit 232 with a common key by an encryption technique such as AES-CTR. In step S305, the selection unit 233 selects multiple pieces of pattern data from encrypted unencrypted data and multiple pieces of pattern data, and supplies the selected multiple pieces of pattern data to the encryption unit 53. Also, the selection unit 233 supplies encrypted unencrypted data to the file generating unit 234.

In step S306, the encryption unit 53 encrypts the multiple pieces of pattern data supplied from the selection unit 233 with unique keys for each piece of forensic object data to generate encrypted data. The encryption unit 53 supplies the generated encrypted data to the file generating unit 234.

In step S307, the file generating unit 234 places the unencrypted data from the selection unit 233 and the encrypted data from the encryption unit 53 for each sample, and generates an image file for each segment containing an mdat box in which Sample Constructor of FIG. 35 is placed. The file generating unit 234 supplies the generated image file to the MPD generating unit 55.

Since the processing of steps S308 and S309 is similar to the processing of steps S15 and S16 of FIG. 8, the description will be omitted.

(Configuration Example of Streaming Reproduction Unit)

Figure 37:
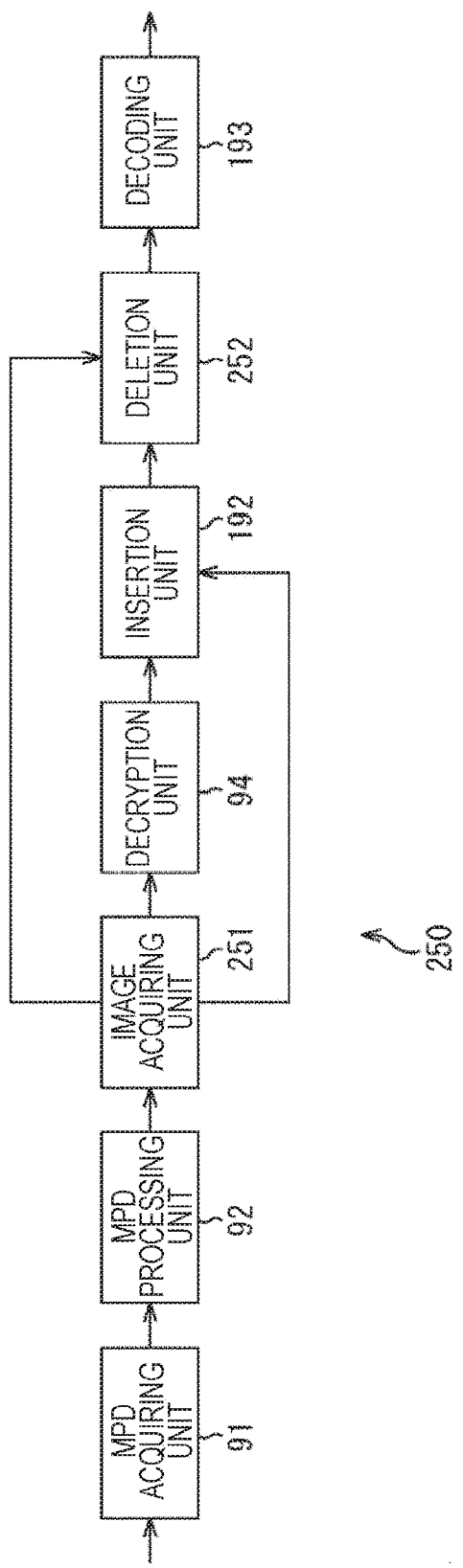
FIG. 37 is a block diagram illustrating a configuration example of a streaming reproduction unit in the eighth embodiment.

FIG. 37 is a block diagram illustrating a configuration example of the streaming reproduction unit in the eighth embodiment of the information processing system to which the present disclosure is applied.

Of the configuration illustrated in FIG. 37, the same configuration as the configuration of FIG. 27 is assigned with the same reference numeral. Redundant description will be appropriately omitted.

The configuration of a streaming reproduction unit 250 of FIG. 37 is different from the configuration of the streaming reproduction unit 190 of FIG. 27, in that an image acquiring unit 251 is disposed in place of the image acquiring unit 191, and a deletion unit 252 is newly disposed. The streaming reproduction unit 250 deletes padding data added to pattern data, on the basis of Sample Constructor of FIG. 35.

Specifically, the image acquiring unit 251 (receiving unit) of the streaming reproduction unit 250 receives a current image file on the basis of the URL of a current image file among the URLs supplied from the MPD processing unit 92, in a similar manner to the image acquiring unit 191 of FIG. 27. The image acquiring unit 251 acquires Sample Constructor of a current sample from the image file, on the basis of Sample Auxiliary Information of the current sample stored in the current image file, in a similar manner to the image acquiring unit 191. The image acquiring unit 251 supplies Sample Constructor to the deletion unit 252.

Also, the image acquiring unit 251 reads, from the image file, an element that is unencrypted data of the current sample, or an element that is encrypted data corresponding to a key retained by a video reproducing terminal, on the basis of information of each element described in the Sample Constructor, in the describing order of the information, in a similar manner to the image acquiring unit 191. The image acquiring unit 251 supplies the read encrypted data to the decryption unit 94, and supplies the unencrypted data to the insertion unit 192.

The deletion unit 252 decrypts, with a common key, the encoded image data supplied from the insertion unit 192 by a technique corresponding to the encryption technique in the selection unit 233 of FIG. 34. The deletion unit 252 deletes padding data added to pattern data in the decrypted encoded image data, on the basis of Sample Constructor supplied from the image acquiring unit 251. The deletion unit 252 supplies the decoding unit 193 with the encoded image data from which padding data has been deleted.

(Description of Processing by Streaming Reproduction Unit)

Figure 38:
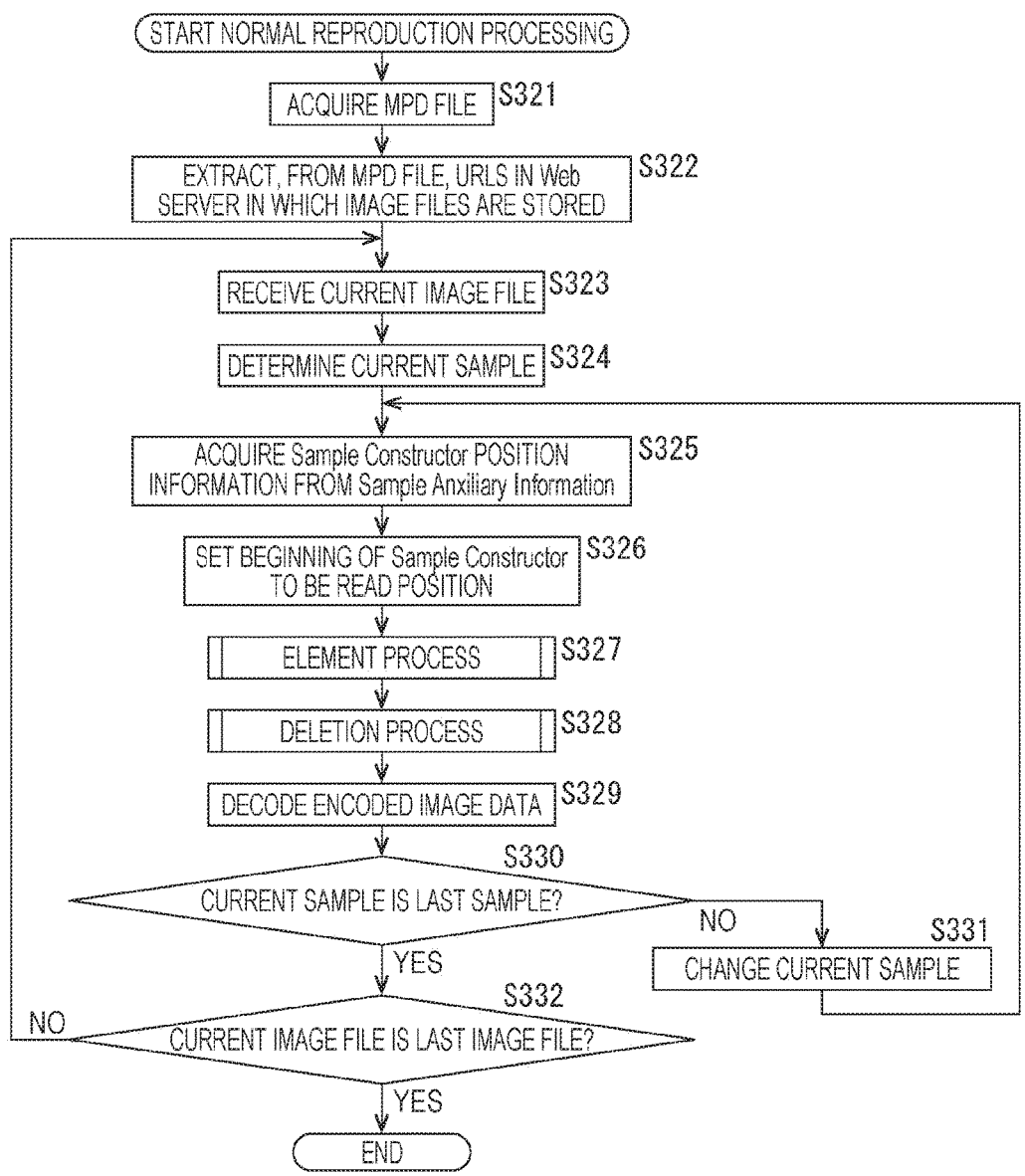
FIG. 38 is a flowchart describing normal reproduction processing by the streaming reproduction unit of FIG. 37.

FIG. 38 is a flowchart describing normal reproduction processing by the streaming reproduction unit 250 of FIG. 37.

Since the processing of steps S321 to S326 of FIG. 38 is similar to the processing of steps S201 to S206 of FIG. 28, the description will be omitted.

In step S327, the streaming reproduction unit 250 reads each element from an image file on the basis of Sample Constructor of a current sample, and performs an element process of generating encoded image data. Details of this element process will be described with reference to FIG. 39 described later.

In step S328, the streaming reproduction unit 250 performs a deletion process of deleting padding data from encoded image data supplied from the insertion unit 192, on the basis of Sample Constructor of the current sample. Details of this deletion process will be described with reference to FIG. 40 described later.

In step S329, the decoding unit 193 decodes encoded image data supplied from the deletion unit 252, and outputs the resultant image data as image data of video content.

Since the processing of steps S330 to S332 is similar to the processing of steps S209 to S211 of FIG. 28, the description will be omitted.

Figure 39:
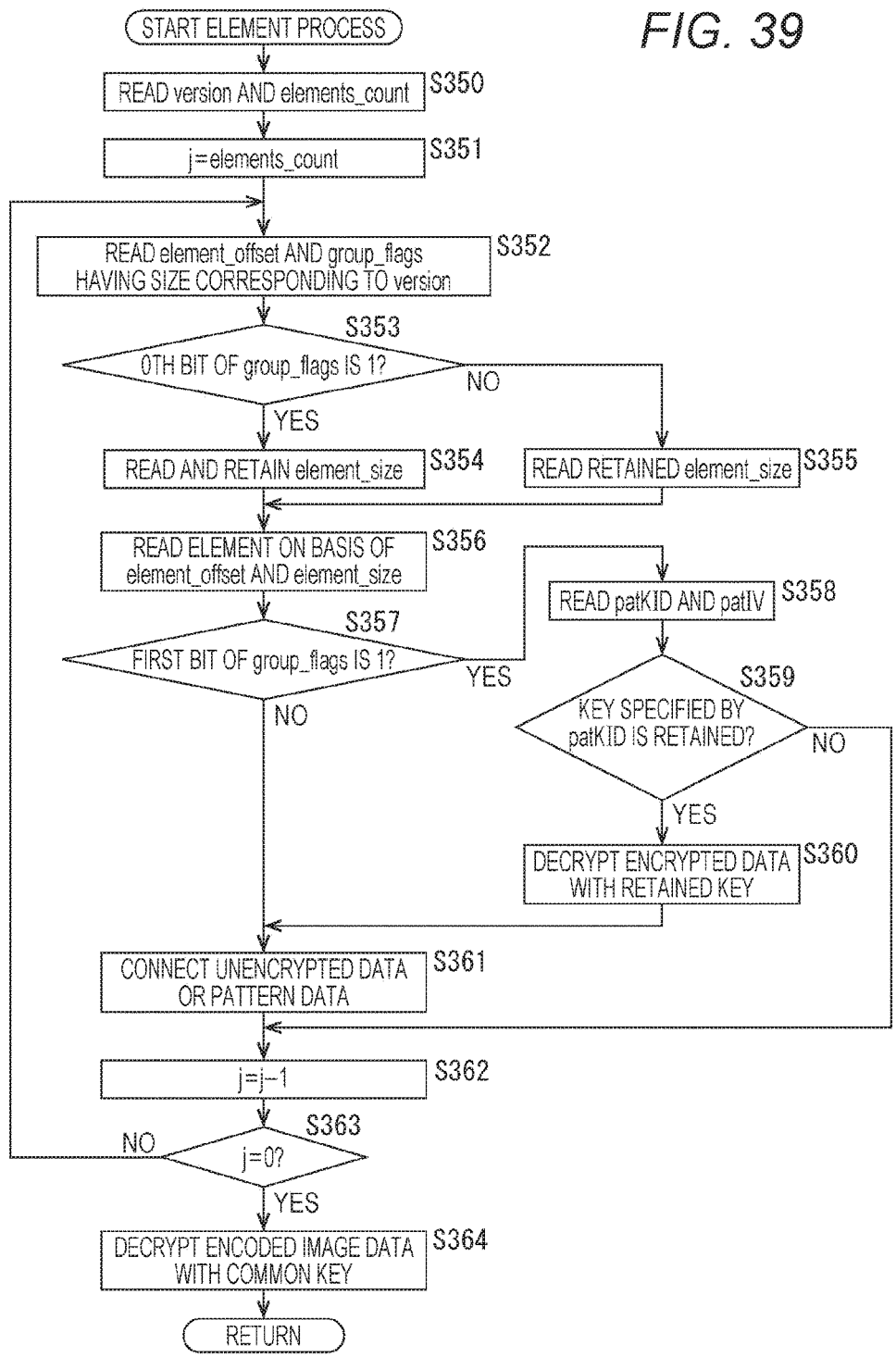
FIG. 39 is a flowchart describing details of an element process of FIG. 38.

FIG. 39 is a flowchart describing details of the element process of step S327 in FIG. 38.

In step S350 of FIG. 39, the image acquiring unit 251 of the streaming reproduction unit 250 reads version and elements_count from the read position of Sample Constructor. In step S351, the image acquiring unit 251 sets the read elements_count as count value j.

In step S352, the image acquiring unit 251 moves the read position of Sample Constructor to the next element_offset, and reads element_offset and group_flags with the number of bits according to version.

Since the processing of steps S353 to S355 is similar to the processing of steps S233, S234, and S237 of FIG. 29, the description will be omitted.

After the processing of step S354 or S355, the image acquiring unit 251 reads, in step S356, the jth element from an image file on the basis of element_offset and element_size. Specifically, the image acquiring unit 251 reads, as an element, data by the size represented by element_size, from the position based on element_offset of an image file. Then, the processing proceeds to step S357.

In step S357, the image acquiring unit 251 judges whether the first bit of group_flags is 1. When it is judged in step S357 that the first bit of group_flags is not 1, that is, when the jth element is unencrypted data, the image acquiring unit 251 supplies the read jth element to the insertion unit 192. Then, the processing proceeds to step S361.

On the other hand, when it is judged in step S357 that the first bit of group_flags is 1, that is, when the jth element is encrypted data, the image acquiring unit 251 supplies the read jth element to the decryption unit 94. Then, the processing proceeds to step S358.

In step S358, the image acquiring unit 251 moves the read position of Sample Constructor to the next patKID, and reads a pair of patKID and patIV.

In step S359, the image acquiring unit 251 judges whether the video reproducing terminal 14 retains a key specified by patKID. When it is judged in step S359 that a key specified by patKID is retained, the processing proceeds to step S360.

In step S360, the decryption unit 94 decrypts the encrypted data supplied from the image acquiring unit 251 with a key retained by the video reproducing terminal 14 to generate pattern data. The decryption unit 94 supplies the pattern data to the insertion unit 192, and allows the processing to proceed to step S361.

On the other hand, when it is judged in step S359 that a key specified by patKID is not retained, the processing proceeds to step S362.

Since the processing of steps S361 to S363 is similar to the processing of steps S242 to S244 of FIG. 29, the description will be omitted. However, when it is judged in step S363 that count value j is 0, the insertion unit 192 supplies the retained encoded image data to the deletion unit 252, and allows the processing to proceed to step S364.

In step S364, the deletion unit 252 decrypts, with a common key, the encoded image data supplied from the insertion unit 192 by a technique corresponding to the encryption technique in the selection unit 233 of FIG. 34. Then, the processing returns to step S327 of FIG. 38, and proceeds to step S328.

It is noted that when it is judged in S359 of FIG. 39 that the video reproducing terminal retains a key specified by patKID, it may be configured that element_size is fixed to be 0 until the read position of Sample Constructor becomes element_offset of a beginning element in the next group. In this case, an element that is encrypted data encrypted with a key not retained by the video reproducing terminal can be inhibited from being wastefully read in step S356.

Figure 40:
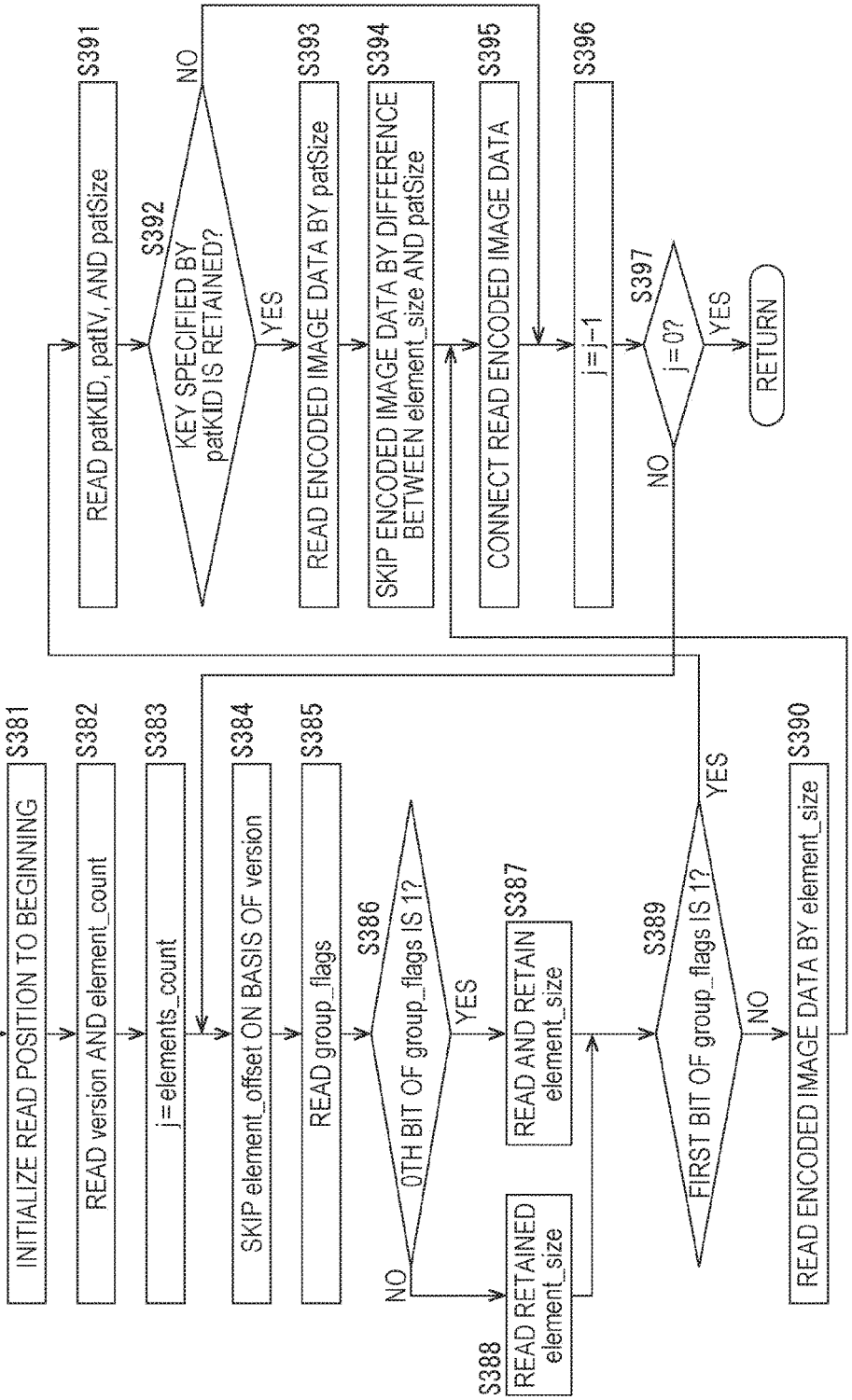
FIG. 40 is a flowchart describing details of a deletion process of FIG. 38.
Figure 41:
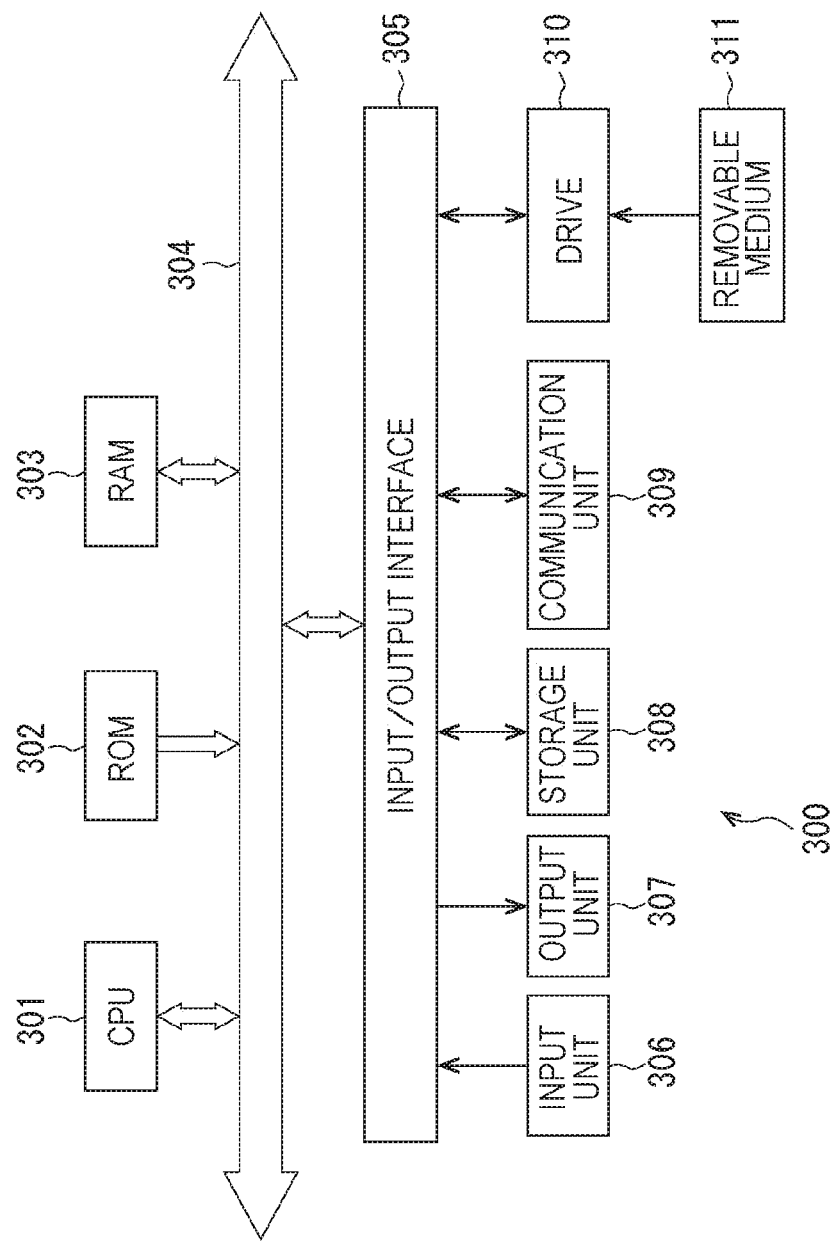
FIG. 41 is a block diagram illustrating a configuration example of hardware of a computer.

FIG. 40 is a flowchart describing details of the deletion process of step S328 in FIG. 38.

In step S381 of FIG. 40, the image acquiring unit 251 of the streaming reproduction unit 250 initializes the read position of Sample Constructor to the beginning position of Sample Constructor of a current encryption sample on the basis of Sample Constructor position information.

In step S382, the image acquiring unit 251 reads version and elements_count from the read position of Sample Constructor. In step S383, the image acquiring unit 251 sets the read elements_count as count value j.

In step S384, the image acquiring unit 251 moves, on the basis of version, the read position of Sample Constructor by the number of bits according to version, thereby to skip element_offset of the number of bits according to version. In step S385, the image acquiring unit 251 reads group_flags from the read position of Sample Constructor.

In step S386, the image acquiring unit 251 judges whether the 0th bit of group_flags is 1. When it is judged in step S386 that the 0th bit of group_flags is 1, that is, when the jth element is a beginning element in a group, the processing proceeds to step S387.

In step S387, the image acquiring unit 251 moves the read position of Sample Constructor to the next element_size for reading, and retains the read data. At this time, the immediately previously retained element_size is deleted. Further, the image acquiring unit 251 supplies the read element_size to the deletion unit 252. Then, the processing proceeds to step S389.

On the other hand, when it is judged in step S386 that the 0th bit of group_flags is not 1, that is, when the jth element is an element including the second or later encrypted data in a group, the processing proceeds to step S388. In step S388, the image acquiring unit 251 reads the retained element_size, that is, element_size of a beginning element in the same group. Then, the image acquiring unit 251 supplies the read element_size to the deletion unit 252, and allows the processing to proceed to step S389.

In step S389, the image acquiring unit 251 judges whether the first bit of group_flags is 1. When it is judged in step S389 that the first bit of group_flags is not 1, that is, when the jth element is unencrypted data, the processing proceeds to step S390.

Then, in step S390, the deletion unit 252 reads encoded image data by the size represented by the element_size read in step S387 or S388, from the read position of the encoded image data supplied from the insertion unit 192. It is noted that the initial value of the read position of encoded image data is the beginning of encoded image data. The deletion unit 252 moves the read position of encoded image data to a terminal position of the read encoded image data, and allows the processing to proceed to step S395.

On the other hand, when it is judged in step S389 that the first bit of group_flags is 1, that is, when the jth element is encrypted data, the processing proceeds to step S391.

In step S391, the image acquiring unit 251 moves the read position of Sample Constructor to the next patKID, reads patKID, patIV, and patSize, and supplies the read data to the deletion unit 252.

In step S392, the deletion unit 252 judges whether the video reproducing terminal retains a key specified by patKID. When it is judged in step S392 that a key specified by patKID is retained, the processing proceeds to step S393.

In step S393, the deletion unit 252 reads encoded image data by the size represented by patSize, from the read position of the encoded image data supplied from the insertion unit 192. The deletion unit 252 moves the read position of encoded image data to a terminal position of the read encoded image data.

In step S394, the deletion unit 252 moves the read position of encoded image data by the size represented by a difference between element_size and patSize, that is, by the size of padding data, thereby to skip the encoded image data. This causes padding data to be skipped. Then, the processing proceeds to step S395.

In step S395, the deletion unit 252 connects the read encoded image data to immediately after the retained encoded image data, and retains encoded image data after the connection. Accordingly, when padding data exists, two pieces of data before and after padding data are connected to each other. That is, padding data is deleted. Then, the processing proceeds to step S396.

On the other hand, when it is judged in step S392 that a key specified by patKID is not retained, the processing proceeds to step S396.

Since the processing of steps S396 and S397 is similar to the processing of steps S362 and S363 of FIG. 39, the description will be omitted. When it is judged in step S397 that count value j is 0, that is, when multiple pieces of encoded image data corresponding to all elements in the current sample have been connected, the deletion unit 252 supplies the retained encoded image data to the decoding unit 193. Accordingly, encoded image data from which padding data has been deleted is supplied to the decoding unit 193. Then, the processing returns to step S328 of FIG. 38, and proceeds to step S329.

It is noted that the streaming reproduction unit 250 can also perform random reproduction instead of normal reproduction, in a similar manner to the streaming reproduction unit 90. The random reproduction processing by the streaming reproduction unit 250 is similar to the normal reproduction processing of FIG. 38, except that it is determined in step S324 that a sample of a time desired by a user is a current sample.

Also, in the eighth embodiment, dummy data is not placed in the mdat box of Media Segment. However, dummy data may be placed as illustrated in FIG. 4 to FIG. 6.

Also, element position information is described for each element in Sample Constructor according to the eighth embodiment. However, when all elements in a group are consecutively placed, only element position information of a beginning element in a group may be described in a similar manner to the seventh embodiment.

Furthermore, although patSize is described as padding information in the eighth embodiment, the size of the padding data added to pattern data may be described. Also, although pattern data and unencrypted data are encrypted in the eighth embodiment, they may not be encrypted.

Also, although padding data is added to pattern data other than the largest pattern data in the eighth embodiment, padding data may be added to all pieces of pattern data such that all pieces of pattern data become larger than the maximum size value of pattern data. In this case, padding information of all pieces of pattern data is contained in an image file.

Also, although pattern data corresponding to encoded image data of video content is encrypted in the first to eighth embodiments, data of multiple different patterns regarding other data such as encoded audio data of video content may be encrypted.

Ninth Embodiment (Description of Computer to which the Present Disclosure is Applied)

The above-described series of processes by the file generating apparatus 11 and the Web server 12 can be executed by hardware or can be executed by software. When executing the series of processing by software, a program constituting the software is installed in a computer. Here, examples of a computer include a computer integrated into dedicated hardware, and a computer containing various programs installed for executing various functions, such as a general-purpose personal computer.

FIG. 41 is a block diagram illustrating a configuration of hardware of a computer which executes the above-described series of processes by a program.

In a computer 300, a central processing unit (CPU) 301, a read only memory (ROM) 302, and a random access memory (RAM) 303 are connected to each other via a bus 304.

Furthermore, an input/output interface 305 is connected to the bus 304. An input unit 306, an output unit 307, a storage unit 308, a communication unit 309, and a drive 310 are connected to the input/output interface 305.

The input unit 306 includes a keyboard, a mouse, a microphone, and the like. The output unit 307 includes a display, a speaker, and the like. The storage unit 308 includes a hard disk, a nonvolatile memory, and the like. The communication unit 309 includes a network interface and the like. The drive 310 drives a removable medium 311 such as a magnetic disk, an optical disk, a magneto-optical disk, and a semiconductor memory.

In the computer 300 configured as described above, for example, the CPU 301 loads a program stored in the storage unit 308 into the RAM 303 via the input/output interface 305 and the bus 304, so that the above-described series of processes are performed.

The program to be executed by the computer 300 (CPU 301) can be provided by, for example, being recorded in the removable medium 311 as a package medium or the like. Also, the program can be provided via a wired or wireless transmission medium such as a local area network, the Internet, and a digital satellite broadcast.

In the computer 300, the removable medium 311 can be inserted into the drive 310 so that a program is installed into the storage unit 308 via the input/output interface 305. Also, a program can be received by the communication unit 309 via a wired or wireless transmission medium so that the program is installed into the storage unit 308. Other than these, a program can be previously installed in the ROM 302 or the storage unit 308.

It is noted that a program executed by the computer 300 may be a program that causes processes to be performed on a time-series basis in the order of the description in this specification, or may be a program that causes processes to be performed in parallel or at necessary timings such as when called.

Also, the hardware configuration of the video reproducing terminal 14 can be similar to the configuration of the computer 300 of FIG. 41. In this case, for example, the CPU 301 executes the control software 21, the video reproducing software 22, and the access software 23. The processing by the video reproducing terminal 14 can also be executed by hardware.

As described herein, a system means an aggregate of a plurality of components (an apparatus, a module (part), and the like), and it does not matter whether all components are contained in the same casing. Therefore, both a plurality of apparatuses each housed in separate casings and connected with each other via a network and one apparatus in which a plurality of modules are housed in one casing are a system.

Also, the effects described herein are merely exemplary and not limiting, and other effects may exist.

Furthermore, an embodiment of the present disclosure is not limited to the above-described embodiments, and various modifications are possible within the range not departing from the gist of the present disclosure.

For example, a file generated by the file generating apparatus 11 may be a file in accordance with a standard other than MPEG-DASH. Also, a file generated by the file generating apparatus 11 may be not only streaming-reproduced, but also reproduced from a local storage or broadcast. When a file generated by the file generating apparatus 11 is a file for other than Adaptive Streaming, the Movie Fragment, trun box, and sample number of a time desired by a user are specified using the tfra box in the mfra box of ISOBMFF.

Also, Sample Constructor may be placed in an existing box other than the mdat box, or may be placed in a newly disposed box for Sample Constructor.

Furthermore, when it is possible to encrypt encoded image data with a key different from the key used for the encryption of pattern data, the number of encryption states represented by group_flags is three which are unencrypted, once encrypted, and twice encrypted. That is, unencrypted data is either encrypted once with a key different from the key used for the encryption of pattern data or never encrypted. On the other hand, encrypted data is encrypted either twice with a key used for the encryption of pattern data and another key or once only with a key used for the encryption of pattern data.

It is noted that in this case, KID, which is information for specifying a key different from the key used for the encryption of pattern data, and IV, which indicates the value of Initial Vector for decoding data encrypted with the different key, may be described in Sample Constructor.

Also, for example, the present disclosure can have a configuration of cloud computing in which a plurality of apparatuses share and jointly deal with one function via a network.

Also, each of the steps described in the above flowcharts can be shared and executed by a plurality of apparatuses as well as executed by one apparatus.

Furthermore, when a plurality of processes is included in one step, the plurality of processes included in one step can be shared and executed by a plurality of apparatuses as well as executed by one apparatus.

Also, the present disclosure can have configurations as below.

(1)

An information processing apparatus, including:

a receiving unit that receives a file containing
    encrypted data that is multiple pieces of pattern data, regarding at least part of data of content, encrypted with unique keys and that has an identical size,
    unencrypted data, of the data of content, which is not encrypted with any one of the keys,
    size information that represents the size, and
    position information that represents a position of the encrypted data in the file; and a decryption unit that reads the encrypted data encrypted with a predetermined key from the file on the basis of the position information and the size information received by the receiving unit, and decrypts the read encrypted data with the predetermined key to generate the pattern data.

(2)

The information processing apparatus according to (1), wherein the position information is information that represents, for each of the keys, a position of the encrypted data encrypted with the key in the file.

(3)

The information processing apparatus according to (1), wherein the encrypted data encrypted with each key is consecutively placed in the file, and the position information is information that represents a beginning position of the encrypted data encrypted with each key in the file.

(4)

The information processing apparatus according to any of (1) to (3), wherein the file contains information that indicates positions of the size information and the position information in the file, and the decryption unit acquires the size information and the position information from the file on the basis of the information that indicates positions of the size information and the position information in the file.

(5)

The information processing apparatus according to any of (1) to (4), wherein the file is in accordance with an ISO base media file format, and the size information and the position information are set for each sample.

(6)

The information processing apparatus according to any of (1) to (5), wherein the file contains information that represents sizes of the multiple pieces of pattern data.

(7)

The information processing apparatus according to any of (1) to (5), wherein the file contains information that represents a size of padding data added to the pattern data.

(8)

The information processing apparatus according to any of (1) to (5), further including a deletion unit that deletes padding data added to the pattern data generated by the decryption unit, wherein the padding data is added, before encryption, to the multiple pieces of pattern data, such that all of the multiple pieces of pattern data have an identical size, and the file contains padding information that represents sizes of the multiple pieces of pattern data before the padding data is added, and the deletion unit deletes the padding data on the basis of the padding information.

(9)

The information processing apparatus according to (8), wherein the multiple pieces of pattern data to which the padding data is added and at least part of the unencrypted data are encrypted with a common key, and the deletion unit decrypts an encrypted portion of the pattern data to which the padding data is added and which has been generated by the decryption unit and the unencrypted data with the common key, and deletes the padding data added to the pattern data after the decryption.

(10)

The information processing apparatus according to any of (1) to (9), further including an insertion unit that inserts the pattern data generated by the decryption unit into the unencrypted data, wherein pre-unencrypted data that is the unencrypted data before the at least part of data and post-unencrypted data that is the unencrypted data after the at least part of data are connected to each other, and the insertion unit inserts the pattern data between the pre-unencrypted data and the post-unencrypted data.

(11)

The information processing apparatus according to any of (1) to (9), further including an insertion unit that inserts the pattern data generated by the decryption unit into the unencrypted data, wherein pre-unencrypted data that is the unencrypted data before the at least part of data and post-unencrypted data that is the unencrypted data after the at least part of data are connected via predetermined data having an identical size to a size of the pattern data, and the insertion unit replaces the predetermined data with the pattern data to insert the pattern data into the unencrypted data.

(12)

An information processing method, wherein an information processing apparatus includes:

a receiving step of receiving a file containing encrypted data that is multiple pieces of pattern data, regarding at least part of data of content, encrypted with unique keys and that has an identical size, unencrypted data, of the data of content, which is not encrypted with any one of the keys, size information that represents the size, and position information that represents a position of the encrypted data in the file; and a decryption step of reading the encrypted data encrypted with a predetermined key from the file on the basis of the position information and the size information received by processing of the receiving step, and decrypting the read encrypted data with the predetermined key to generate the pattern data.

(13)

An information processing apparatus, including:

an encryption unit that encrypts, with unique keys, multiple pieces of pattern data regarding at least part of data of content to generate encrypted data having an identical size; and a file generating unit that generates a file containing the encrypted data generated by the encryption unit, unencrypted data, of the data of content, which is not encrypted with any one of the keys, size information that represents the size, and position information that represents a position of the encrypted data in the file.

(14)

The information processing apparatus according to (13), wherein the position information is information that represents, for each of the keys, a position of the encrypted data encrypted with the key in the file.

(15)

The information processing apparatus according to (13), wherein the encrypted data encrypted with each key is consecutively placed in the file, and the position information is information that represents a beginning position of the encrypted data encrypted with each key in the file.

(16)

The information processing apparatus according to any of (13) to (15), wherein the file contains information that indicates positions of the size information and the position information in the file.

(17)

The information processing apparatus according to any of (13) to (16), wherein the file is in accordance with an ISO base media file format, and the size information and the position information are set for each sample.

(18)

The information processing apparatus according to any of (13) to (17), wherein the file contains information that represents sizes of the multiple pieces of pattern data.

(19)

The information processing apparatus according to any of (13) to (17), wherein the file contains information that represents a size of padding data added to the pattern data.

(20)

The information processing apparatus according to any of (13) to (17), further including a padding unit that adds padding data to the multiple pieces of pattern data such that all of the multiple pieces of pattern data have an identical size, wherein the encryption unit encrypts, with a unique key, each of the multiple pieces of pattern data to which the padding data has been added by the padding unit, and the file contains padding information that represents sizes of the multiple pieces of pattern data before the padding data is added.

(21)

The information processing apparatus according to (20), further including a whole encryption unit that encrypts, with a common key, the multiple pieces of pattern data to which the padding data has been added by the padding unit and at least part of the unencrypted data, wherein the encryption unit encrypts, with a unique key, each of the multiple pieces of pattern data encrypted by the whole encryption unit.

(22)

The information processing apparatus according to any of (13) to (21), wherein pre-unencrypted data that is the unencrypted data before the at least part of data and post-unencrypted data that is the unencrypted data after the at least part of data are connected to each other.

(23)

The information processing apparatus according to any of (13) to (21), wherein pre-unencrypted data that is the unencrypted data before the at least part of data and post-unencrypted data that is the unencrypted data after the at least part of data are connected via predetermined data having an identical size to a size of the pattern data.

(24)

An information processing method, wherein an information processing apparatus includes:

an encryption step of encrypting, with unique keys, multiple pieces of pattern data regarding at least part of data of content to generate encrypted data having an identical size; and a file generating step of generating a file containing the encrypted data generated by processing of the encryption step, unencrypted data, of the data of content, which is not encrypted with any one of the keys, size information that represents the size, and position information that represents a position of the encrypted data in the file.

REFERENCE SIGNS LIST

11 File generating apparatus
14 Video reproducing terminal
53 Encryption unit
54 File generating unit
93 Image acquiring unit
94 Decryption unit
95 Insertion unit
111, 131, 191 Image acquiring unit
192 Insertion unit
211 Image acquiring unit
232 Padding unit
233 Selection unit
234 File generating unit
251 Image acquiring unit
252 Deletion unit

The invention claimed is:

1. An information processing apparatus, comprising:
at least one microprocessor configured to:
receive a file containing:
encrypted data which comprises a plurality of pieces of pattern data, encrypted with a plurality of unique keys for the plurality of pieces of pattern data, wherein each of the plurality of pieces of pattern data has an identical size,
unencrypted data comprising first encoded image data and dummy data, wherein a size of the dummy data is same as the identical size of each of the plurality of pieces of pattern data,
size information that represents the identical size of each of the plurality of pieces of pattern data, and
position information that represents a position of the encrypted data in the file;
read the encrypted data from the file based on the received position information and the received size information;
decrypt the read encrypted data with the plurality of unique keys to generate decrypted pattern data;
generate second encoded image data based on replacement of the dummy data with the generated decrypted pattern data in the unencrypted data;
decode the second encoded image data; and
output image data corresponding to the second encoded image data.

2. An information processing method, comprising:
in an information processing apparatus:
receiving a file containing:
encrypted data which comprises a plurality of pieces of pattern data encrypted with a plurality of unique keys for the plurality of pieces of pattern data, wherein each of the plurality of pieces of pattern data has an identical size,
unencrypted data comprising first encoded image data and dummy data, wherein a size of the dummy data is same as the identical size of each of the plurality of pieces of pattern data,
size information that represents the identical size of each of the plurality of pieces of pattern data, and
position information that represents a position of the encrypted data in the file;
reading the encrypted data from the file based on the received position information and the received size information;

decrypting the read encrypted data with the plurality of unique keys to generate decrypted pattern data;

generating second encoded image data by replacing the dummy data with the generated decrypted pattern data in the unencrypted data;

decoding the second encoded image data; and outputting image data corresponding to the second encoded image data.

3. An information processing apparatus, comprising:

at least one microprocessor configured to:

encrypt, with a plurality of unique keys, a plurality of pieces of pattern data to generate encrypted data, wherein each of the plurality of pieces of pattern data has an identical size;

generate a file containing:
the generated encrypted data,
unencrypted data comprising first encoded image data and dummy data, wherein a size of the dummy data is same as the identical size of each of the plurality of pieces of pattern data,
size information that represents the identical size of each of the plurality of pieces of pattern data, and
position information that represents a position of the encrypted data in the file;

read the encrypted data from the file based on the received position information and the size received information;

decrypt the read encrypted data with the plurality of unique keys to generate decrypted pattern data;

generate second encoded image data based on replacement of the dummy data with the generated decrypted pattern data in the unencrypted data;

decode the second encoded image data; and output image data corresponding to the second encoded image data.

4. The information processing apparatus according to claim 3, wherein the at least one microprocessor is further configured to:

classify the encrypted data and the unencrypted data into a plurality of groups, and store one of size information of the encrypted data or size information of the unencrypted data located at a beginning of each group of the plurality of groups.

5. The information processing apparatus according to claim 3, wherein the position information further represents, for each of the plurality of unique keys, a position of the encrypted data encrypted with each of the plurality of unique keys in the file.

6. The information processing apparatus according to claim 4, wherein:

the encrypted data, encrypted with each of the plurality of unique keys is consecutively placed in the plurality of groups in the file, and the at least one microprocessor is further configured to:
locate the encrypted data, consecutively placed in the plurality of groups in the file, and
store the position information that further represents a beginning position of the encrypted data in the plurality of groups in the file.

7. The information processing apparatus according to claim 3, wherein the file further contains information that indicates positions of the size information and the position information in the file.

8. The information processing apparatus according to claim 3, wherein:

the file is an ISO base media file format, and the size information and the position information are set for each sample.

9. The information processing apparatus according to claim 8, wherein the at least one microprocessor is further configured to:

add padding data to the plurality of pieces of pattern data, such that sizes of the plurality of pieces of pattern data are the identical size, and store information that represents a size of the padding data added to the plurality of pieces of pattern data in the file.

10. The information processing apparatus according to claim 9, wherein the file further contains padding information that represents sizes of the plurality of pieces of pattern data prior to the addition of the padding data.

11. The information processing apparatus according to claim 10, wherein the at least one microprocessor is further configured to:

encrypt, with a common key, the plurality of pieces of pattern data to which the padding data is added and at least a part of the unencrypted data.

12. An information processing method, comprising in an information processing apparatus:

encrypting, with a plurality of unique keys, a plurality of pieces of pattern data to generate encrypted data, wherein each of the plurality of pieces of pattern data has an identical size;

generating a file containing:
generated encrypted data,
unencrypted data comprising first encoded image data and dummy data, wherein a size of the dummy data is same as the identical size of each of the plurality of pieces of pattern data,
size information that represents the identical size of each of the plurality of pieces of pattern data, and
position information that represents a position of the encrypted data in the file;

reading the encrypted data from the file based on the received position information and the received size information;

decrypting the read encrypted data with the plurality of unique keys to generate decrypted pattern data;

generating second encoded image data based on replacement of the dummy data with the generated decrypted pattern data in the unencrypted data;

decoding the second encoded image data; and outputting image data corresponding to the second encoded image data.

* * * * *